United States Patent
Mcmenamy et al.

(10) Patent No.: US 12,543,229 B2
(45) Date of Patent: Feb. 3, 2026

(54) REMOTE UE CONTROL INFORMATION ESTABLISHMENT AT A CORE NETWORK

(71) Applicant: Fraunhofer-Gesellschaft zur Foerderung der angewandten Forschung e. V., Munich (DE)

(72) Inventors: Jasmina Mcmenamy, Berlin (DE); Roya Ebrahim Rezagah, Berlin (DE); Nithin Srinivasan, Berlin (DE); Baris Göktepe, Berlin (DE); Sarun Selvanesan, Berlin (DE); Thomas Wirth, Berlin (DE); Thomas Fehrenbach, Berlin (DE); Thomas Schierl, Berlin (DE); Cornelius Hellge, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 705 days.

(21) Appl. No.: 17/929,640

(22) Filed: Sep. 2, 2022

(65) Prior Publication Data
US 2023/0082507 A1   Mar. 16, 2023

Related U.S. Application Data

(63) Continuation of application No. PCT/EP2021/055390, filed on Mar. 3, 2021.

(30) Foreign Application Priority Data

Mar. 6, 2020 (EP) .................................... 20161626
Mar. 12, 2020 (EP) .................................... 20162698

(51) Int. Cl.
*H04W 4/00* (2018.01)
*H04W 72/1263* (2023.01)
(Continued)

(52) U.S. Cl.
CPC ....... *H04W 76/14* (2018.02); *H04W 72/1263* (2013.01); *H04W 72/20* (2023.01); *H04W 60/00* (2013.01); *H04W 88/04* (2013.01)

(58) Field of Classification Search
CPC . H04W 76/14; H04W 72/1263; H04W 60/00; H04W 88/04; H04W 92/10
See application file for complete search history.

(56) References Cited

U.S. PATENT DOCUMENTS 10,440,730 B2   10/2019 Jung et al.
2018/0049259 A1*  2/2018 Aminaka ............. H04W 76/14
(Continued)

FOREIGN PATENT DOCUMENTS

| CN | 107615844 A | 1/2018 |
| WO | 2017065895 A1 | 4/2017 |
| WO | 2018143763 A1 | 8/2018 |

OTHER PUBLICATIONS

3GPP TS 23.122, V15.7.0 (Apr. 2019).
(Continued)

*Primary Examiner* — Omoniyi Obayanju
(74) *Attorney, Agent, or Firm* — PERKINS COIE LLP; Michael A. Glenn

(57) ABSTRACT

A user device, UE, for a wireless communication system is described. The UE is to communicate with the wireless communication system via at least one relay UE, the UE and the relay UE communicating over a sidelink interface. When communicating with the wireless communication system via the relay UE, e.g., when starting and/or during a communication, the UE is to establish a network control layer in its protocol stack, and the network control layer is to provide some control information.

19 Claims, 34 Drawing Sheets

(51) Int. Cl.
  *H04W 72/20*   (2023.01)
  *H04W 76/14*   (2018.01)
  *H04W 60/00*   (2009.01)
  *H04W 88/04*   (2009.01)

(56) References Cited

U.S. PATENT DOCUMENTS

2018/0139724 A1    5/2018  Loehr et al.
2025/0184879 A1*   6/2025  Paladugu .............. H04W 8/005

OTHER PUBLICATIONS

3GPP TS 23.287 V16.1.0 (Dec. 2019).
3GPP TS 23.303 V15.1.0 (Jul. 2018).
3GPP TS 36.300 V15.8.0 (Jan. 2020).
3GPP TS 36.304 V15.5.0 (Jan. 2020).
3GPP TS 36.331 V15.8.0 (Jan. 2020).
3GPP TS 38.300 V16.0.0 (Dec. 2019).
3GPP TS 38.304 V15.5.0 (Oct. 2019).
3GPP TS 38.331 V16.0.0 (Mar. 2020).
"3GPP TS 36.331", XP051847058; 3rd Generation Partnership Project; Technical Specification Group Group Radio Access Network; 2020; Part 1.
"3GPP TS 36.331", XP051847058; 3rd Generation Partnership Project; Technical Specification Group Group Radio Access Network; 2020; Part 2.
"3GPP TS 36.331", XP051847058; 3rd Generation Partnership Project; Technical Specification Group Group Radio Access Network; 2020; Part 3.
"3GPP TS 36.331", XP051847058; 3rd Generation Partnership Project; Technical Specification Group Group Radio Access Network; 2020; Part 4.
"3GPP TS 36.331", XP051847058; 3rd Generation Partnership Project; Technical Specification Group Group Radio Access Network; 2020; Part 5.
"3GPP TS 36.331", XP051847058; 3rd Generation Partnership Project; Technical Specification Group Group Radio Access Network; 2020; Part 6.
"3GPP TS 36.331", XP051847058; 3rd Generation Partnership Project; Technical Specification Group Group Radio Access Network; 2020; Part 7.
"3GPP TS 36.331", XP051847058; 3rd Generation Partnership Project; Technical Specification Group Group Radio Access Network; 2020; Part 8.
"3GPPTS TS 36.300", XP051799941; v14.11.0; 3rd Generation Partnership Project; Technical Specification Group Radio Access; Sep. 2019; Part 1.
"3GPPTS TS 36.300", XP051799941; v14.11.0; 3rd Generation Partnership Project; Technical Specification Group Radio Access; Sep. 2019; Part 2.
3GPP TR 23.752 V0..0 (Jan. 2020)—3rd Generation Partnership Project; Technical Specification Group Services and System Aspects; Study on system enhancement for Proximity based Services (ProSe) in the 5G System (5GS) (Release 17)—71 pages.
3GPP TS 23.502 V16.2.0 (Sep. 2019)—3rd Generation Partnership Project; Technical Specification Group Services and System Aspects; Procedures for the 5G System; Stage 2 (Release 16)—523 pages.
3GPP TSG-RAN WG2 Meeting #106—R2-1908291—Reno, US., May 13-May 17, 2019—OPPO—Summary of [Offline#704] UL/SL prioritization—8 pages.
3GPP TSG-SA Meeting #78—SP-171011—Lisbon, Portugal, Dec. 20-22, 2017 (Revision of S5-173322)—Intel—Add charging description for WLAN-based ProSe direct discovery—64 pages.
NTT Docomo, Inc.—Remaining issues on sidelink physical layer structure—R1-2000914—3GPP TSG RAN WG1 #100—e-Meeting, Feb. 24-Mar. 6, 2020—16 pages.

* cited by examiner

DL-DCCH

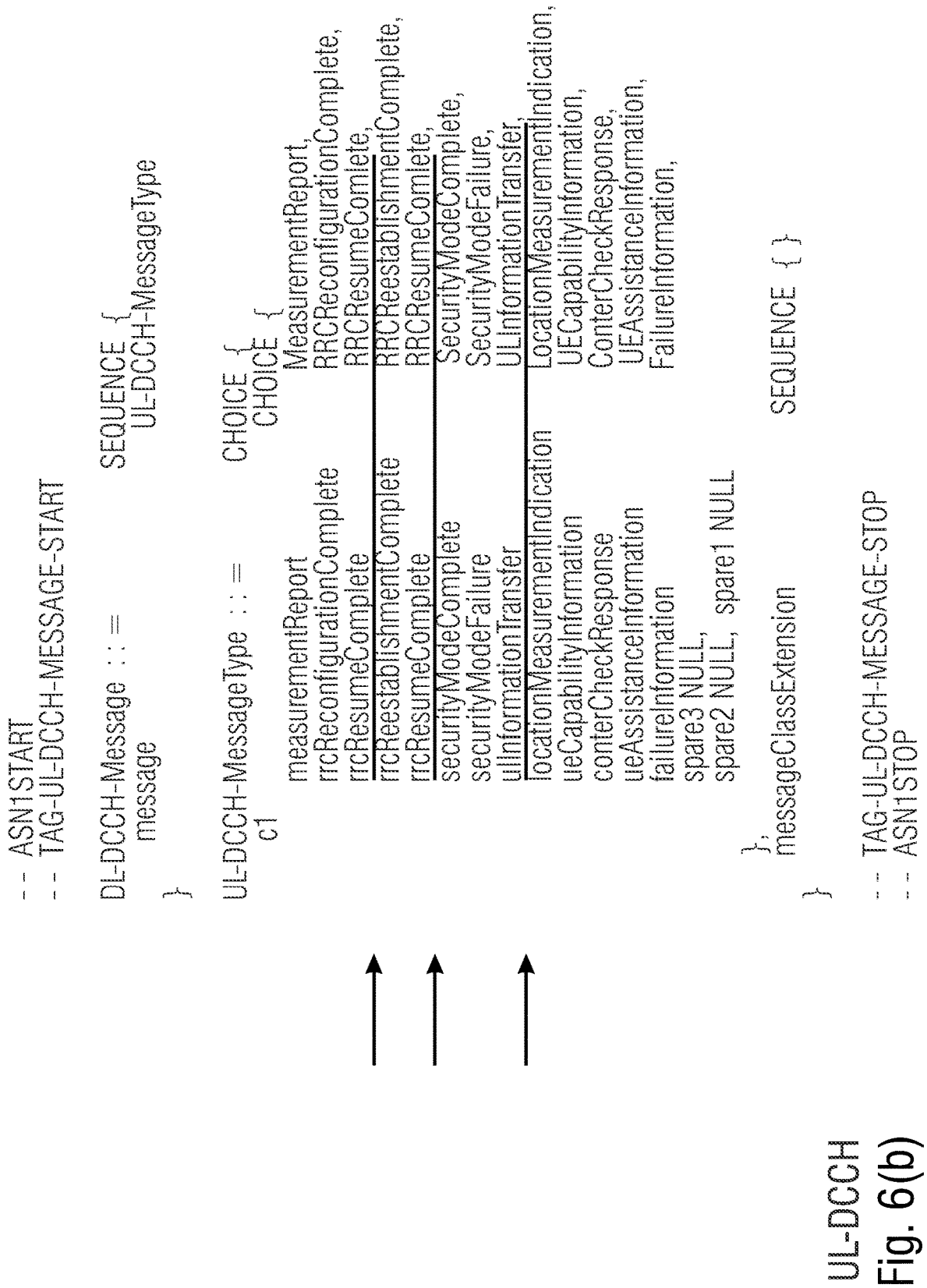
Fig. 6(b) UL-DCCH

Fig. 13(a)   RRCReconfigurationSidelink Message

RRCReconfigurationCompleteSidelink Message

New RRCControlPlaneSidelink Message

```
-- ASN1START
-- TAG-DEDICATED-NAS-MESSAGE-START

DedicatedNASPC5-Message ::=    ...

-- TAG-DEDICATED-NAS-MESSAGE-STOP
-- ASN1STOP
```

DedicatedNASPC5-Message

Fig. 13(d)

REMOTE UE CONTROL INFORMATION ESTABLISHMENT AT A CORE NETWORK

CROSS-REFERENCES TO RELATED APPLICATIONS

This application is a continuation of copending International Application No. PCT/EP2021/055390, filed Mar. 3, 2022, which is incorporated herein by reference in its entirety, and additionally claims priority from European Applications Nos. EP 20 161 626.5, filed Mar. 6, 2020, and EP 20 162 698.3, filed Mar. 12, 2020, all of which are incorporated herein by reference in their entirety.

BACKGROUND OF THE INVENTION

The present application concerns the field of wireless communication systems or networks, more specifically a communication between a user device or user equipment, UE, and a core network of the wireless communication system or network via one or more relay user devices, relay UEs. Embodiments concern approaches allowing to establish certain control context of the remote UE at the core network, CN, which, when the remote UE connects to the wireless communication network via the relay UE, does not exist at the CN. Other embodiments concern approaches allowing an out of coverage UE to access the wireless communication network via the relay despite the fact that certain provisioning parameters allowing the UE to perform a sidelink operation may not be available at the UE or may be no longer valid.

FIG. 1 is a schematic representation of an example of a terrestrial wireless network 100 including, as is shown in FIG. 1(a), a core network 102 and one or more radio access networks $RAN_1$, $RAN_2$, . . . . $RAN_N$. FIG. 1(b) is a schematic representation of an example of a radio access network RAN, that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station gNB to $gNB_5$ may be connected to the core network 102, e.g. via the S1 interface, via respective backhaul links 1141 to 1145, which are schematically represented in FIG. 1(b) by the arrows pointing to "core". The core network 102 may be connected to one or more external networks. The external network can be the Internet, or a private network, such as an Intranet or any other type of campus networks, e.g. a private WiFi or 4G or 5G mobile communication system. Further, some or all of the respective base station $gNB_1$ to gNBs may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device (D2D) communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and one or more of a system information block (SIB), the physical downlink, uplink and sidelink control channels (PDCCH, PUCCH, PSSCH) carrying for example the downlink control information (DCI), the uplink control information (UCI) and the sidelink control information (SCI). Note, the sidelink interface may a support 2-stage SCI. This refers to a first control region containing some parts of the SCI, and optionally, a second control region, which contains a second part of control information.

For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations. In addition to the above described terrestrial wireless network also non-terrestrial wireless communication networks (NTN) exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5/PC3 interface or WiFi direct. UEs that communicate directly with each other over the sidelink may include vehicles communicating directly with other vehicles (V2V communication), vehicles communicating with other entities of the wireless communication network (V2X communication), for example roadside units (RSUs), roadside entities, like traffic lights, traffic signs, or pedestrians. RSUs can have functionalities of BS or of UEs, depending on the specific network configuration. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g. GSM, UMTS, LTE base stations.

When considering two UEs directly communicating with each other over the sidelink, e.g. using the PC5/PC3 interface, one of the UEs may also be connected with a BS, and may relay information from the BS to the other UE via the sidelink interface and vice-versa. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 2 UEs (in NR) or mode 4 UEs (in LTE) are outside of the coverage 200 of a base station, rather, it means that the respective mode 2 UEs (in NR) or mode 4 UEs (in LTE) are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the NR mode 1 or LTE mode 3 UEs 202, 204 also NR mode 2 or LTE mode 4 UEs 206, 208, 210 are present. In addition, FIG. 3, schematically illustrates an out of coverage UE using a relay to communicate with the network. For example, the UE 210 may communicate over the sidelink with UE1 which, in turn, may be connected to the gNB via the Uu interface. Thus, UE1 may relay information between the gNB and the UE 210.

Although FIG. 2 and FIG. 3 illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above-mentioned use cases sidelink communication is not limited to a communication within a group. Rather, the sidelink communication may be among any of UEs, like any pair of UEs.

In a wireless communication system as described above with reference to FIG. 1, FIG. 2 or FIG. 3, a UE may connect to the wireless communication system or network via one or more relay UEs, like IoT $108_3$ in FIG. 1 communicating with the $gNB_4$ via $UE_3$. For example, the UE connecting to the network or system via the relay UE, which is also referred to as the remote UE, may be a UE that when being activated or switched on or when entering the coverage of a gNB, for certain reasons, may not connect to the gNB, however, it may connect to a relay UE. For example, an out-of-coverage UE as described above with reference to FIG. 3 may nevertheless establish a connection to the wireless communication system or network via a relay UE, i.e., the out-of-coverage UE establishes a connection to the relay UE. The remote UE communicates with the relay UE via the sidelink interface, like the PC5 interface. In other words, the relay UE may be a 3GPP access point to which the remote UE connects by a direct link, and via which the remote UE may connect to the wireless communication network. In accordance with another scenario, the relay UE, to which the remote UE may connect by a direct link, may be an access point of an arbitrary network, i.e., the remote UE may connect to the wireless communication network by a direct link to a non-3GPP access point. The CN of the wireless communication system may be connected to the non-3GPP access point, e.g., by the Non-3GPP Inter-Working Function, N3IW.

However, in either case the remote UE, when connecting over the sidelink interface to the relay UE is not known at the core network of the wireless communication system which only sees the relay UE so that certain control operations may not be performed by the core network.

Also, for a communication over the sidelink interface certain provisioning parameters are needed at the UE so as to allow the UE to perform sidelink operations. However, in case such provisioning parameters are missing at the UE or are not valid, for example are out dated, the remote UE is not capable of performing a sidelink operation with the relay UE and, thereby, is not capable of establishing a communication to the wireless communication network or system via the relay UE.

It is noted that the information in the above section is only for enhancing the understanding of the background of the invention and therefore it may contain information that does not form conventional technology that is already known to a person of ordinary skill in the art.

Thus, there may be a need to provide improvements for a communication between a remote UE and a wireless communication network over a relay UE.

SUMMARY

An embodiment may have a user device, UE, for a wireless communication system, wherein the UE is to communicate with the wireless communication system via at least one relay UE, the UE and the relay UE communicating over a sidelink interface, wherein, when communicating with the wireless communication system via the relay UE, e.g., when starting and/or during a communication, the UE is to establish a network control layer in its protocol stack, and the network control layer is to provide some control information.

Another embodiment may have a user device, UE, for a wireless communication system, wherein the UE is to act as a relay UE for a communication between a remote UE and the wireless communication system, the UE and the remote UE communicating over a sidelink interface, and wherein the UE is to receive from the remote UE control information over the sidelink interface, either as data from the remote UE or in a control message from the remote UE, like a PC5 RRC message.

Another embodiment may have a core network, CN, of a wireless communication system, wherein the CN is to communicate with a remote UE of the wireless communication system via at least one relay UE, the UE and the relay UE communicating over a sidelink interface, wherein, when communicating with the remote UE via the relay UE e.g., when starting and/or during a communication, the CN is to establish a network control layer in its protocol stack, and the network control layer is to provide control information.

Another embodiment may have a wireless communication system, having: a core network, CN, of a wireless communication system, wherein the CN is to communicate with a remote UE of the wireless communication system via at least one relay UE, the UE and the relay UE communicating over a sidelink interface, wherein, when communicating with the remote UE via the relay UE e.g., when starting and/or during a communication, the CN is to establish a network control layer in its protocol stack, and the network control layer is to provide control information; one or more relay user devices, relay UEs, for a wireless communication system, wherein the UE is to act as a relay UE for a communication between a remote UE and the wireless communication system, the UE and the remote UE communicating over a sidelink interface, and wherein the UE is to receive from the remote UE control information over the sidelink interface, either as data from the remote UE or in a control message from the remote UE, like a PC5 RRC message; and one or more remote user devices, remote UEs, for a wireless communication system, wherein the UE is to communicate with the wireless communication system via at least one relay UE, the UE and the relay UE communicating over a sidelink interface, wherein, when communicating with the wireless communication system via the relay UE, e.g., when starting and/or during a communication, the UE is to establish a network control layer in its protocol stack, and the network control layer is to provide some control information.

Another embodiment may have a user device, UE, for a wireless communication system, wherein the UE is to communicate with one or more UEs over a sidelink interface, wherein the UE is configured or pre-configured with common provisioning parameters for use when the UE is out of coverage and has no other valid provisioning parameters for a sidelink communication over the sidelink interface, the common provisioning parameters allowing the out of coverage UE to acquire an authorization for the UE to perform a sidelink communication over the sidelink interface.

Another embodiment may have a wireless communication system, having: a core network, CN, one or more relay user devices, relay UEs, and one or more inventive remote user devices, remote UEs.

Another embodiment may have a method of operating a user device, UE, for a wireless communication system, wherein the UE is to communicate with the wireless communication system via at least one relay UE, the UE and the relay UE communicating over a sidelink interface, the method having the steps of: when communicating with the wireless communication system via the relay UE, e.g., when starting and/or during a communication, establishing, at the UE, a network control layer in its protocol stack, and the network control layer is to provide some control information.

Another embodiment may have a method of operating a user device, UE, for a wireless communication system, wherein the UE is to act as a relay UE for a communication between a remote UE and the wireless communication system, the UE and the remote UE communicating over a sidelink interface, the method having the steps of: receiving, at the UE, from the remote UE control information over the sidelink interface, either as data from the remote UE or in a control message from the remote UE, like a PC5 RRC message.

Another embodiment may have a method of operating a core network, CN, of a wireless communication system, wherein the CN is to communicate with a remote UE of the wireless communication system via at least one relay UE, the UE and the relay UE communicating over a sidelink interface, the method having the steps of: when communicating with the remote UE via the relay UE e.g., when starting and/or during a communication, establishing, at the CN, a network control layer in its protocol stack.

Another embodiment may have a method of operating a user device, UE, for a wireless communication system, wherein the UE is to communicate with one or more UEs over a sidelink interface, the method having the steps of: configuring or pre-configuring the UE with common provisioning parameters for use when the UE is out of coverage and has no other valid provisioning parameters for a sidelink communication over the sidelink interface, the common provisioning parameters allowing the out of coverage UE to acquire an authorization for the UE to perform a sidelink communication over the sidelink interface.

Another embodiment may have a non-transitory digital storage medium having a computer program stored thereon to perform the method of operating a user device, UE, for a wireless communication system, wherein the UE is to communicate with the wireless communication system via at least one relay UE, the UE and the relay UE communicating over a sidelink interface, the method having the steps of: when communicating with the wireless communication system via the relay UE, e.g., when starting and/or during a communication, establishing, at the UE, a network control layer in its protocol stack, and the network control layer is to provide some control information, when said computer program is run by a computer.

BRIEF DESCRIPTION OF THE DRAWINGS

Embodiments of the present invention will be detailed subsequently referring to the appended drawings, in which:

FIG. 9 illustrates an embodiment of a protocol stack for a network control context establishment at a core network in accordance with embodiments of the first aspect of the present invention, wherein

FIG. 10 illustrates embodiments for a remote UE NAS context establishment at a CN using a UE-to-network relay CN, wherein

FIG. 13 illustrates embodiments of RRC messages including the DedicatedNASPC5-message container, wherein FIG. 13(a) illustrates an RRC reconfiguration sidelink message including the DedicatedNASPC5-message container, FIG. 13(d) illustrates an embodiment of a DedicatedNASPC5-message;

FIG. 16 illustrates an embodiment receiving CPP in accordance with the second aspect of the present invention by a UE being in-coverage, wherein

FIG. 18 illustrates embodiments of an authorization procedure using a data plane path of a 5GC network using CPP in accordance with the second aspect of the present invention, wherein

FIG. 19 illustrates embodiments of an authorization procedure through a control plane path using CPP in accordance with the second aspect of the present invention, wherein

FIG. 20 FIG. 20 illustrates embodiments of an authorization procedure using a non-3GPP access point in accordance with the second aspect of the present invention, wherein

DETAILED DESCRIPTION OF THE INVENTION

Embodiments of the present invention are now described in more detail with reference to the accompanying drawings in which the same or similar elements have the same reference signs assigned.

Figure 4:
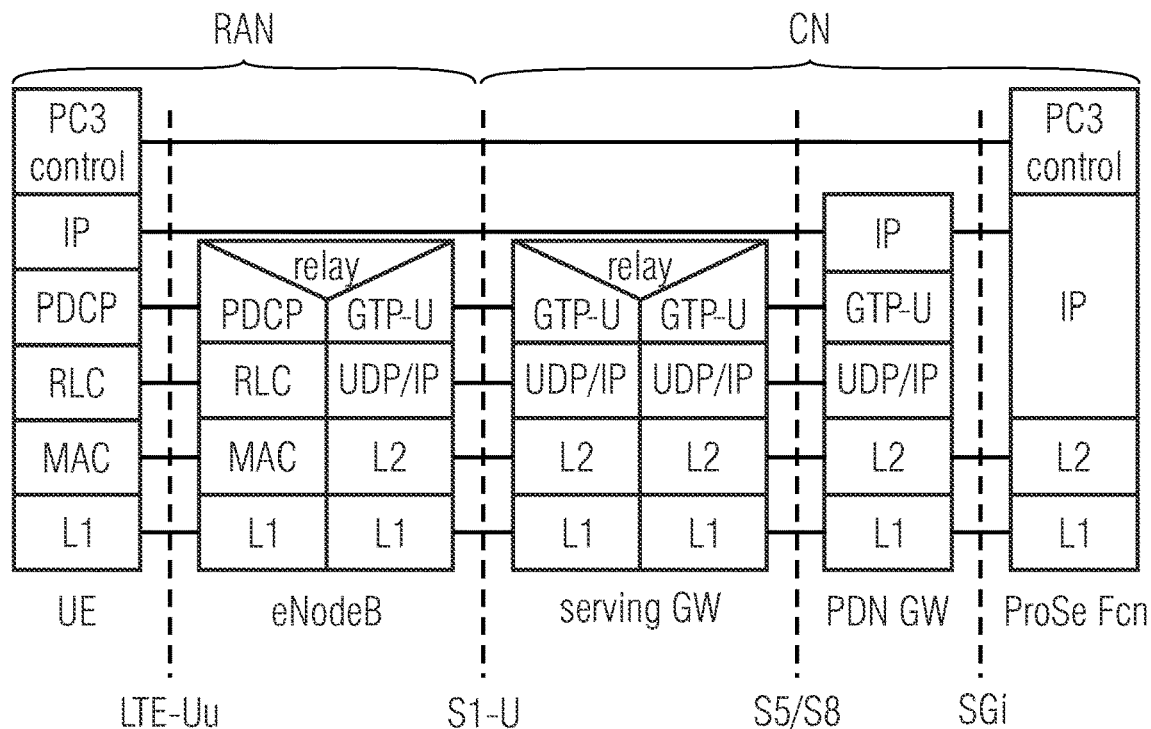
FIG. 4 illustrates the control plane, CP, protocol stack, PS, or the PC3 interface, as is described, for example, in 3GPP TS 23.303.
Figure 5:
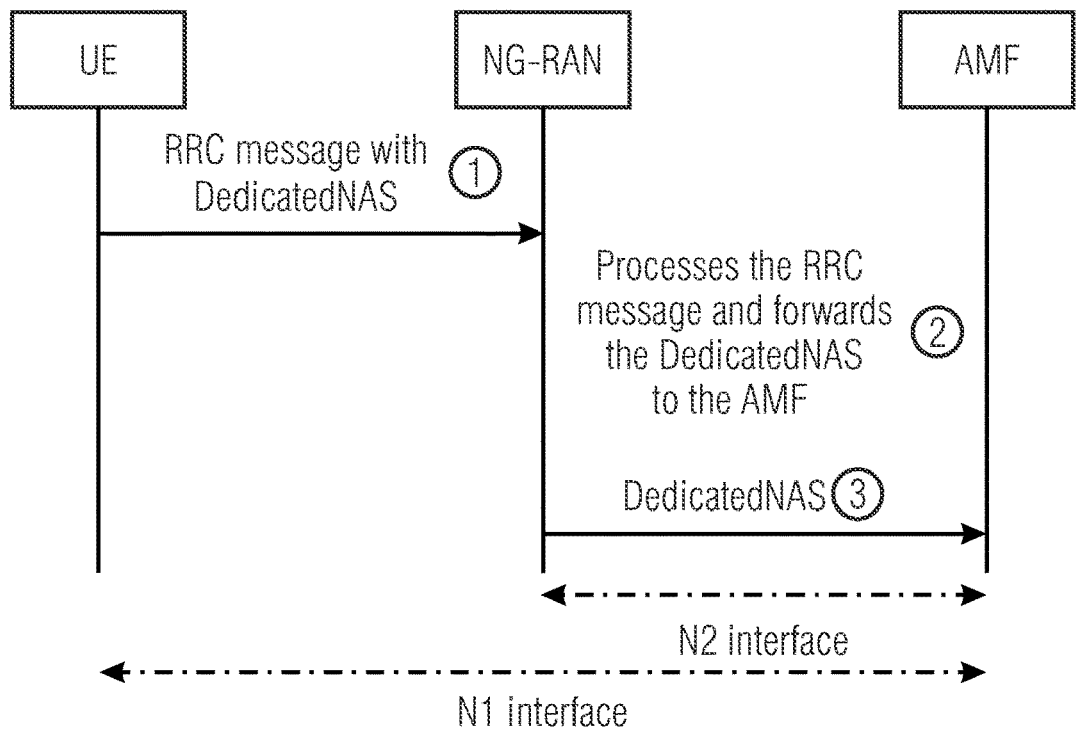
FIG. 5 illustrates the NAS signaling between the UE and the AMF of the core network.

In a wireless communication system or network as described above with regard to FIG. 1, FIG. 2 or FIG. 3, a UE is connected to the radio access network, like the gNB, which, in turn, is connected to the core network, CN. FIG. 4 illustrates the control plane, CP, protocol stack, PS, or the PC3 interface, as is described, for example, in 3GPP TS 23.303. As may be seen, the control signaling between the UE and the network is carried over the user plane, and there is no specific control context at the network, for example there is no non-access stratum, NAS, context at the network. In other words, there is no control signaling over the logical N1 interface between the UE and the core network, like the Access and Mobility Function, AMF, in the core network. When considering, for example, the NAS context, FIG. 5 illustrates the NAS signaling between the UE and the AMF of the core network. For signaling the NAS context to the core network, the UE sends @ an RRC message including a "DedicatedNAS" message. The RRC message is received at the radio access network, like the gNB, which processes @ the RRC message and forwards @ the DedicatedNAS message to the AMF. The DedicatedNAS message may be transported in the dedicated control channel, DCCH, within the RRC messages illustrated in FIG. 6.

Figure 6A:
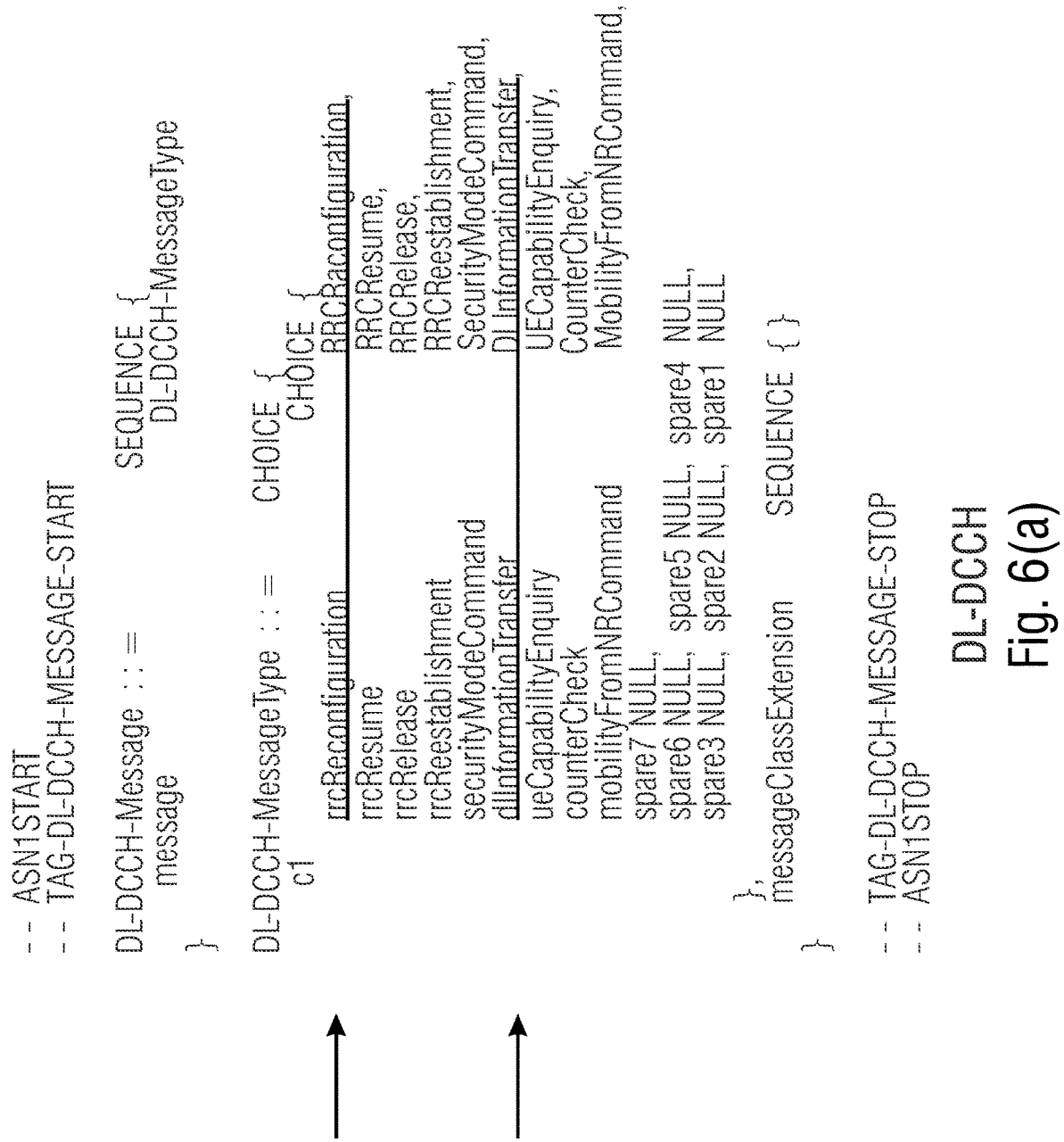
FIG. 6 illustrates examples of RRC messages including a DedicatedNAS message to be transported in a dedicated control channel, DCCH.

FIG. 6 illustrates RRC messages which carry the DedicatedNAS in the DCCH, more specifically, FIG. 6(a) illustrates a downlink, DL, DCCH, and FIG. 6(b) illustrates an uplink, UL, DCCH. In FIG. 6(a) and in FIG. 6(b) the RRC messages carrying the DedicatedNAS message are underlined. By means of the DedicatedNAS message the UE may transmit its own NAS information to the core network using the DedicatedNAS. However, when the UE is a remote UE communicating with a network via one or more relay UEs, there is no possibility for providing control information, like NAS information of the remote UE, to the core network. For example, when considering proximity-based services, ProSe, in an out-of-coverage, OOC, a UE or an in-coverage UE may enlist the services of another UE being in coverage for a communication with the network, i.e., the in-coverage UE may act as a relay. The UE which acts as a relay is also referred to as the UE-to-network relay or the relay UE, and the UE enlisting the help of the relay UE as referred to as the remote UE. In conventional approaches, relaying may be performed using L3 data forwarding and relaying. With this type of data forwarding, certain network information, like NAS information, of the remote UE does not exist at the core network, CN, for example at the AMF in the 5G core, 5GC, or at the mobility management entity, MME, in an Enhanced Packet Core, EPC. The control information may be employed for dealing with control plane, CP, aspects of the UE. For example, the NAS information may address certain control plane aspects of the UE, like mobility, authorization, session management or policy, e.g., through another network function, NF, for example the session management function, SMF. Without control information at the network, some or all of the CP related functions for the remote UE may not be performed from the network side and, conventionally are to be orchestrated by or via an application on the UE.

Figure 7:
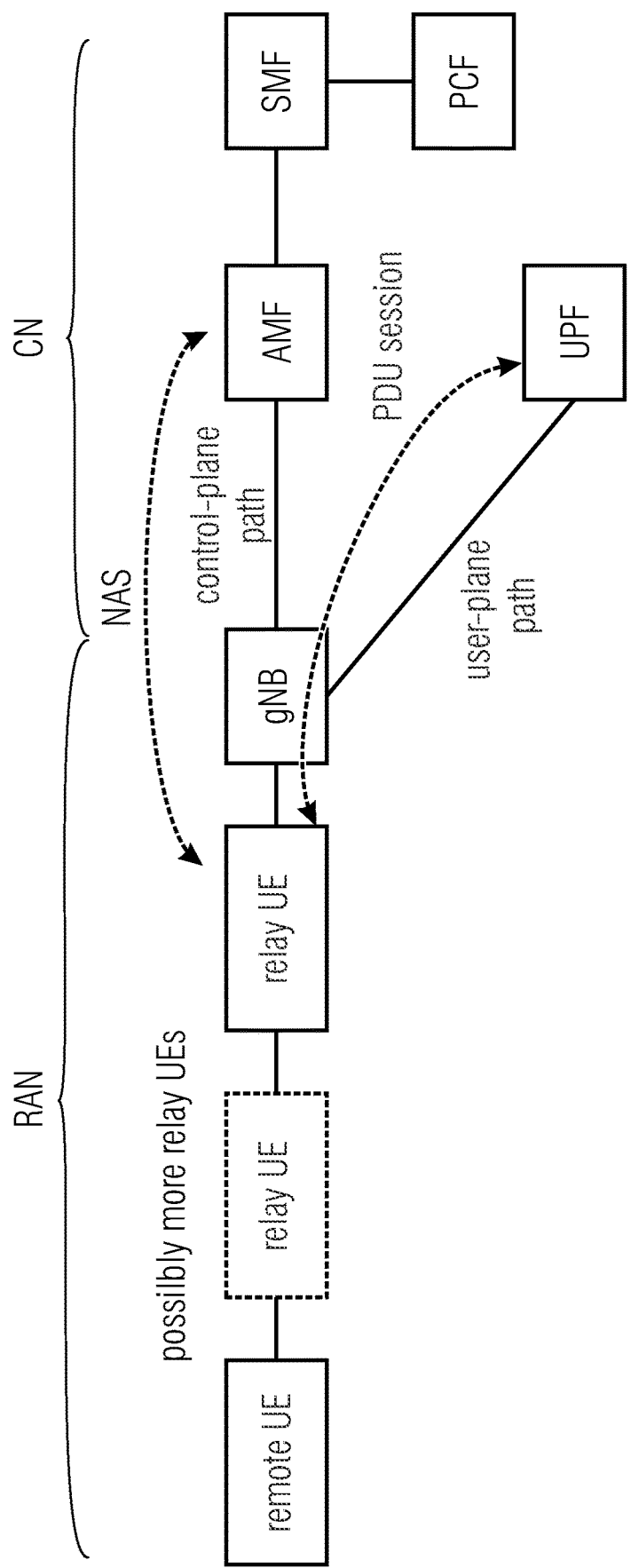
FIG. 7 schematically represents a situation of a remote UE communicating with a core network via one or more relay UEs.

FIG. 7 schematically represents a situation of a remote UE communicating with a core network via one or more relay UEs. In the example depicted in FIG. 7 the remote UE is connected to the gNB of the RAN via one or more relay UEs. The remote UE communicates with the relay UE over the sidelink interface. At the core network, the AMF, SMF and Policy Control Function, PCF, of the 5GC being part of the control-plane are illustrated as well as the Use Plane Function, UPF, of the 5GC being part of the user plane. A control signaling between the relay UE and the core network may employ the control plane protocol stack illustrated in FIG. 4. FIG. 7 illustrates the signaling of NAS information as an example for the control information signaling between the relay UE and the control elements of the core network, as is shown by the double headed arrow labelled "NAS". Data signaling between the relay UE and the CN is via the user plane path as is shown in FIG. 7 by the double headed arrow labelled "PDU session". As may be seen from FIG. 7, there is no network context, like NAS context, available at the core network for the remote UE. Any control related function needs to be orchestrated from an application via the user-plane path. For example, in case a certain control is to be carried out for the remote UE, the core network needs to signal this to the application so that the control information for the remote UE may be signaled via the relay UE using the user-plane path. When considering a conventional L3 UE-to-network relay and as control information the NAS information, in a conventional scenario, the NAS information of the remote UE, as depicted in FIG. 7, does not exist at the core network so that the remote network is not visible to the AMF and the SMF. The core network sees only the PDU session between the UPF and the relay UE as is depicted schematically in FIG. 7 by the double headed arrow labelled "PDU session". Note, that the aforementioned description is not limited to the case of a 5GC but also applies to a 4G core, like the EPC.

In view of this situation, the core network is not capable to support a session change with regard to the remote UE. In case there is a change in the path from the remote UE to the network, the network is not capable to update or modify the PDU session accordingly. For example, an update or modification of the PDU session may be necessary for one or more of the following cases:

a change of at least one relay UE, like the UE-to-relay network,
a change from a relay path to a direct path to a gNB, i.e., in case the remote UE, after being initially connected to the network via the relay UE, directly connects to the gNB,
a change from a direct path to a path including one or more relay UEs, i.e., in case a UE, which is currently connected directly to the gNB, connects via one or more relay UEs to the core network as depicted in FIG. 7,
adding one or more relay UEs to the path between the remote UE and the network,
removing one or more relay UEs from the path between the remote UE and the network,
a change in the number of relay UEs in the path.

Thus, in conventional approaches, from a networks point of view, the PDU session is only with the UE that is directly connected to the gNB, e.g., the relay UE depicted in FIG. 7. In case this UE changes, a new PDU session is established. Furthermore, conventionally the AMF and the SMF are not capable to associate a newly established PDU session with an existing or old PDU session and they have no knowledge that the new PDU session may be a continuation of an old PDU session. Thus, for the remote UE, the conventional L3 relay does not provide or support session continuity.

Embodiments of a first aspect of the present invention address the above-described drawbacks of a remote UE being connected to a core network via one or more relay UEs and not being visible with regard to certain control information, like the NAS information, to the core network.

Furthermore, in a wireless communication system or network as described above with reference to FIG. 1, or FIG. 2, or FIG. 3, for a UE to perform sidelink operations certain provisioning parameters are to be provided. For example, in case of a V2X communication using the PC5 interface or PC5 reference point the following sets of information may be provisioned, i.e., one or more of the following provisioning parameters may be provided, as is described, for example, in 3GPP TS 23.287:

an authorization policy,
radio parameters when the UE is "not served by E-UTRA" and "not served by NR", which include the radio parameters per PC5 RAT (i.e. LTE PC5, NR PC5) with geographical area(s) and an indication of whether they are "operator managed" or "non-operator managed"; the UE uses the radio parameters to perform V2X communications over the PC5 reference point when "not served by E-UTRA" and "not served by NR" only if the UE can reliably locate itself in the corresponding geographical area. Otherwise, the UE is not authorized to transmit,
policy/parameters when NR PC5 is selected,
a mapping of V2X service types (e.g. Provider Service Identifiers, PSIDs, or Intelligent Transport Systems Application Object Identifiers, ITS-AIDs) to V2X frequencies with geographical area(s),
a validity timer indicating the expiration time of the V2X policy/parameter,
a timestamp indicating when a policy/parameter becomes valid, or a delay, indicating when a policy/parameter becomes active with regard to the transmitted/received policy/parameter.

In case of a V2X communication over the PC5 reference point, a network operator may pre-configure a UE with the required provisioning parameters for a V2X communication without the need for the UE to connect to the 5GC to obtain the initial configuration. For example, as is described in 3GPP TS 23.287, the following applies with regard to the authorization and provisioning:

the provisioning parameters for V2X communications over the PC5 reference point may be configured in the Universal Integrated Circuit Card, UICC, in the mobile equipment, ME, or in both the UICC and the ME, the ME provisioning parameters shall not be erased when a UMTS Subscriber Identification Module, USIM, is deselected or replaced,
if both the UICC and the ME contain the same set of overlapping provisioning parameters, the set of parameters from the UICC shall take precedence, the provisioning parameters from the PCF shall take precedence over the pre-configured parameters in the ME and UICC,
the UE shall use radio resources for V2X communications over PC5 reference point as follows:
while a UE has a serving cell and is camped on a cell and the UE intends to use for V2X service the radio resources (i.e. carrier frequency) operated by this cell, then the UE shall use the radio resource description indicated by this cell the UE is camped on and ignore any radio resource description of the same radio resource provisioned in the ME or the UICC;
if the cell does not provide radio resources for V2X service, the UE shall not perform V2X message transmission and reception on radio resources operated by this cell,
if the UE intends to use "operator-managed" radio resources (i.e. carrier frequency) for V2X service that are not operated by the UE's serving cell, as specified in clause 5.1.2.1, or if the UE is out of coverage, the UE shall search for a cell in any Public Land Mobile Network, PLMN, that is operating the provisioned radio resources (i.e. carrier frequency) as defined in TS 36.300 and TS 36.304 (if LTE based PC5 is selected for the V2X communication) or as defined in TS 38.300 and TS 38.304 (if NR based PC5 is selected for the V2X communication), and:
if the UE finds such a cell in the registered PLMN or a PLMN equivalent to the registered PLMN, and authorization for V2X communications over PC5 reference point to this PLMN is confirmed, the UE shall use the radio resource description indicated by that cell; if that cell does not provide radio resources for V2X service, the UE shall not perform V2X message transmission and reception on those radio resources, if the UE finds such a cell but not in the registered PLMN or a PLMN equivalent to the registered PLMN, and that cell belongs to a PLMN authorized for V2X communications over PC5 reference point and provides radio resources for V2X service then the UE shall perform PLMN selection triggered by V2X communications over PC5 reference point as defined in TS 23.122; if the UE has an ongoing emergency session via IMS, it shall not trigger any PLMN selection due to V2X communication over PC5 reference point, if the UE finds such cell but not in a PLMN authorized for V2X communications over PC5 reference point the UE shall not use V2X communications over PC5 reference point;

if the UE does not find any such cell in any PLMN, then the UE shall consider itself "not served by NR or E-UTRA" and use radio resources provisioned in the ME or the UICC. If no such provision exists in the ME or the UICC or the provision does not authorize V2X communications over PC5 reference point, then the UE is not authorized to transmit, if the UE intends to use "non-operator-managed" radio resources (i.e. carrier frequency) for V2X service, according to TS 36.331 or TS 38.331 and as specified in clause 5.1.2.1, then the UE shall perform V2X communication over PC5 using resource provisioned in the ME or the UICC; if no such provision exists in the ME or the UICC or the provision does not authorize V2X communications over PC5 reference point, then the UE is not authorized to transmit, the UE provisioning shall support setting geographical areas, It is possible for a UE to use other radio resources for V2X service based on the geographical area instead of those operated by the serving NG-RAN cell, when provisioned in the UE, even if the UE's serving cell offers normal service and the SIBxy indicates that the service (V2X communication) is available. This is to cover the scenario when e.g. the radio resources used for V2X communications over PC5 reference point are not owned by the serving network of the UE.

When cross-carrier operation is supported, according to TS 36.331 or TS 38.331, a UE can be instructed by its serving cell to perform V2X communication over a different carrier frequency. The UE is still considered as "served by NR or E-UTRA" in this case.

The scenario that a cell is detected and the cell does not provide support for V2X communications over PC5 reference point when the UE attempts to use a carrier frequency configured for V2X communications over PC5 reference point, is considered a configuration error. Therefore, the UE does not transmit on that frequency to avoid interference to the network.

the V2X communications over PC5 reference point is only specified for E-UTRA and NR, When the UE is in coverage of a 3GPP RAT, it can for example, use information derived from the serving PLMN. When the UE is not in coverage of a 3GPP RAT, it can use other techniques, e.g. Global Navigation Satellite System (GNSS). User provided location is not a valid input.

Thus, as described above, provisioning parameters for a UE to perform sidelink operation may be provided in the mobile or user equipment, ME or UE, i.e., may be pre-configured within the mobile equipment, provided in the UICC, i.e., may be pre-configured using, for example, a SIM card, received over the Uu interface from the core network, e.g., by the policy and charging function, PCF, when the UE registers with the network, provided via sidelink by another UE, e.g. a relay UE.

The priority of usage of these provisioning parameters may be such that the parameters received over the Uu interface have the highest priority, the parameters in the UICC have the second highest priority, and the provisioning parameters in the ME have the third highest priority. However, irrelevant from where these provisioning parameters are used, the authorization or the right to use these provisioning parameters is reserved with the network, more specifically with policy and charging function, PCF, in a 5GC network. In other words, when the UE is interested to use these parameters to perform a sidelink data communication, the UE first needs to obtain authorization from the network to do so. However, in conventional approaches, a UE may not include such provisioning parameters or existing provisioning parameters may not be valid. For example, when the provisioning parameters are outdated or missing, the UE is not authorized to transmit on the sidelink interface until the parameters are provisioned to the UE. The UE is not allowed to use the stored provisioning parameters to obtain even an update of the provisioning parameters, like an update of the authorization and, optionally, of the policy, to perform a normal sidelink communication. This is a particular a problem for a UE that is out of coverage and does not have direct access to the core network of the PLMN or the wireless communication system.

Embodiments of a second aspect of the present invention address the problem of missing or invalid provisioning parameters prohibiting a UE from a sidelink communication and, thereby prohibiting the UE from even obtaining valid provisioning parameters authorizing the UE to perform sidelink operations. Embodiments provide approaches employing common or minimum provisioning parameters that may be used, for example, by all UEs for an initial access over the sidelink interface to allow the remote UE to obtain valid provisioning parameters. In other words, the common or minimum provisioning parameters may be provided for the entire wireless communication system and remain valid, i.e., they do not expire, so as to allow any UE including the common provisioning parameters to obtain from the network, via the sidelink communication, the necessary provisioning parameters for a full sidelink operation, thereby avoiding the drawback that a UE may not at all access a wireless communication network via a relay in case it has outdated or no provisioning parameters.

Figure 1A:
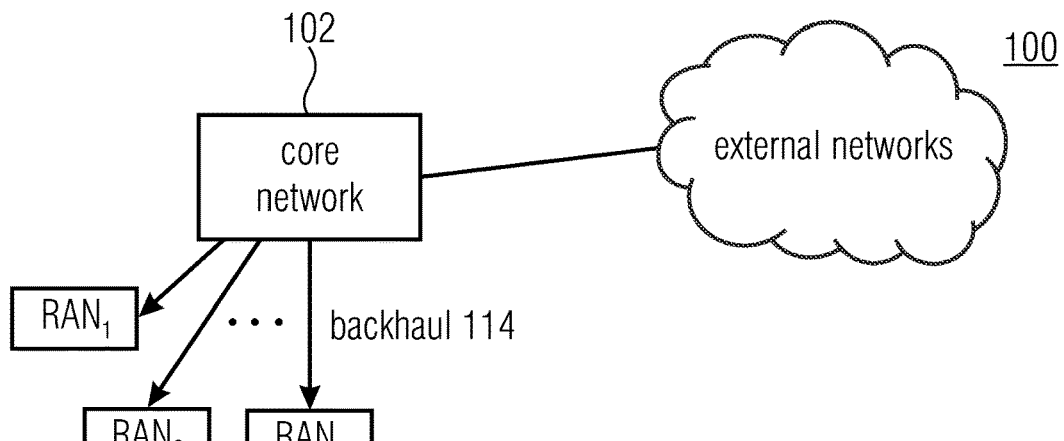
FIG. 1 shows a schematic representation of an example of a wireless communication system.
Figure 1B:
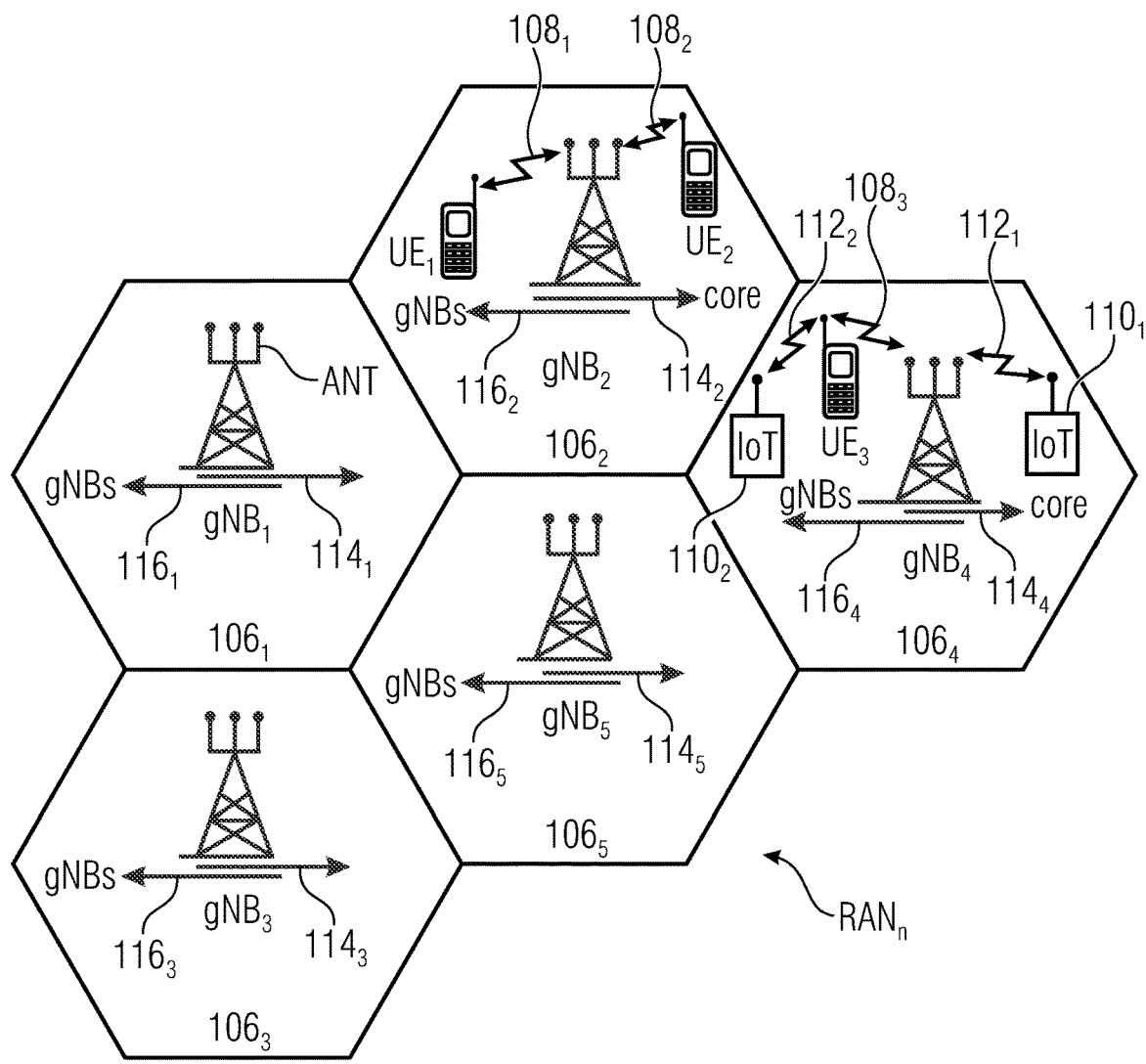
Figure 2:
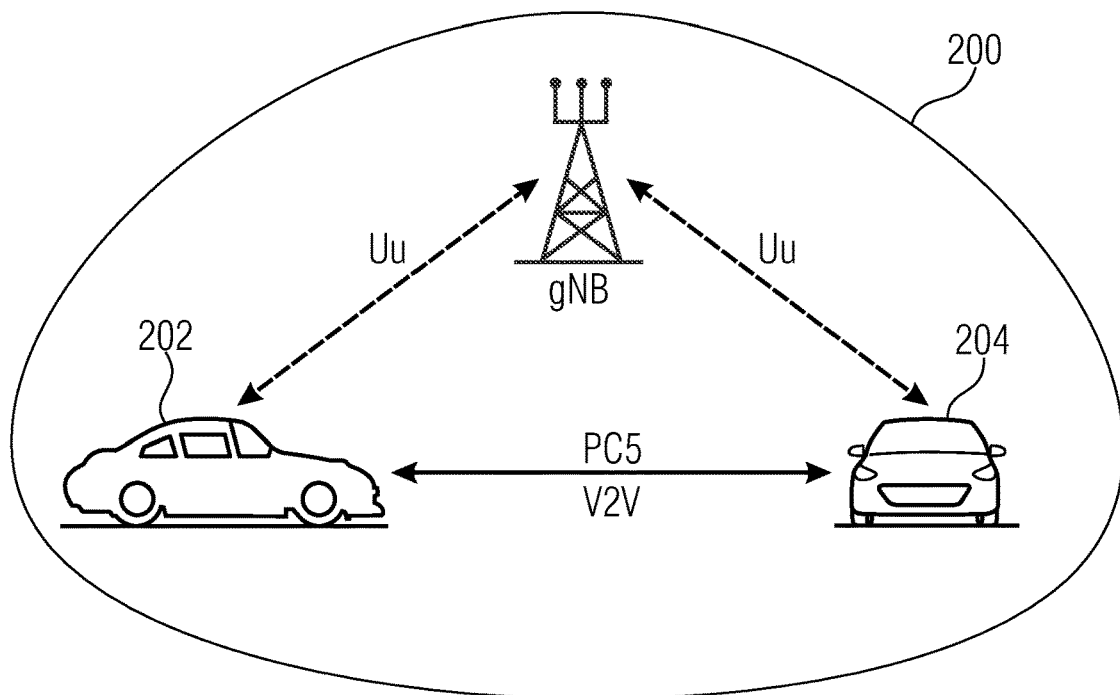
FIG. 2 is a schematic representation of an in-coverage scenario in which two UEs directly communicating with each other are both connected to a base station.
Figure 3:
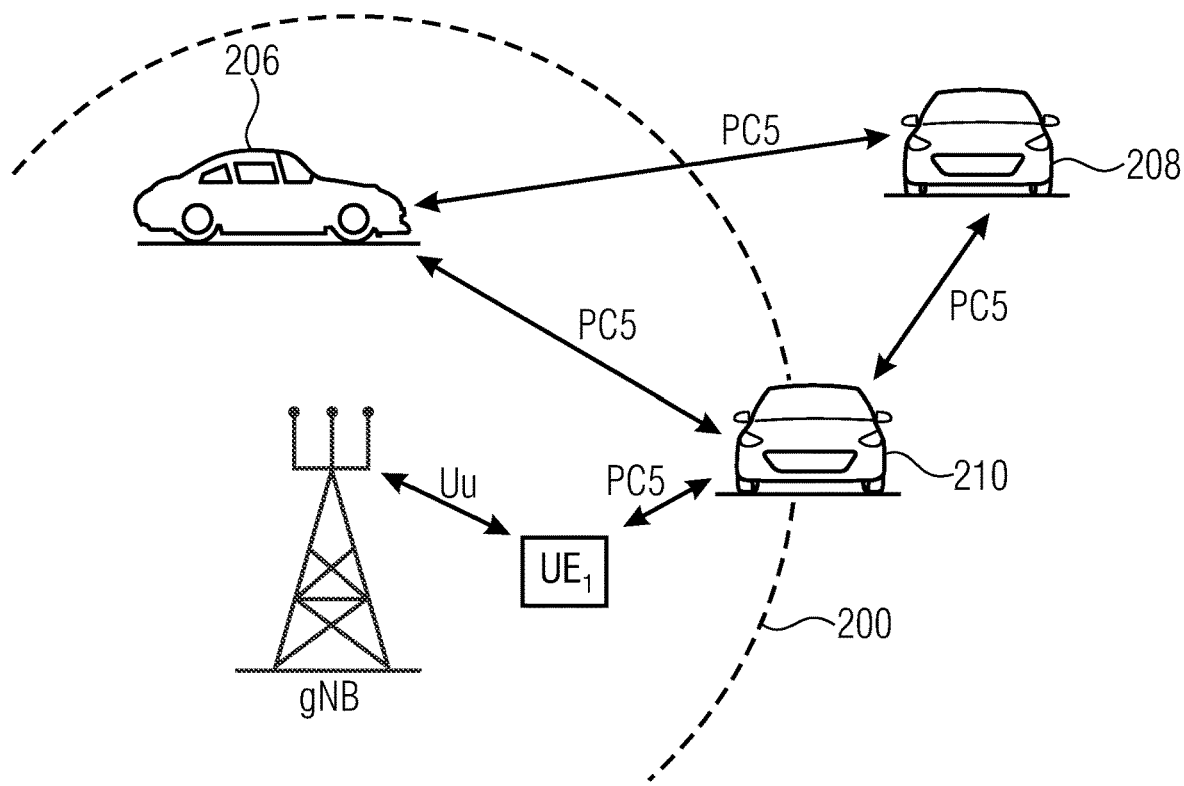
FIG. 3 is a schematic representation of an out-of-coverage scenario in which the UEs directly communicating with each other.
Figure 8:
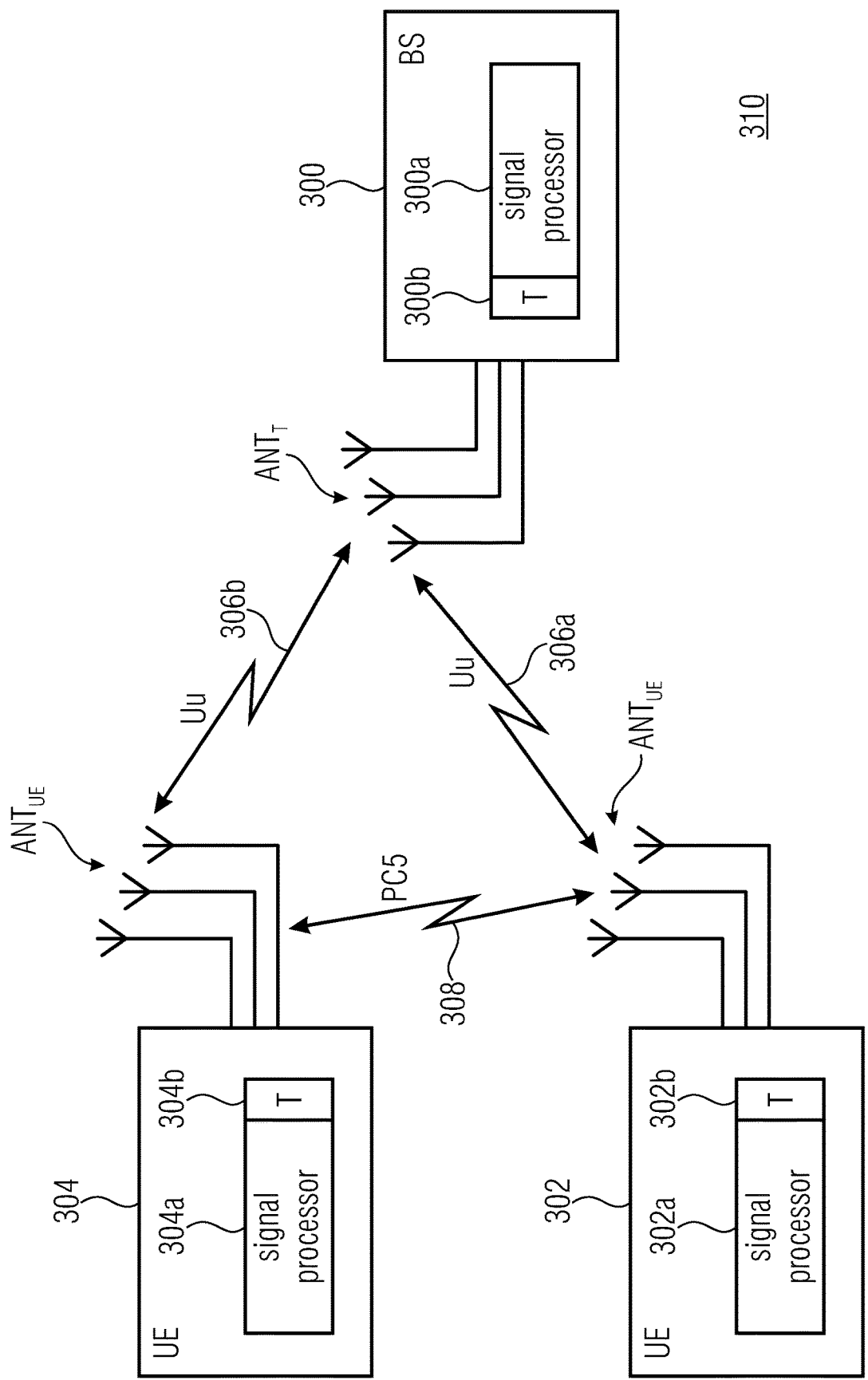
FIG. 8 is a schematic representation of a wireless communication system including a transmitter, like a base station, and one or more receivers, like user devices, UEs capable of operating in accordance with embodiments of the present invention.

The present invention provides approaches for implementing the above mentioned first and second aspects, and embodiments of the present invention may be implemented in a wireless communication system as depicted in FIG. 1, FIG. 2 or FIG. 3 including base stations and users, like mobile terminals or IoT devices. FIG. 8 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink (SL) interface. When the UEs are not served by the base station, are not be connected to a base station, for example, they are not in an RRC connected state, or, more generally, when no SL resource allocation configuration or assistance is provided by a base station, the UEs may communicate with each other over the sidelink (SL). The system or network of FIG. 8, the one or more UEs 302, 304 of FIG. 8, and the base station 300 of FIG. 8 may operate in accordance with the inventive teachings described herein.

First Aspect—Establishing a Network Control Layer

Remote UE

The present invention provides a user device, UE, for a wireless communication system,
  wherein the UE is to communicate with the wireless communication system via at least one relay UE, the UE and the relay UE communicating over a sidelink interface,
  wherein, when communicating with the wireless communication system via the relay UE, e.g., when starting and/or during a communication, the UE is to establish a network control layer in its protocol stack, and the network control layer is to provide some control information.

In accordance with embodiment, the network control layer is to provide the control information such that it is understood only at a core network, CN, of the wireless communication system.

In accordance with embodiment,
  the UE is to establish the network control layer autonomously or on its own, or
  the UE is to establish the network control layer responsive to signaling from the CN.

In accordance with embodiment,
  the UE is to establish the network control layer on its own, when the UE is out of coverage and connects to the relay UE, or when the UE is in coverage and is connected to a network via the relay UE, or
  the UE is to establish the network control layer responsive to signaling from the CN, when the UE is in coverage and switches to a connection to the wireless communication system over the relay UE.

In accordance with embodiment, the UE is to generate the control information and to transmit the control information over the sidelink interface to the relay UE either as data or in a control message, like a PC5 RRC message.

In accordance with embodiment, the UE is to generate the control information such that it is not understood by the one or more relay UEs and a radio access network, RAN, of the wireless communication system.

In accordance with embodiment, the UE is to receive a response of the CN to the control information over the sidelink interface from the relay UE, either as data or in a control message, like a PC5 RRC message.

In accordance with embodiment, when the response indicates a successful authorization, the UE is to receive one or more of the following in the response to the control information,
  IP information, like one or more IP addresses for a PDU/PDN session, e.g. a home address and one or more care-of addresses, information about an IP gateway, or information related to the Domain Name System, DNS,
  new or updated security information,
  DRX information,
  information related to service continuity,
  information related to session continuity,
  an ID or a tag indicating that the UE is authorized for the communication via the one or more relay UEs,
  one or more supported Service and Session Continuity, SSC, modes at the CN.

In accordance with embodiment, the UE is to maintain the received IP information in case of a certain event.

In accordance with embodiment, the event is one or more of:
  a change in the path between the remote UE and the CN,
  a change in the connection state of the remote UE,
  a change in the coverage state of the remote UE,
  a change of at least one relay UE,
  a change from a relay path to a direct path,
  a change from a direct path to a relay path,
  adding at least one relay UE to the path between the remote UE to the CN,
  removing at least one relay UE from the path between the remote UE to the CN,
  a change in the number of relay UEs in the path.

In accordance with embodiment, the UE is to maintain the received IP information unless updated by the CN.

In accordance with embodiment, when the response indicates a non-successful authorization, the UE is to receive one or more of the following in response to the control information,
  an indication that the control information was not established at the CN,
  an indication that the registration of the remote UE was rejected and/or failed at the CN,
  a cause for rejection and/or non-establishment,
  a re-attempt timer or prohibit timer.

In accordance with embodiment, responsive to receiving the cause for rejection and/or failure, the UE is to forward the cause to
  an application running on the UE, and/or
  another UE via a device-to-device communication, e.g. using the sidelink.

In accordance with embodiment, responsive to the re-attempt timer or the prohibit timer, the UE is to send the control information again after a re-attempt timer value or stop sending the control information for a time of the prohibit timer.

In accordance with embodiment, when the prohibit timer is set to a certain value, like infinity, the certain value prohibiting the UE from sending the control information at all or indefinitely.

In accordance with embodiment, when the UE is to send the control information as data over the sidelink interface to the relay UE, the UE is to associate the data with a tag, the tag allowing the relay UE to identify the data as the control information from the UE and to map the control information to a control message, like a DedicatedCONTROL message, from the relay UE to the CN.

In accordance with embodiment, the UE is to select the tag from a set of identification tags, e.g., in the form of a unique ID, a unique application ID, a unique network slice ID, a unique Layer-3 ID, a unique path ID or a predefined header included in the data packet including the control information.

In accordance with embodiment, when the UE is to send the control information in the control message, the control message includes a container to be populated only by the network control layer and the UE is to place the control information into the container.

In accordance with embodiment, the control message is a PC5 RRC message and the container is referred as to a DedicatedCONTROLPC5-Message, the DedicatedCONTROLPC5-Message to be mapped by the relay UE to a control message, like a DedicatedCONTROL message, from the relay UE to the CN.

In accordance with embodiment, the UE is configured or pre-configured with common provisioning parameters for use when the UE is out of coverage and has no other valid provisioning parameters for a sidelink communication over the sidelink interface.

In accordance with embodiment, the common provisioning parameters allow the UE to obtain or update provisioning parameters and/or an authorization and/or a configuration for performing a sidelink communication over the sidelink interface.

In accordance with embodiment, once the UE is successfully registered with the CN, it is capable of receiving one or more paging messages from the CN via the one or more relay UEs, e.g. a remote UE in an EC-idle state using a NAS message, like a push notification.

Relay UE

The present invention provides a user device, UE, for a wireless communication system,
  wherein the UE is to act as a relay UE for a communication between a remote UE and the wireless communication system, the UE and the remote UE communicating over a sidelink interface, and
  wherein the UE is to receive from the remote UE control information over the sidelink interface, either as data from the remote UE or in a control message from the remote UE, like a PC5 RRC message.

In accordance with embodiment,
  the UE is to map the control information to a control message to the CN, like a DedicatedCONTROL message, and
  the UE is to transmit the control message including the control information of the remote UE to the CN.

In accordance with embodiment, the control information is understood only at a core network, CN, of the wireless communication system.

In accordance with embodiment, the remote UE is a UE for a wireless communication system,
  wherein the UE is to communicate with the wireless communication system via at least one relay UE, the UE and the relay UE communicating over a sidelink interface,
  wherein, when communicating with the wireless communication system via the relay UE, e.g., when starting and/or during a communication, the UE is to establish a network control layer in its protocol stack, and the network control layer is to provide some control information.

In accordance with embodiment, the UE is to receive from the CN a response of the CN to the control information, and wherein the UE is to transmit over the sidelink interface the response to the remote UE, either as data or in a control message, like a PC5 RRC message.

In accordance with embodiment,
  the control information is received as data from the remote UE, directly or via one or more further relay UEs, and has associated therewith a tag, and
  the UE is to identify received data from the remote UE as the control information from the remote UE using the tag, and to map the control information to the control message to the CN.

In accordance with embodiment,
  when the control information is received in the control message from the remote UE, the control message includes a container including the control information, and
  the UE is to map the container to the control message to the CN.

Remote/Relay UE

In accordance with embodiment,
  the relay UE comprises a first entity that is capable of operating with the wireless communication system, like 3GPP access, and/or second entity that is capable of operating with a different wireless communication system, like non-3GPP access, and
  the sidelink interface provides a direct link to the first entity, e.g., via a PC5 interface and/or PC3 interface, or a direct link to the second entity, e.g., via the WiFi interface and/or WiFi direct interface.

In accordance with embodiment, the control information includes one or more of:
  a NAS message, e.g., Registration or Service message, of the UE to be stored at the CN, e.g. as a part or whole of the NAS information, wherein the response message from the CN indicates that the NAS message is accepted or rejected by the CN,
  PLMN information that the UE was previously associated with, if the UE is out-of-coverage,
  current PLMN information,
  a unique UE ID assigned from the application,
  a network slice ID, e.g. as part of the NSSAI,
  a group ID of the UE,
  a QoS profile requested by the application,
  a location.
  an old PDU/PDN session information,
  a current PDU/PDN session information
  assistance information.

In accordance with embodiment, the NAS information stored at the CN, includes one or more of:
  a UE ID,
  a relay UE ID,
  IP information/address,
  DRX information,
  a policy/authorization/subscription,
  NAS security information,
  a QoS profile,
  tracking area information,
  a NAS information validity, like a validity timer associated with the NAS information of the UE,
  in case an active PDU/PDN session exists, a PDU session ID,
  in case an active PDU/PDN session exists, an indication that the UE is in an EC-connected state,
  in case no active PDU/PDN session exists, an indication that the UE is in an EC-idle state.

In accordance with embodiment, the assistance information includes one or more of:
  a preferred EC state of the UE,
  DRX information, like a length of a DRX cycle, a period of a DRX cycle or a shift of a DRX cycle,
  an indication of one or more applications the UE is capable to support,
  one or more QoS levels supported by the UE,
  a preferred and/or supported network slice,
  one or more preferred services for which the UE is to be paged, like IMS voice messages or VoLTE messages.
  a preferred Service and Session Continuity, SSC, mode.

Core Network

The present invention provides a core network, CN, of a wireless communication system,
  wherein the CN is to communicate with a remote UE of the wireless communication system via at least one relay UE, the UE and the relay UE communicating over a sidelink interface,
  wherein, when communicating with the remote UE via the relay UE e.g., when starting and/or during a communication, the CN is to establish a network control layer in its protocol stack, and the network control layer is to provide control information.

In accordance with embodiment, the control information is understood only at the CN.

In accordance with embodiment,
  the CN is to establish the network control layer responsive to receiving the control information from the remote UE, or
  the CN is to establish the network control layer on its own.

In accordance with embodiment,
  the CN is to establish the network control layer responsive to receiving the control information from the remote UE, when the remote UE is out of coverage and connects to the relay UE, or
  the CN is to establish the network control layer autonomously or on its own, when the UE is in coverage and switches to a connection to the wireless communication system over the relay UE.

In accordance with embodiment, the CN is to transmit to the relay UE a response of the CN to the control information, the response to be relayed to the remote UE over the sidelink interface either as data or in a control message like a PC5 RRC message.

In accordance with embodiment,
  the CN, the relay UE and the remote UE belong to the same wireless communication system, like the same PLMN, or
  the CN, the relay UE and the remote UE belong to different wireless communication systems, like different PLMNs, or
  the remote UE belongs to a wireless communication system, like a first or home PLMN, different form the wireless communication system, like a second or visitor PLMN, to which the CN and the relay UE belong to, or
  the relay UE belongs to a wireless communication system different form the wireless communication system to which the CN and the remote UE belong to.

In accordance with embodiment, the CN is to
  check for a remote UE authorization before establishing the network control layer in its protocol stack, and/or send a response to the remote UE.

In accordance with embodiment,
responsive to a successful remote UE authorization, the CN is to store the control information from the remote UE, thereby placing the remote UE in an extended coverage, EC, state, and/or
  responsive to a non-successful remote UE authorization, the CN is to discard the control information from the remote UE.

In accordance with embodiment, responsive to a successful remote UE authorization, the CN is to transmit to the relay UE the response indicating that its control information is established in the CN, wherein the response may include, for example, one or more of the following:
  internet protocol, IP, information,
  new or updated security information,
  information related to service continuity, e.g., information to facilitate service and/or session continuity,
  information related session continuity,
  DRX information.

In accordance with embodiment,
responsive to a non-successful remote UE authorization, the CN is to transmit to the relay UE a response,
  wherein the response includes, for example, one or more of the following:
    an indication that the control information of the remote UE is not established at the CN,
    an indication that the registration of the remote UE is rejected and/or failed by the CN,
    a cause for rejection/non-establishment,
    a re-attempt or prohibit timer, i.e., how long should the UE wait to try again.

In accordance with embodiment, the CN is to obtain, in addition to the control information from the remote UE, policy and/or authorization and/or subscription information for the remote UE from one or more entities of the CN.

In accordance with embodiment, the control information includes one or more of:
  a NAS message e.g., Registration or Service message of the UE to be stored at the CN, e.g. as a part or whole of the NAS information, wherein the response message from the CN indicates that the NAS message is accepted or rejected by the CN,
  PLMN information that the UE was previously associated with, if the UE is out-of-coverage,
  current PLMN information,
  a unique UE ID assigned from the application,
  a unique network slice ID,
  a group ID of the UE,
  a QoS profile requested by the application,
  a location,
  old PDU/PDN session information,
  current PDU/PDN session information.

In accordance with embodiment, the NAS information stored at the CN, includes one or more of:
  a UE ID,
  a relay UE ID,
  IP information/address,
  DRX information,
  a policy/authorization/subscription,
  NAS security information,
  a QoS profile,
  tracking area information,
  a NAS information validity, like a validity timer is associated with the NAS information of the UE,
  in case an active PDU session exists, a PDU session ID,
  in case an active PDU session exists, an indication that the UE is in an EC-connected state,
  in case no active PDU session exists, an indication that the UE is in an EC-idle state.

In accordance with embodiment, the CN is to update or modify the NAS information responsive to a certain event.

In accordance with embodiment, the certain event includes one or more of:
- a change in the path between the remote UE and the CN,
- a change in the connection state of the remote UE,
- a change in the coverage state of the remote UE
- a change of at least one relay UE,
- a change from a relay path to a direct path,
- a change from a direct path to a relay path,
- adding at least one relay UE to the path between the remote UE to the CN,
- removing at least one relay UE from the path between the remote UE to the CN,
- a change in the number of relay UEs in the path.

In accordance with embodiment, core network, CN, comprises
- a first network entity, e.g. AMF or MME, for providing an indication including one or more of the NAS parameters,
- a second network entity responsible for session management and session update, e.g. SMF/MME,
- wherein the second network entity is to receive from the first network entity the indication including the one or more of the NAS parameters.

In accordance with embodiment, responsive to the certain event, the second network entity is to use the one or more of the NAS parameters to update or modify an existing PDU session, and/or to provide for a service/session continuity, and/or to perform a QoS management.

In accordance with embodiment,
- the relay UE comprises a first entity that is capable of operating with the wireless communication system, like 3GPP access, and/or second entity that is capable of operating with a different wireless communication system, like non-3GPP access, and
- the sidelink interface provides a direct link to the first entity, e.g., via a PC5 interface and/or PC3 interface, or a direct link to the second entity, e.g., via the WiFi interface and/or WiFi direct interface In accordance with embodiment, upon successful registration of the remote UE, the CN is capable of doing one or more of:
- generating a paging message, e.g., as a NAS message or a NAS notification, and/or
- paging the remote UE via the one or more relay UEs, e.g., a remote UE in an EC-idle state using a NAS message, like a push notification.

System

In accordance with embodiment a wireless communication system, comprising:
- a core network, CN, in accordance with embodiments of the present invention,
- one or more relay user devices, relay UEs, in accordance with embodiments of the present invention, and
- one or more remote user devices, remote UEs, in accordance with embodiments of the present invention.

In accordance with embodiment, the wireless communication system comprises one or more base stations, wherein the base station comprises one or more of a macro cell base station, or a small cell base station, or a central unit of a base station, or a distributed unit of a base station, or a road side unit (RSU), or a UE, or a group leader (GL), or a relay or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

In accordance with embodiment, the remote UE and/or the relay UE comprises one or more of a mobile terminal, or a stationary terminal, or a cellular IoT-UE, or a vehicular UE, or a vehicular group leader (GL) UE, or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Methods

The present invention provides a method of operating a user device, UE, for a wireless communication system, wherein the UE is to communicate with the wireless communication system via at least one relay UE, the UE and the relay UE communicating over a sidelink interface, the method comprising:
- when communicating with the wireless communication system via the relay UE, e.g., when starting and/or during a communication, establishing, at the UE, a network control layer in its protocol stack, and the network control layer is to provide some control information.

The present invention provides a method of operating a user device, UE, for a wireless communication system, wherein the UE is to act as a relay UE for a communication between a remote UE and the wireless communication system, the UE and the remote UE communicating over a sidelink interface, the method comprising:
- receiving, at the UE, from the remote UE control information over the sidelink interface, either as data from the remote UE or in a control message from the remote UE, like a PC5 RRC message.

The present invention provides a method of operating a core network, CN, of a wireless communication system, wherein the CN is to communicate with a remote UE of the wireless communication system via at least one relay UE, the UE and the relay UE communicating over a sidelink interface, the method comprising:
- when communicating with the remote UE via the relay UE e.g., when starting and/or during a communication, establishing, at the CN, a network control layer in its protocol stack.

Second Aspect—Sidelink/Relay Services Authorization

User Device

The present invention provides a user device, UE, for a wireless communication system,
- wherein the UE is to communicate with one or more UEs over a sidelink interface,
- wherein the UE is configured or pre-configured with common provisioning parameters for use when the UE is out of coverage and has no other valid provisioning parameters for a sidelink communication over the sidelink interface, the common provisioning parameters allowing the out of coverage UE to obtain an authorization for the UE to perform a sidelink communication over the sidelink interface.

In accordance with embodiment, the common provisioning parameters comprises predefined or fixed communication parameters.

In accordance with embodiment, the predefined transmission parameters include one or more of:
- pre-authorized resources of the sidelink interface on which the out of coverage UE may transmit,
- a pre-defined or fixed RRC-layer configuration to be used when using CPP, the RRC-layer configuration also including lower layer configurations,
- pre-defined or fixed QoS levels,
- pre-defined or fixed MCS levels.

In accordance with embodiment, obtaining the authorization includes activating provisioning parameters existing in the UE or obtaining provisioning parameters for the UE to perform sidelink communication.

In accordance with embodiment, the provisioning parameters include one or more of the following:
- one or more policy(ies),
- one or more configuration parameters,
- authorization, like to connect to the network, and/or to communicate over sidelink, and/or to use a certain frequency band in a certain geographical area,
- a location, like GPS coordinates/fence, a zone, a paging area, a cell-ID, a country, a PLMN,
- a frequency, like a carrier frequency, a bandwidth part, a resource pool, a subchannel, a PRB, band information, e.g., ITS/ISM band (unlicensed)/non-ITS band (licensed),
- a duration,
- a validity,
- a start time,
- a priority, e.g., if the UE receives a config with higher priority, the UE overwrites this config, which may be an update or a deletion.

In accordance with embodiment the common provisioning parameters are stored in
- a memory of the UE, e.g., hardwired, or
- in a Universal Integrated Circuit Card, UICC, or a subscriber identities module, SIM, like a universal Subscriber Identity Module, USIM, card, an universal integrated circuit card, ICC, an embedded Subscriber Identity Module.

In accordance with embodiment, the UE is to receive, e.g., over the Uu interface, from a core network entity, like the PCF, the common provisioning parameters when the UE registers with the wireless communication network.

In accordance with embodiment, the UE is to receive, e.g., over the Uu interface, from a core network entity, like the PCF, an update for the pre-configured or configured common provisioning parameters when the UE registers with the wireless communication network.

In accordance with embodiment, the common provisioning parameters are
- universal in the sense that they are not bound to a particular geographical region, area or location, or
- non-universal in the sense that they vary based on a particular geographic location, area or country.

In accordance with embodiment, responsive to obtaining authorization, the UE is to perform the sidelink communication over the sidelink interface.

In accordance with embodiment,
- the UE is to generate a registration request, the registration request being understood only at a core network, CN, of the wireless communication system and causing the CN to check for the authorization of the UE, and
- the UE is to transmit the registration request using the predefined or fixed communication parameters as defined by the common provisioning parameters over the sidelink interface to a relay UE either as data or in a control message, like a PC5 RRC message.

In accordance with embodiment, the UE is to receive over the sidelink interface from the relay UE the authorization from the CN.

In accordance with embodiment, the UE is to send the registration request as data over the sidelink interface to the relay UE.

In accordance with embodiment, when the relay UE is to forward the registration request to the CN as data, the UE is to associate the data with a tag, the tag allowing the relay UE to identify the data as the registration request from the UE and to map the registration request to a control message, like a DedicatedCONTROL message, from the relay UE to the CN.

In accordance with embodiment, the relay UE is to forward the registration request to the CN using a control message or as data.

In accordance with embodiment, when the UE is to send the registration request in the control message, the control message includes a container and the UE is to place the registration request into the container to be mapped by the relay UE to a control message, like a DedicatedCONTROL message, from the relay UE to the CN.

In accordance with embodiment, the relay UE is
- a UE of the wireless communication system so as to form a 3GPP access point, or
- a UE of a system different from the wireless communication system so as to form a non-3GPP access point to which the CN of the wireless communication system is connected, e.g., using the Non-3GPP Inter-Working Function, N3IWF.

In accordance with embodiment,
- the CN, the relay UE, when being a 3GPP access point, and the remote UE belong to the same wireless communication system, like the same PLMN, or
- the remote UE belongs to a wireless communication system, like a first or home PLMN, different form the wireless communication system, like a second or visitor PLMN, to which the CN and the relay UE, when being a 3GPP access point, belong to, wherein to check for a remote UE authorization, the CN is to contact the core network of the wireless communication system which the remote UE belongs to.

In accordance with embodiment, responsive to a successful authorization, the UE is to establish a network control layer in its protocol stack, the network control layer to provide control information being understood only at a core network, CN, of the wireless communication system.

In accordance with embodiment, the UE is to generate the control information and to transmit the control information over the sidelink interface to the relay UE either as data or in a control message, like a PC5 RRC message.

In accordance with embodiment, the UE is to include into the registration request the control information.

In accordance with embodiment, the control information includes one or more of:
- a NAS message e.g., Registration or Service message of the UE to be stored at the CN, e.g. as a part or whole of the NAS information, wherein the response message from the CN indicates that the NAS message is accepted or rejected by the CN,
- PLMN information that the UE was previously associated with, if the UE is out-of-coverage, current PLMN information,
a unique UE ID assigned from the application,
a group ID of the UE,
a QoS profile requested by the application,
a location,
old PDU/PDN session information,
current PDU/PDN session information
assistance information.

In accordance with embodiment, the assistance information includes one or more of:
a preferred EC state of the UE,
DRX information, like a length of a DRX cycle, a period of a DRX cycle or a shift of a DRX cycle,
an indication of one or more applications the UE is capable to support,
one or more QoS levels supported by the UE,
a preferred and/or supported network slice,
one or more preferred services for which the UE is to be paged, like IMS voice messages or VoLTE messages.
a preferred Service and Session Continuity, SSC, mode.

In accordance with embodiment, once the UE is successfully registered with the CN, it is capable of receiving one or more paging messages from the CN via the one or more relay UEs, e.g. a remote UE in an EC-idle state using a NAS message, like a push notification.

In accordance with embodiment,
the relay UE comprises a first entity that is capable of operating with the wireless communication system, like 3GPP access, and/or second entity that is capable of operating with a different wireless communication system, like non-3GPP access, and
the sidelink interface provides a direct link to the first entity, e.g., via a PC5 interface and/or PC3 interface, or a direct link to the second entity, e.g., via the WiFi interface and/or WiFi direct interface System In accordance with embodiment a wireless communication system, comprises:
a core network, CN,
one or more relay user devices, relay UEs, and
one or more remote user devices, remote UEs, in accordance with embodiments of the present invention.

In accordance with embodiment, the wireless communication system comprises one or more base stations, wherein the base station comprises one or more of a macro cell base station, or a small cell base station, or a central unit of a base station, or a distributed unit of a base station, or a road side unit (RSU), or a UE, or a group leader (GL), or a relay or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

In accordance with embodiment, the remote UE and/or the relay UE comprises one or more of a mobile terminal, or a stationary terminal, or a cellular IoT-UE, or a vehicular UE, or a vehicular group leader (GL) UE, or an IoT or narrowband IoT, NB-IoT, device, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Methods

The present invention provides a method of operating a user device, UE, for a wireless communication system, wherein the UE is to communicate with one or more UEs over a sidelink interface, the method comprising:
configuring or pre-configuring the UE with common provisioning parameters for use when the UE is out of coverage and has no other valid provisioning parameters for a sidelink communication over the sidelink interface, the common provisioning parameters allowing the out of coverage UE to obtain an authorization for the UE to perform a sidelink communication over the sidelink interface.

Computer Program Product

Embodiments of the present invention provide a computer program product comprising instructions which, when the program is executed by a computer, causes the computer to carry out one or more methods in accordance with the present invention.

First Aspect—Establishing Controlled Context at the Core Network

In accordance with embodiments of the present invention, approaches are provided for avoiding the above described conventional situations in which a remote UE is invisible at the core network. In accordance with embodiments of the first aspect, the remote UE, when communicating with the core network over one or more relays, e.g., when starting the communication or during the communication with the core network, CN, via the relay UE, establishes in its protocol stack a network control layer so as to provide control information for the core network. In accordance with embodiments, the CN, using the control information, may establish a control context. In accordance with further embodiments, the remote UE may provide control information for the core network in such a way that the control information is only understood by the core network. The control information may cause the core network to establish a corresponding network layer in the protocol stack, PS. The core network may establish the network control layer in its protocol stack once it received respective control information associated with the remote UE. On the other hand, in accordance with other embodiments, the core network may initially establish the network control layer, for example in case a certain UE changes from a direct path to a connection via a relay UE, i.e. in case a directly connected UE becomes a remote UE. When such a path change is detected, the core network may establish the network control layer in its protocol stack and send a corresponding message to the remote UE which then, in turn, establishes also a network control layer.

Figure 9A:
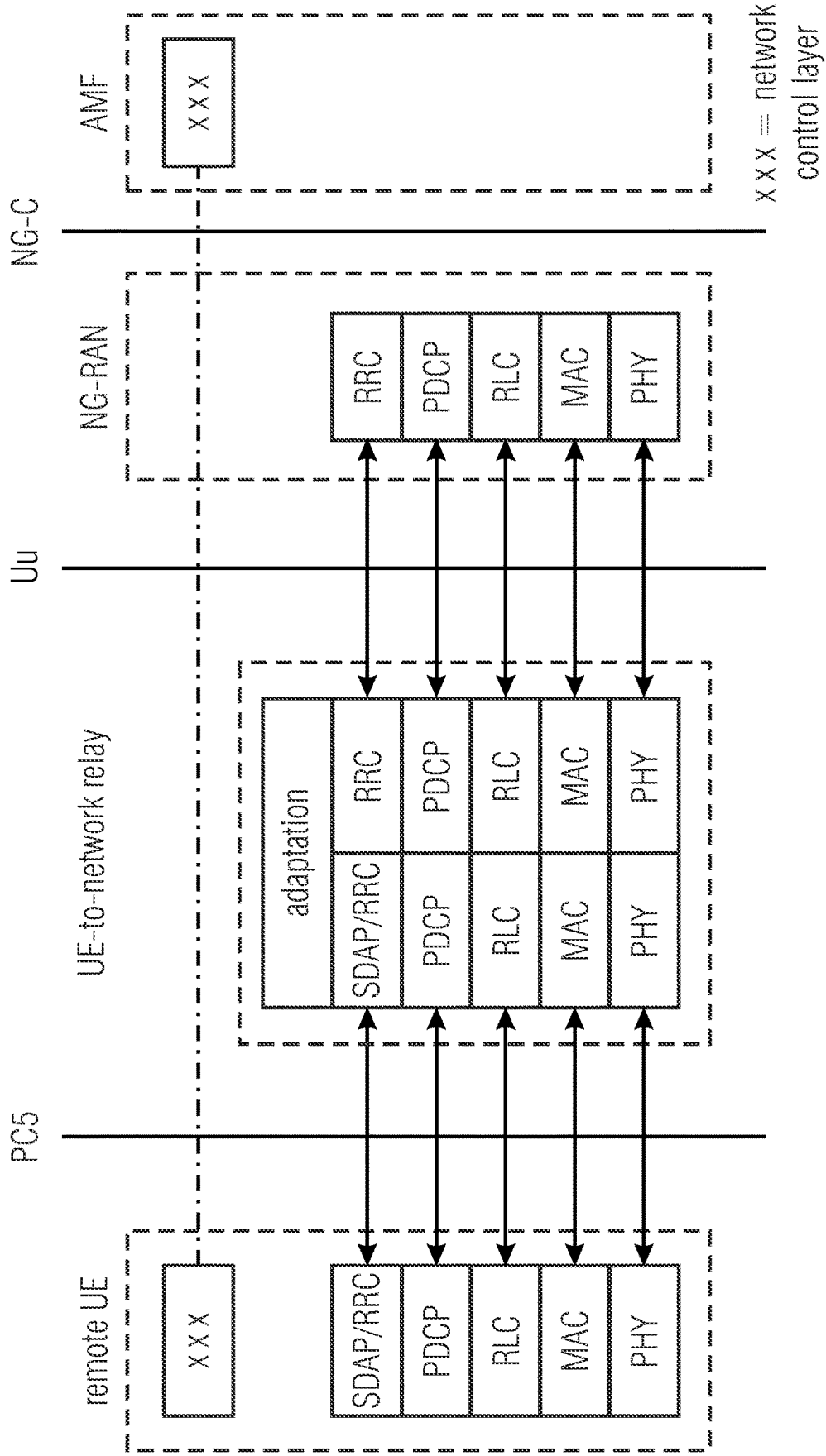
FIG. 9(a) shows a single-hop relay scenario.
Figure 9B:
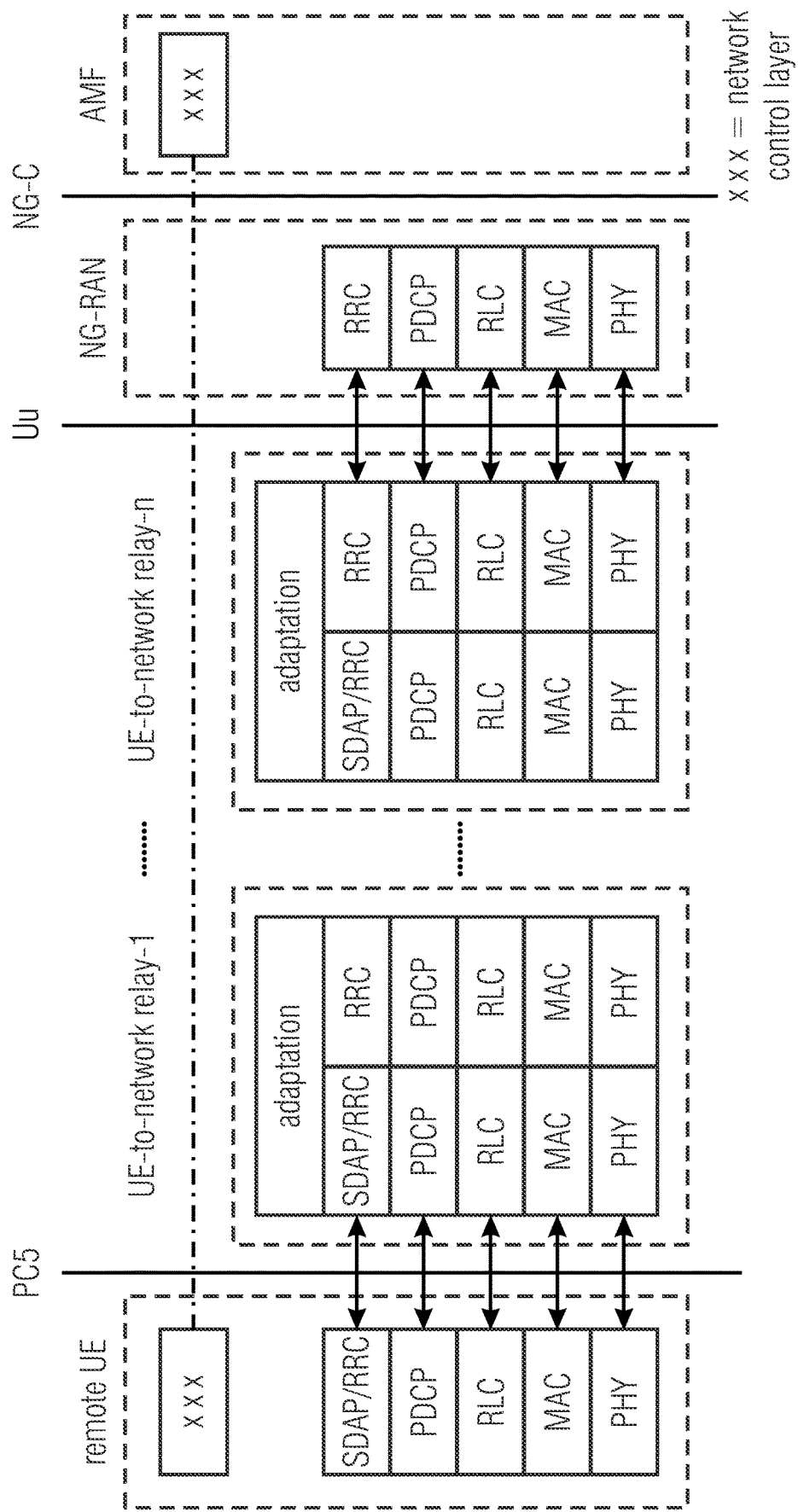
FIG. 9(b) shows a multi-hop-relay scenario.

FIG. 9 illustrates an embodiment of a protocol stack for a network control context establishment at a core network in accordance with embodiments of the first aspect of the present invention. FIG. 9(a) shows a single-hop relay scenario, and FIG. 9(b) shows a multi-hop-relay scenario. In FIG. 9(a) the remote UE communicates with the wireless communication network via a single UE-to-network relay or a single relay UE. The conventional protocol stacks existing in the remote UE, in the relay UE and the NG-RAN, like in the gNB, are illustrated. In accordance with embodiments of the first aspect of the present invention, in addition to the conventional layers in the remote UE, namely the Service Data Adaptation Protocol/Radio Resource Connection, SDAP/RRC, layer, the Packet Data Control Protocol, PDCP, layer, the Radio Link Control, RLC, layer, the Media Access Control, MAC, layer and the physical, PHY, layer, an additional network control layer is established for a direct signaling of network control information between the remote UE and the core network, like the AMF, at which also a network control layer is established in accordance with the present invention. The protocol stack in the UE-to-network relay includes the conventional layers, namely the SDAP/RRC layer, the PDCP layer, the RLC layer, the MAC layer and the PHY layer. In addition, in accordance with embodiments, an adaptation layer is provided the functionality of which is described in more detail below. The gNB includes the conventional layers in its protocol stack, namely the RRC layer, the PDCP layer, the RLC layer, the MAC layer and the PHY layer.

In FIG. 9(b) a plurality of relay UEs is employed for the communication between the remote UE and the core network. The protocol stack at the remote UE includes the additional network control layer as described above, and also such an additional network control layer is established at the core network, for example at the AMF. The respective relay UEs, UE1 to UEn, are illustrated of which at least the n-th relay UE includes the above-mentioned adaptation layer. Thus, in accordance with embodiments, the relay UEs UE1 to UEn−1 may be conventional relays not including the adaptation layer, while in accordance with other embodiments some or all of the relay UEs UE1 to UEn−1 may also include an adaptation layer.

Thus, embodiments of the first aspect of the present invention address the problem of the non-visibility of the remote UE at the core network with regard to certain network context by establishing the additional network control layer at the remote UE and at the CN to allow for a direct communication between the remote UE and the CN without the need for going through an application or the like, as described above. This allows for establishing the network control context of the remote UE at the CN to which the UE-to-network relay is connected. As has been described above with reference to FIG. 9, in accordance with embodiments of the first aspect of the present invention, the conventional protocol stack is extended by the network control layer at the remote UE and the core network, and by the additional adaptation layer at the relay UE. Embodiments of the first aspect of the present invention allow establishing the network control context and an authentication of the remote UE together. In accordance with further embodiments of the first aspect, once the network control context of the remote UE is established at the CN, policy updates or changes may be performed through the relay UE.

In accordance with embodiments, the above-mentioned network control information may include non-access stratum information, NAS information to be used, for example, for Protocol Data Unit, PDU, session management or the like. However, the present invention is not limited to NAS information, rather, in accordance with other embodiments, it may be employed with any kind of network control information of a remote UE to be made available to the CN so as to allow the CN to perform certain operations without the need of going through an application or the like.

In accordance with embodiments, the network control information to be signaled via the newly established network control layer directly between the remote UE and the CN may include one or more of the following:
the above-mentioned NAS information and/or NAS message of the UE to be stored at the CN,
PLMN information that it was previously associated with, if the UE is out-of-coverage,
current PLMN information,
a unique UE ID assigned from an application,
group ID information,
a QoS profile requested by an application,
a location or geographical area or GPS path,
network slice information e.g., as a part of the Network Slice Selection Assistance Information,
an old PDU/PDN session information,
a current PDU/PDN session information,
assistance information.

In accordance with embodiments, the assistance information provided by the remote UE to the CN, e.g., in the form of a control information as a part of a control message in the PC5, may include one or more of the following:
a preferred EC state of the UE
preferred DRX information, like a length of a DRX cycle, a period of a DRX cycle, a shift of a DRX cycle,
one or more applications that the remote UE is capable to support,
one or more QoS levels the UE supports,
a preferred and/or supported network slice,
one or more preferred services for the remote UE it to be paged, e.g., IMS (IP multimedia subsystem) voice messages or VoLTE messages, Or voice over 5G, etc.,
a preferred Service and Session Continuity, SSC, mode.

Figure 10A:
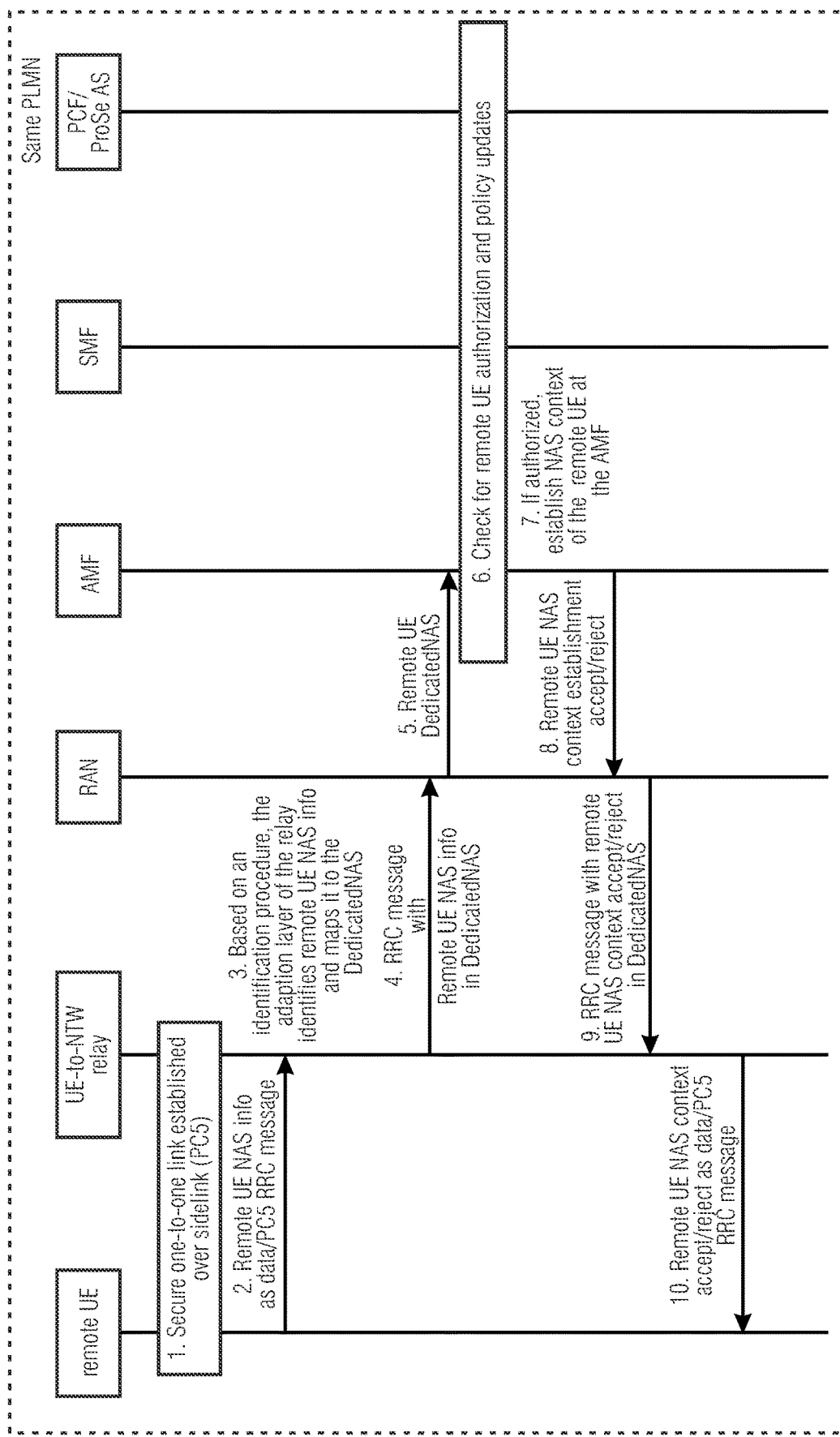
FIG. 10(a) illustrates a scenario in which the remote UE is from the same PLMN as the UE-to-network relay.
Figure 10B:
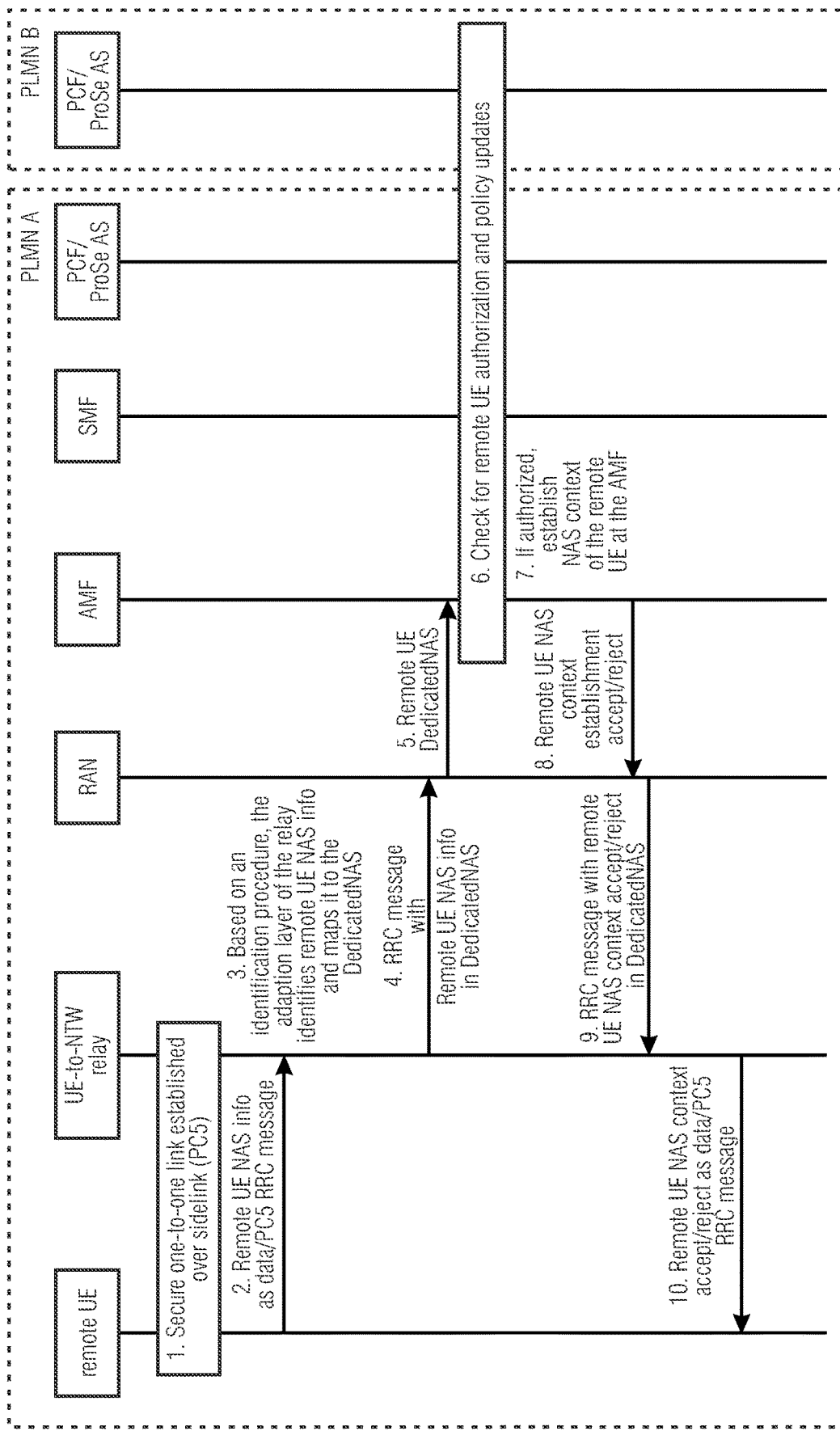
FIG. 10(b) illustrates an embodiment in accordance with which the remote UE is from a different PLMN than the UE-to-network relay.
Figure 10C:
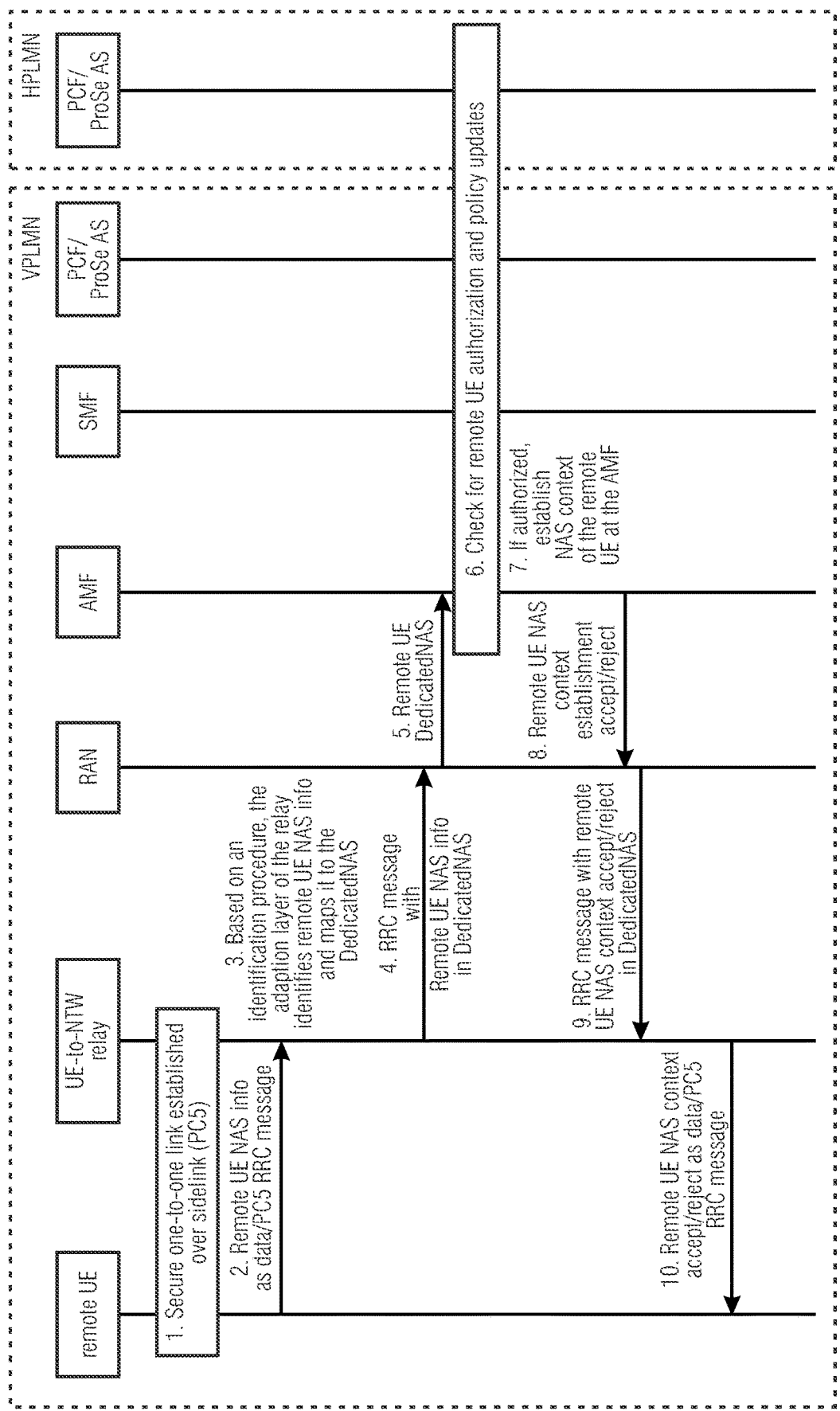
FIG. 10(c) illustrates an embodiment in accordance with which a remote UE is from the same PLMN or is from a different PLMN in a roaming architecture.

FIG. 10 illustrates embodiments for a remote UE NAS context establishment at a CN using a UE-to-network relay for different architectures using a control plane, CP. FIG. 10(a) illustrates a scenario in which the remote UE is from the same PLMN as the UE-to-network relay. FIG. 10(b) illustrates an embodiment in accordance with which the remote UE is from a different PLMN than the UE-to-network relay. FIG. 10(c) illustrates an embodiment in accordance with which a remote UE is from the same PLMN or is from a different PLMN in a roaming architecture.

FIG. 10(a) illustrates the establishment of a remote UE NAS context at the CN, like at an AMF in case of a 5GC or at an MME in case of an EPC. The establishment procedure is applicable at any time and assumes that the remote UE is authorized to enlist the services of the UE-to-network relay or the sidelink services. FIG. 10(a) illustrates the remote UE, the relay UE, referred to as UE-to-NTW relay, the RAN, and the core network entities, AMF, SMF, PCF/ProSe Application Server, AS. In accordance with embodiments of the first aspect of the present invention, for establishing the NAS context of the remote UE at the CN via the relay service, at the remote UE establishes "1" a secure one-to-one link with the UE-to-network relay using an existing procedure allowing for a sidelink communication. In accordance with embodiments, before step "1", i.e., before starting the communication via the relay, during step "1" i.e., when starting the communication via the relay, or following step "1", i.e., at some time during the communication via the relay, the remote UE establishes in its protocol stack the network control layer, in the depicted embodiment the NAS layer. The remote UE generates a NAS message for conveying the NAS information to the core network. In accordance with embodiments, the remote UE generates the NAS information in such a way that it is only decodable at the CN, and such that it is not understood by anyone of the relay UEs or the RAN, like the gNB. In accordance with embodiments, the NAS message may be protected using a NAS security context. Once the NAS message is generated, the remote UE transmits "2" the NAS message over the sidelink interface to the relay UE, either as data or as a control message, like a PC5 RRC message.

The relay UE, as indicated at "3", receives the NAS message, either as data or as part of the control message and applies an identification procedure for identifying the received data or control message as a message including NAS context of the remote UE. It is noted that the relay UE, only identifies the nature of the received data/control message, namely that the received data/control message concerns NAS information, however, the relay UE is not capable to understand or decode the actual NAS message or NAS information included in the NAS message. The identification procedure is carried out at the above described adaptation layer of the relay UE (see FIG. 9) which, in accordance with the first aspect of the present invention, is added to the conventional protocol stack of the relay UE. Based on the identification procedure, the adaptation layer identifies the remote UE NAS information and maps it to a predefined control message employed conventionally by the relay UE for communicating control data over the user plane to the core network, in a way as described above with reference to FIG. 4. In other words, the NAS information from the remote UE that is received the relay UE as data is included into a control message of the relay UE to the core network. In accordance with embodiments, the relay UE may employ the above described conventional RRC message "DedicatedNAS" for forwarding the received remote UE NAS information to the core network. Thus, the UE relay maps the NAS information received from the remote UE to the DedicatedNAS message as part of the relay UE's own Uu RRC signaling. The relay UE transmits "4" the DedicatedNAS message, now containing the remote UE NAS message, using RRC signaling to the RAN, like the gNB.

The gNB or RAN, responsive to receiving the DedicatedNAS message, forwards "5" the received DedicatedNAS message to the core network, CN, for example, in accordance with the above described conventional procedures.

The core network, like the AMF, responsive to receiving the DedicatedNAS message and identifying the content thereof as NAS information of the remote UE may establish also a network control layer, like a NAS layer, in its protocol stack and store the received NAS information as NS context. In accordance with embodiments, the core network, may check "6" the remote UE authorization and may also provide policy updates. For example, the AMF in 5GC or the MME in EPC, may perform the necessary checks with the corresponding network functions, like the SMF or the PCF so as to allow for an establishment of the network control layer at the core network, like the NAS context establishment.

In accordance with further embodiments, responsive to the checks "6", the core network, in case the authentication was successful, i.e. in case the remote UE has been authorized, stores the NAS information of the remote UE as NAS context so that, from the AMF's perspective, the remote UE may now be considered to be in a state that is referred to as an extended coverage, EC, state. In accordance with further embodiments, the core network may create a signaling for informing the remote UE whether the NAS context has been accepted or rejected. At step "8", dependent on whether the authorization check was successful or not, the AMF may signal a message to the RAN indicating that the NAS context has been established or accepted at the CN, that the registration of the remote UE has been rejected. The message from the core network is forwarded to the remote UE through the relay UE. The RAN, like the gNB, sends "9" the message from the core network as an RRC message including the response from the AMF in the DedicatedNAS message, and then the relay UE at step 10 forwards "10" the response to the remote UE, either as data or as a PC5 RRC message.

It is noted that the NAS message generated at the remote UE is only understood at the CN and is transparent to all other layers in the protocol stack, PS. In accordance with embodiments, this may be achieved as follows:

- protecting the NAS message generated at the remote UE using a special security protocol, like a NAS security context, or
- making the NAS message transparent to the protocol layers in the relay UE and the RAN, e.g., by placing the NAS message into a container being forwarded using an RRC message,
- creating the content of the NAS message in such that it is uniquely understood at the CN only, e.g. by using a pre-configured cyphering mechanism, using parameters known only at the CN to create the content, these parameters could for example, vary per operator, per PLMN or per location, content is associated with a network slice recognized by the network slice ID.

FIG. 10(a) illustrates an embodiment in accordance with which the remote UE is from the same PLMN as the relay UE. However, in accordance with other embodiments, the remote UE may belong to a different PLMN, e.g. PLMN A (=PLMNA) or PLMN B (=PLMNB), as is illustrated in FIG. 10(b). It is noted that the above described steps for establishing the NAS context at the AMF of the PLMN to which the relay UE belongs are the same steps as described with reference to FIG. 10(a). However, other than in FIG. 10(a), in the embodiment of FIG. 10(b), the AMF of the PLMNA which the relay UE belongs to, contacts the PLMNB which the remote UE belongs to for checking the remote UE authorization for accessing the network and/or using the sidelink operation and also, optionally, for providing policy updates. FIG. 10(c) illustrates an embodiment for implementing the first aspect of the present invention in a roaming architecture. It is assumed that the remote UE currently is away from its home network HPLMN and is roaming within a visitor PLMN VPLMN. The NAS context of the remote UE is established at the AMF of the VPLMN which the relay UE belongs to, and the respective steps correspond to those described above with reference to FIG. 10(a). However, for checking the remote UE's authorization and for optionally obtaining policy updates, the AMF of the VPLMN contacts the HPLMN of the remote UE for obtaining the authorization and/or policy updates.

For establishing the NAS context at the CN, as described above with reference to FIG. 10, the relay UE, responsive to receiving the remote UE NAS information as data or control message performs certain identification procedures within the adaptation layer. Embodiments of the identification procedure at the adaptation layer of the UE are now described.

Figure 11:
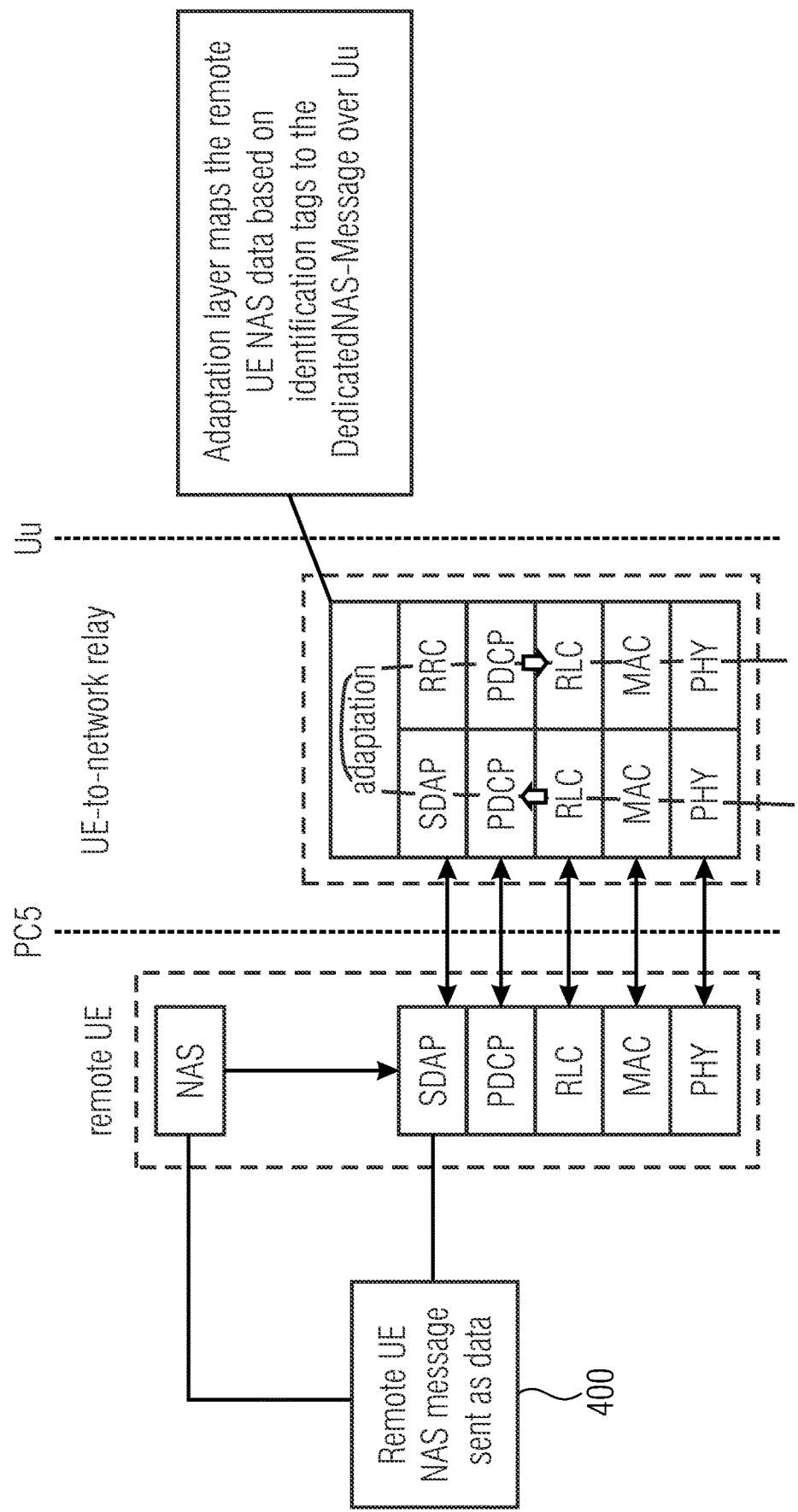
FIG. 11 illustrates a relay UE protocol stack in case a remote UE NAS message is sent as data.

FIG. 11 illustrates a relay UE protocol stack in case a remote UE NAS message is sent as data. The remote UE and the relay UE, as is indicated in FIG. 11, are connected via the PC5 interface, and the relay UE is connected to the wireless network via the Uu interface. The remote UE established the NAS layer and, as is indicated at 400, creates the remote UE NAS message to be sent as data using the SDAP layer of its protocol stack to the relay UE. The remote UE, at 400, selects from a set of identification tags a certain identification tag for the remote UE NAS message to be sent as data over the sidelink to the relay UE. The identification tag may have the form of a unique ID, which allows the relay UE to filter out the remote UE NAS message at the adaptation layer and to map the remote UE NAS message to the Uu-DedicatedNAS message. Filtering occurs at the adaptation layer and FIG. 11 illustrates that the data received from the remote UE is passed to the adaptation layer where it is mapped to the DedicatedNAS layer so that the NAS message from the remote UE, which has been sent initially as data, is now part of the control message of the relay UE to be transmitted over the Uu interface. In accordance with embodiments, the identification tags may include a unique application ID e.g., a network slice ID, a layer 3 ID or predefined information in the packet header of the data packet including the NAS information or message.

Figure 12:
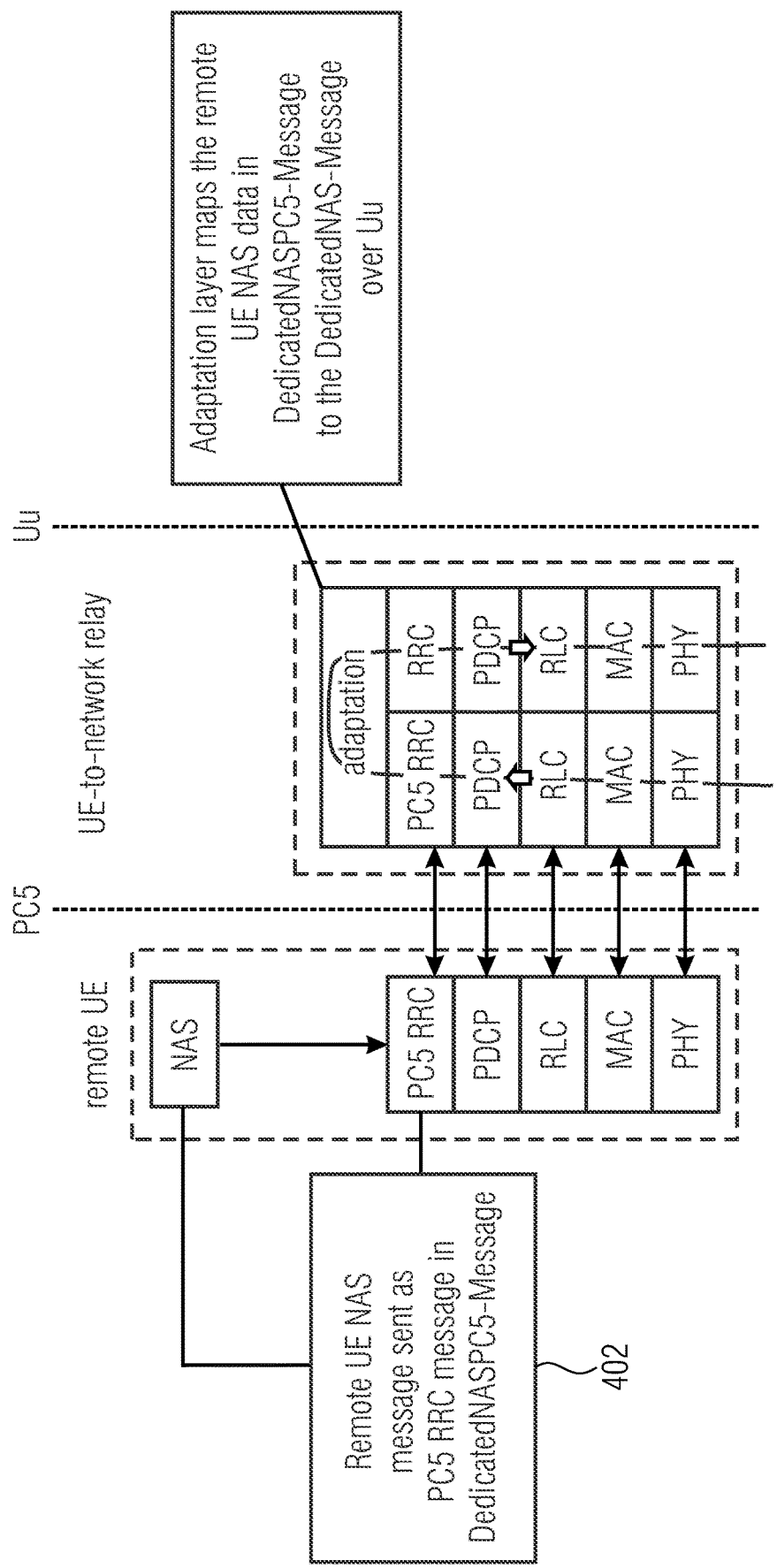
FIG. 12 illustrates an embodiment of the relay UE protocol stack in case the remote UE NAS message is sent in the PC5 RRC message.

In accordance with other embodiments, as described above, the remote UE NAS Message may be included in the PC5 RRC message that is transmitted from the remote UE to the relay UE. FIG. 12 illustrates an embodiment of the relay UE protocol stack in case the remote UE NAS message is sent in the PC5 RRC message. In a similar way as in FIG. 11, the remote UE at 402 creates, on the basis of information from the control network layer, namely the NAS layer, a remote UE NAS message to be sent as a PC5 RRC message in the sidelink control plane, rather than in the sidelink user plane, as is illustrated by the PC5 RRC layer in the protocol stack of the remote UE and the corresponding PC5 RRC layer in the relay UE. In accordance with embodiments, when sending the remote UE NAS information in the PC5 RRC message, a container may be included in the PC5 RRC message from the remote UE, which may only be populated by the network control layer in the remote UE, for example, the NAS layer in the described embodiment, and that is transparent to the RRC and all lower layers in the protocol stack. In accordance with embodiments, this container is referred to as a DedicatedNASPC5-message which is similar to the DedicatedNAS message over the Uu interface. At the relay UE the RRC layer forwards the information received from the remote UE to the adaptation layer which maps the received information to the Uu-DedicatedNAS. The information contained in the DedicatedNASPC5-message, in accordance with embodiments, may be protected by a specific security protocol understood only at the remote UE and at the CN.

Figure 13B:
FIG. 13(b) illustrates an RRC reconfiguration complete sidelink message including the DedicatedNASPC5-message.
Figure 13C:
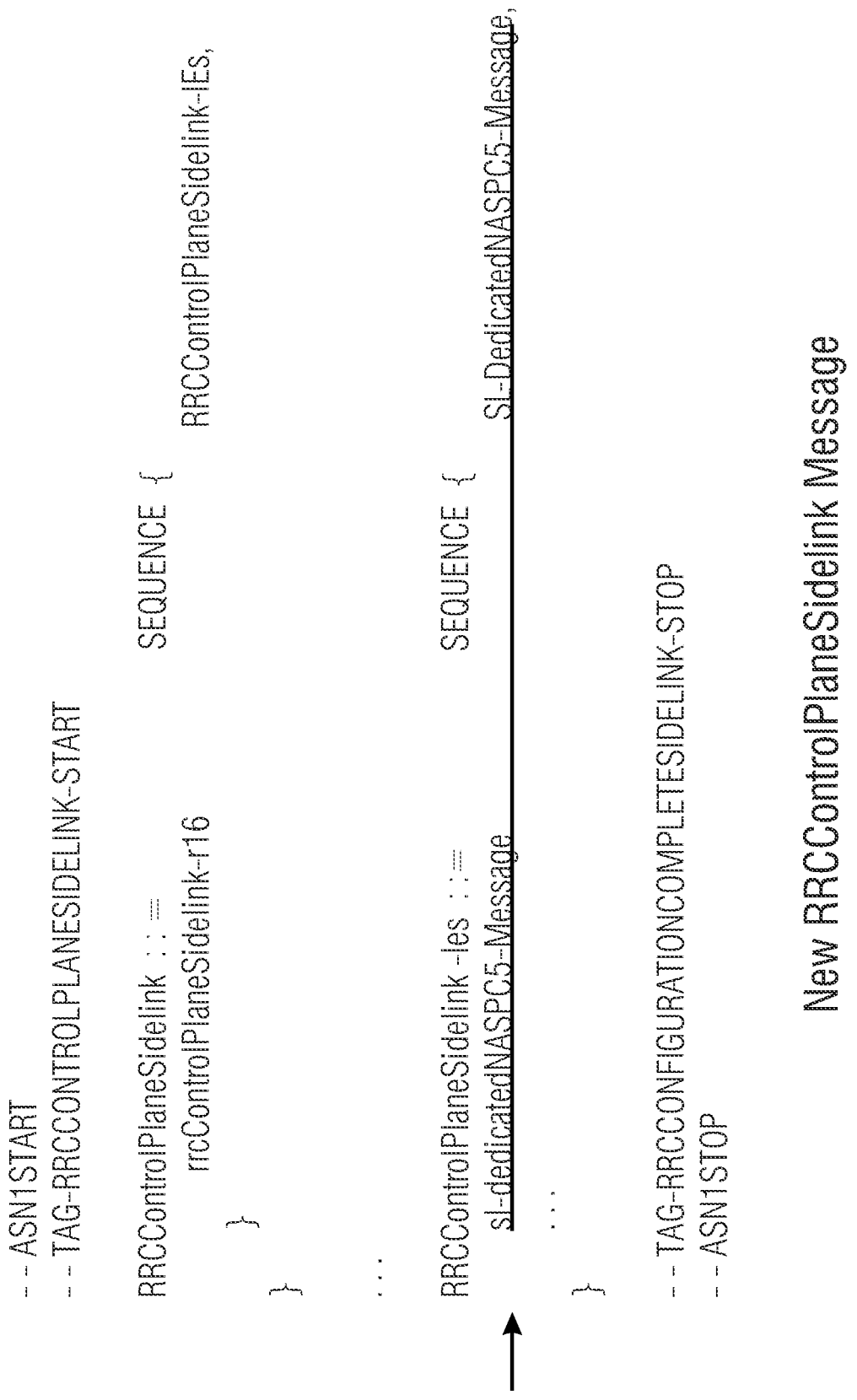
FIG. 13(c) illustrates a new RRC control plane sidelink message in accordance with embodiments of the present invention including the DedicatedNAS PC5-message.

FIG. 13 illustrates embodiments of RRC messages including the DedicatedNASPC5-message container, see the underlined parts in FIG. 13. FIG. 13(a) illustrates an RRC reconfiguration sidelink message including the DedicatedNASPC5-message container. FIG. 13(b) illustrates an RRC reconfiguration complete sidelink message including the highlighted DedicatedNASPC5-message. FIG. 13(c) illustrates a new RRC control plane sidelink message in accordance with embodiments of the present invention including the DedicatedNAS PC5-message, which is highlighted in FIG. 13(c). FIG. 13(d) illustrates an embodiment of a DedicatedNASPC5-message.

Figure 14:
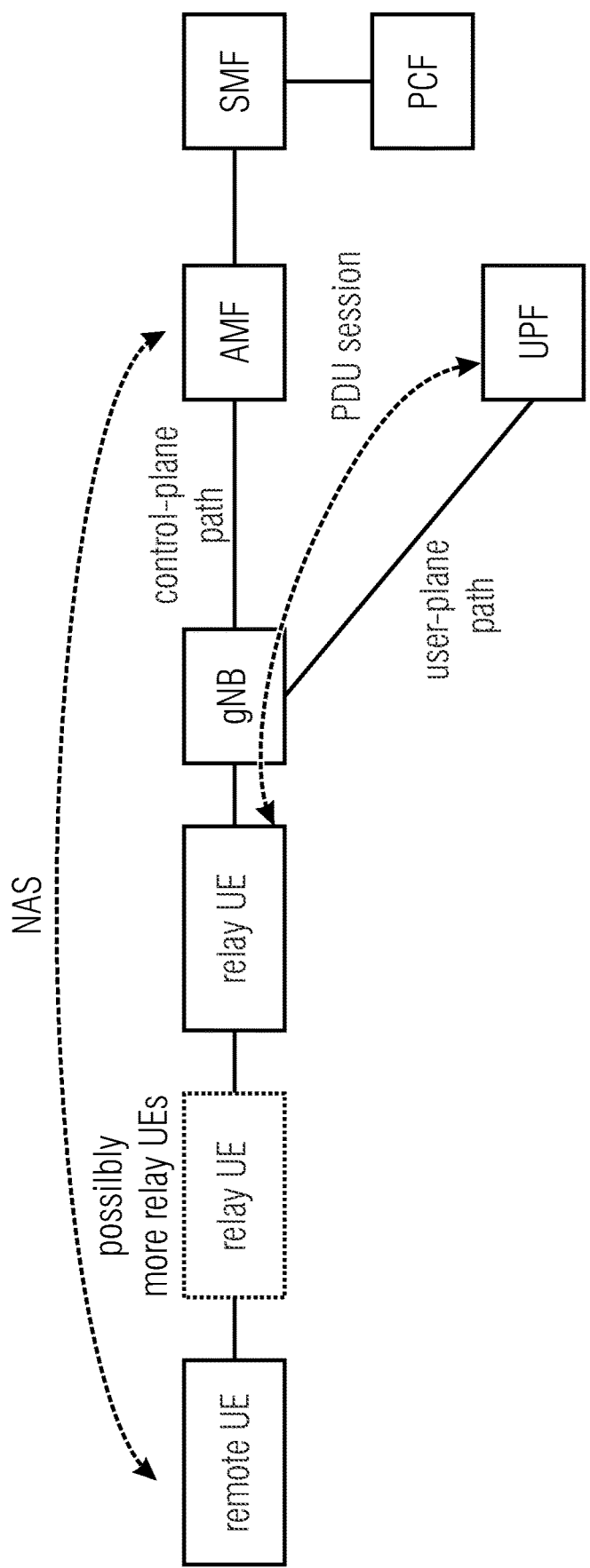
FIG. 14 illustrates the effect of the first aspect of the present invention when compared to FIG. 7.

Thus, in accordance with embodiments of the first aspect network control information, like the NAS information, for the remote UE may be maintained at the core network. FIG. 14 illustrates the effect of the first aspect of the present invention when compared to FIG. 7 described above. Other than in conventional approaches, in which only the NAS context of the relay UE is established at the core network, the inventive approach allows for establishing the NAS context or any other control network context of the remote UE directly at the control plane of the core network, like the AMF, as is illustrated by the double-headed arrow in FIG. 14 labelled "NAS" extending from the remote UE to the AMF. As mentioned above, the present invention is not limited to the establishment or maintenance of NAS context at the core network, rather, other network control information may be established and maintained at the core network.

In accordance with embodiments, when establishing a NAS context in the above described way at the core network, the NAS context in the core network may include one or more of the following:
 a remote UE ID,
 a group UE ID, where the UE belongs to,
 a relay UE ID,
 a policy, authorization or subscription,
 NAS security information,
 a QoS profile,
 a tracking area information,
 a geographical area,
 a zone ID, e.g. as in the context of a NR V2X zone ID carried over the SCI,
 a NAS context validity, like a validity timer associated with a NAS context of the remote UE, or a validity timestamp, of when the NAS context will become (in) valid, or a delay timer, of when the NAS contest will become (in) valid,
 in case an active PDU session exists, a PDU session ID,
 in case an active PDU session exists, an indication that the UE is in an extended coverage, EC, connected state,
 in case no active PDU session exists, an indication that the UE is in an EC idle state,
 IP information,
 a network Slice ID,
 a UE type/category information, e.g. if the UE is a car, or a smart device (e.g. smart watch) or a pedestrian UE (P-UE),
 other UE capability information, e.g. supported DRX modes.

In accordance with embodiments, the NAS context parameters at the CN, like those mentioned above, may need to be updated or modified dependent on certain events, like those described above with reference to FIG. 7. For example, when there are changes in the path between the remote UE and the core network, when there is a change in the connection state of the remote UE or when there is a change in the coverage state of the remote UE, an update or modification of the context parameters may be needed. The AMF network entity assimilates the NAS information or parameters from the remote UE and also from other network entities, when establishing the NAS context for the remote UE. For example, the relay UE ID and the remote UE ID may be obtained from the UE side, and the information about the policy or authorization may be obtained from other network entities, like the PCF, a Unified Data Repository, UDR, a Unified Data Management, UDM, a Policy and Charging Rule Function PCRF, a Home Subscriber server, HSS.

Figure 15:
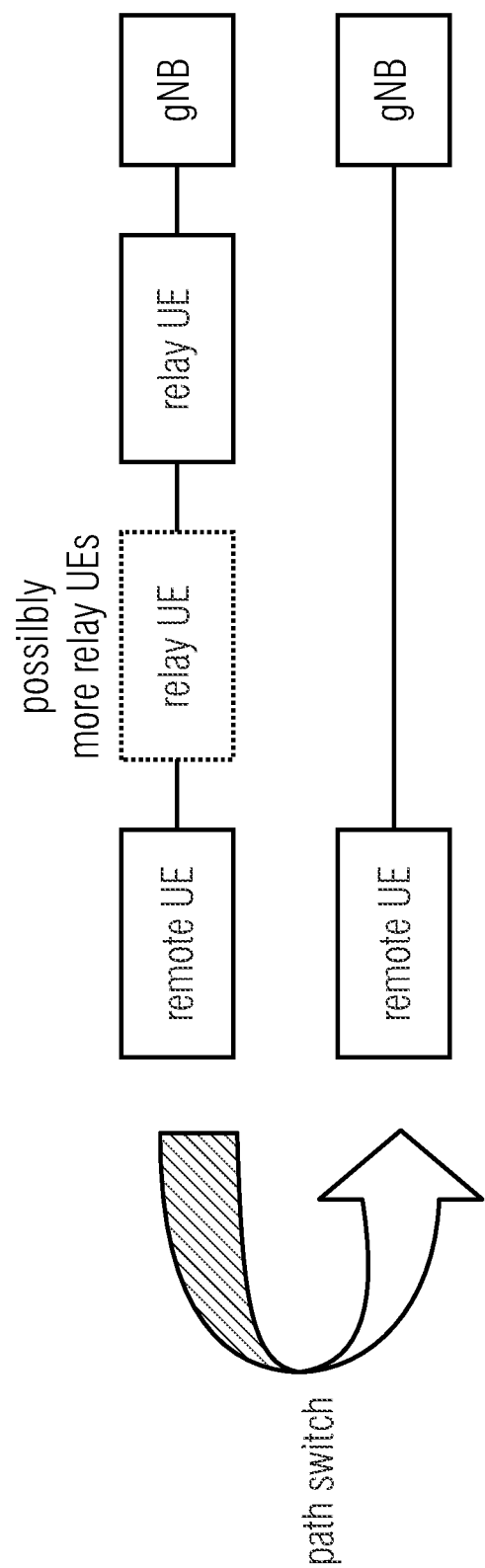
FIG. 15 illustrates an embodiment for a path switch of a remote UE that is currently communicating with a network via one or more relay UEs switches to a direct connection.

For example, when considering a situation of a path switch as discussed above with reference to FIG. 7, during or following such a path switch, for example from a relay path to a direct path or the other way around, the NAS context at the CN needs to be updated accordingly. FIG. 15 illustrates an embodiment for such a path switch in accordance with which the remote UE that is currently communicating with a network via one or more relay UEs switches to a direct connection as illustrated in the lower path of FIG. 15 in which the remote UE now is directly connected to the RAN or gNB. In such a case, the NAS context information is updated and, for example, since the core network is aware of the remote UE, an active PDU session may be maintained. Conventionally, the PDU session was associated only with the relay UE via which the remote UE is connected to the core network, however by establishing the NAS context also at the core network the PDU session is known to be associated with the remote UE and may be maintained even when the remote UE switches to a direct connection or to a connection via a different relay. Thus, session continuity is enabled by the inventive approach of the first aspect of the present invention, e.g., by establishing the context of the remote UE also at the core network.

An update of the NAS context, as mentioned above, may also be needed when a different relay UE is used, so that, for example, the relay UE ID in the NAS context needs to be updated.

In accordance with embodiments, the core network may consider the remote UE to be in an EC-connected state or in an EC-idle state, and dependent on the state, the NAS context may be updated. The EC state refers to the above-mentioned extended coverage (EC) and is introduced so as to extend the concept of the Connection Management, CM, connected and the CM-idle states also to a remote UE. The EC-connected state means that there is at least one active PDU session to the CN that serves the remote UE, while the EC-idle state means that the remote UE is currently not served by any active PDU session to the CN, although it is in the extended coverage of the network through the relay UE and has its network control context established at the CN.

As mentioned above, the establishment of the context at the CN may be employed for the PDU session management. The core network entity, like the AMF or the MME, once the NAS context is established in the core network for the remote UE, may provide an indication including one or more of the NAS context parameters to another network entity responsible for the session management and session update, like the SMF. In situations as described above and also with reference to FIG. 7, the core network, like the SMF, may use the NAS context information so as to update or modify an existing PDU session, and/or to provide service continuity, and/or QoS management.

As described above, the core network, like the AMF, may check the remote UE's authorization. In accordance with embodiments, the remote UE may initiate or perform one or more procedures based on the response from CN, also referred to as the control information response.

If the remote UE authorization was successful at the CN, the remote UE may receive any combination of the following in response to the control information:
  IP information, like one or more IP addresses for a PDU/PDN session, e.g. a home address and one or more care-of addresses to be used, e.g., for a handover, HO, or in case of a path change, information about an IP gateway, or information related to the Domain Name System, DNS,
  new or updated security information,
  DRX information,
  information related to service continuity,
  information related to session continuity,
  an ID or tag showing that the UE is or has been authorized for a communication via the one or more relay UEs,
  supported Service and Session Continuity, SSC, modes at the CN.

A care-of address (CoA) may be in the sense of Mobile IP, as defined in IETF RFC 5944 and IETF RFC 4721, the termination of a network tunnel towards mobile host (MH). This may be a foreign agent CoA obtained from the MH the UE registers with, or any other co-located CoA that the UE externally obtains, e.g. from another UE via sidelink interface, e.g. PC5.

The ID or tag mentioned above may be used to separate UEs which have been authorized be the method described above from UEs which have been authorized by other means, e.g. directly via a base station connected to a core network. This tag might trigger a re-authorization event, once the given UE is in connectivity of another authorization facility, or might trigger an automatic de-registration event, after a timer has expires or the UE has changed its connectivity to the network.

In accordance with embodiments, if the remote UE is to receive IP information from the CN, e.g., in response to the control information, the remote UE continues to use this IP information also when a certain event occurs, like those described above with reference to FIG. 7. The remote UE may continue to use the received IP information, e.g., for a current session, unless updated by the CN, e.g., until the CN provides new IP information. The CN may provide new IP information for example in response to a certain event, like those described above with reference to FIG. 7.

In accordance with other embodiments, if the remote UE receives new or updated security information i.e., control plane and/or data plane security information, the remote UE applies this information for any further communication with the CN.

In accordance with yet other embodiments, if the remote UE receives DRX information, the remote UE applies this information when it is not actively communicating with the CN through the relay, i.e., when the CN considers the UE to be in an EC_IDLE state.

If the remote UE authorization was not successful at the CN, the remote UE may receive any combination of the following in response to the control information:
  an indication that the control information was not established at the CN,
  an indication that the registration of the remote UE was rejected and/or failed at the CN,
  a cause for rejection and/or non-establishment,
  a re-attempt timer or a prohibit timer.

In accordance with embodiments, if the remote UE receives an indication for the rejection and/or failure together with the cause for the rejection and/or failure, the remote UE forwards the cause also to the application running on or executed by the remote UE. In accordance with further embodiments, the UE may forward the cause to another UE via a device-to-device communication, e.g., using the sidelink. The cause may be forwarded, e.g., from a smartwatch to a mobile phone to let the mobile phone know, that the watch couldn't connect directly to the CN, so the mobile phone may take care of the connectivity.

In accordance with other embodiments, if, in addition to the indication and/or cause, the remote UE also receives the re-attempt or prohibit timer, the remote UE is to either send the NAS message i.e., a registration or service message after re-attempt timer value or stop sending the NAS message for the time of the prohibit timer. The prohibit timer may be set to a certain value, like infinity, prohibiting the UE from sending the control information at all or indefinitely In accordance with embodiments, once the remote UE is successfully registered with the CN, the remote UE is capable of receiving one or more paging messages from the CN via the one or more relay UEs. For example, a remote UE in an EC-idle state may be paged using a NAS message, like a push notification. Thus, upon a successful registration of the remote UE at the CN, the CN may generate a paging message, e.g., as a NAS message or a NAS notification, and/or page the remote UE via the one or more relay UEs.

Second Aspect—Side Link/Relay Services Authorization

Embodiments of the second aspect of the present invention address the above described problems of UEs having no or invalid provisioning parameters for performing a sidelink operation. This is overcome by providing common or minimum provisioning parameters, also referred to as CPP (common provisioning parameters) in the following, that are configured or preconfigured within a UE and that are common to some or all of the UEs of one or more PMLNs so as to allow any UE with outdated or missing provisioning parameters to perform at least a basic communication over the sidelink interface to a relay UE. This basic communication allows the remote UE to request from the wireless communication network, via the relay UE, valid provisioning parameters so the remote UE may perform regular SL operation over the sidelink interface.

In accordance with embodiments, using the common provisioning parameters, a remote UE may obtain one or more of the following parameters for performing a sidelink communication:

- a location where the sidelink communication is allowed, like GPS coordinates, fence coordinates of an area in 2D or 3D as a vector or set or a shape, a certain zone, a paging area, a cell ID, a country or a certain PLMN,
- a frequency to be used for the sidelink communication, like a carrier frequency, a bandwidth part, a resource pool, a sub-channel, one or more PRBs, band information, like the Intelligent Transport System/Industrial Scientific and Medical; ITS/ISM, band (unlicensed) or a non-ITS band (licensed),
- a duration of the sidelink communication, for example a day of time,
- a validity of the of the sidelink communication parameters, like two months before the UE has to ask for an update or otherwise is no longer allowed to use the sidelink communication,
- a start time of the sidelink communication,
- priority information, so that the UE receiving a configuration with a higher priority may override an existing configuration, which may be an update or a deletion.

To allow the remote UE to obtain, for example, the above mentioned provisioning parameters despite the fact that at a certain time the UE is not able to perform a sidelink operation, for example because there are no provisioning parameters for such a sidelink communication provided in the EU or in case such provisioning information is outdated, in accordance with embodiments of the second aspect of the present invention, a set of provisioning parameters is provided which are not subject to expiry and which may be referred to in the following as common or minimum provisioning parameters, CPP. In accordance with embodiments, the CPP may be pre-programmed into the ME or the UICC of a UE or, in accordance with other embodiments, the CPP may be received from the network when the UE is in coverage.

Figure 16A:
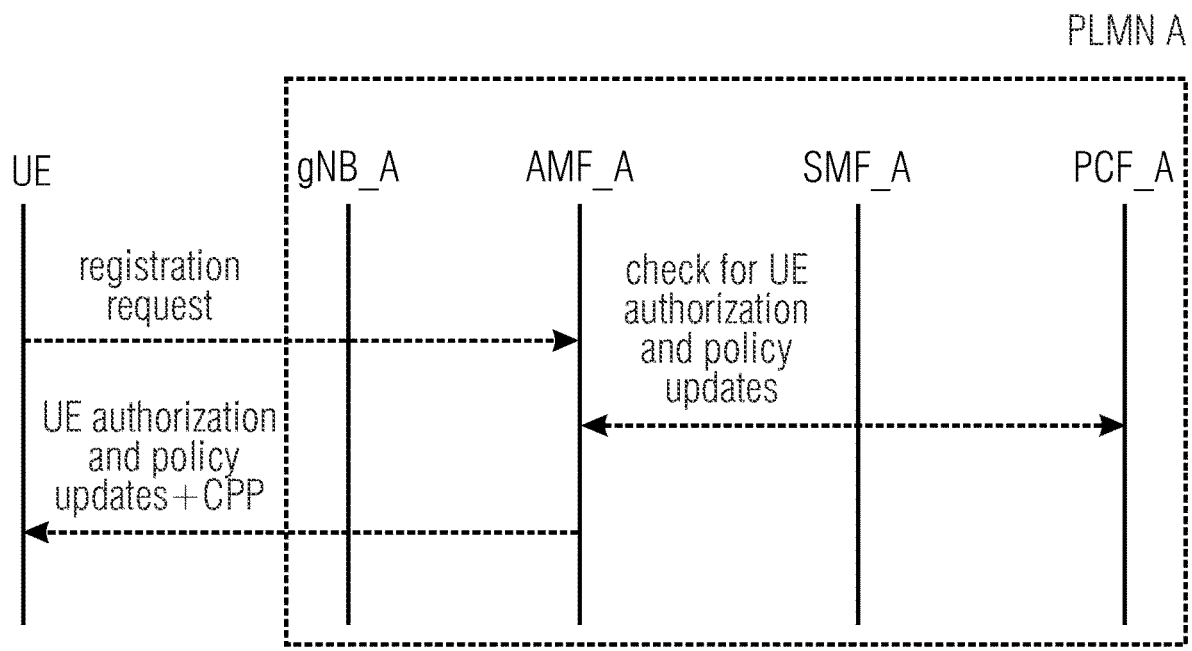
FIG. 16(a) illustrates an initial reception of the CPP.
Figure 16B:
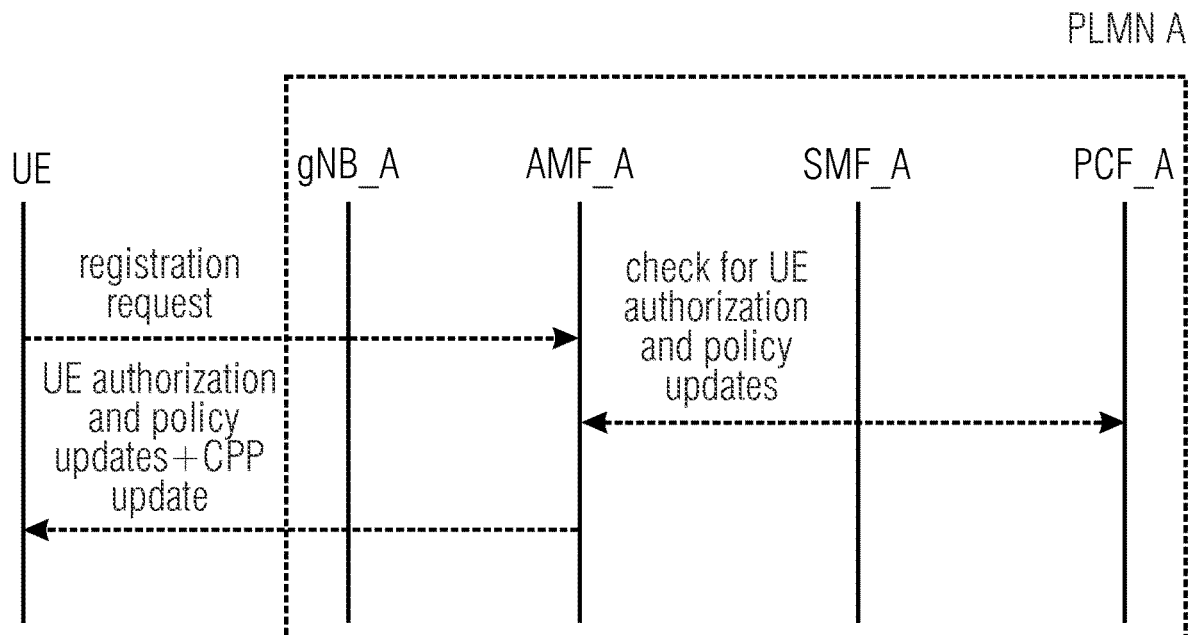
FIG. 16(b) illustrates an update of the CPP.

FIG. 16 illustrates an embodiment in accordance with which the CPP are received by the UE when being in-coverage, wherein the CPP may be used for an access to the network via the sidelink in case the UE goes out of coverage. FIG. 16(a) illustrates the initial CPP reception. The UE is assumed to be in coverage of PLMN A and sends a registration request via the gNB to the core network. Responsive to a successful check for the UE authorization and potential policy updates, the AMF returns, via the gNB, the CPP together with the confirmation of the authorization and, if available, policy updates. Once the UE goes out of coverage of the PLMN A and tries to perform a sidelink communication over a sidelink interface, in case the UE has no valid provisioning parameters for allowing the sidelink communications or no such provisioning parameters at all, it uses the CPP to access the network so as to send a request to obtain valid provisioning parameters allowing the UE to perform a sidelink communication. FIG. 16(b) illustrates a CPP update. The UE, when sending a registration request to the PLMN A, may receive an MPP update from the AMF.

In accordance with the second aspect of the present invention, the CPP is provided so as to enable an out-of-coverage UE to perform an authentication or policy update with the network, and in accordance with embodiments, the CPP may define certain pre-authorized resources the UE may use to perform a request for authentication and/or policy update so as to obtain valid provisioning parameters for performing a sidelink operation. In other words, the second aspect of the present invention allows an out-of-coverage UE to use the CPP to obtain authorization using a relay UE. In accordance with embodiments, the only purpose of the CPP is to obtain the authorization and/or policy update from the network so as to continue a sidelink communication. However, in accordance with other embodiments, the UE may also communicate some data together with the CPP to the network or to the sidelink UE.

In accordance with embodiments, the CPP may be a universal CPP (UCPP). The set of provisioning parameters of a CPP may be universal in the sense that they are not bound to a particular geographical region, area or location so that an out-of-coverage UE may be pre-configured in any location to request for an authorization and/or a policy update to perform a sidelink communication. In accordance with other embodiments, the CPP may be non-universal, so that the CPP may vary dependent on a geographical location or area or country. The granularity of the location or area may be based on implementation specifics or may be up to the discretion of the RAN.

The information related to the authorization of the UE may be stored in the PCF or the ProSe AS and the second aspect of the present invention allows the UE to have access to this network entity using the CPP.

Figure 17:
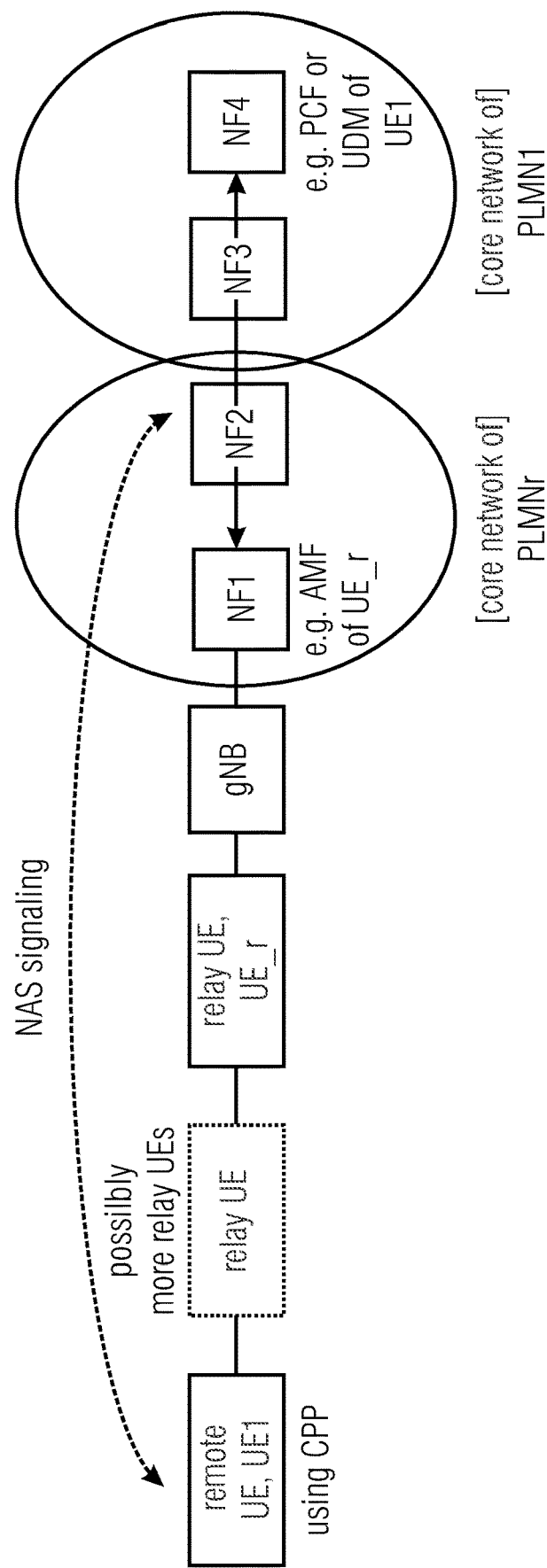
FIG. 17 illustrates embodiments for policy updates at a remote UE via one or more relay UEs.

In the following, embodiments using the CPP for authorization and provisioning over a relay node, like a relay UE or another non-3GPP access point, are described. FIG. 17 illustrates embodiments for policy updates at a remote UE via one or more relay UEs. FIG. 17 illustrates the remote UE, referred to as $UE_1$, and at least one relay UE, referred to as UE_r. The remote UE is considered to belong to a first network, the PLMN1, which is different from the network PLMNr to which the relay UE belongs.

It is assumed that the remote UE has the CPP, i.e., has a minimal valid authorization for a ProSe and/or sidelink communication and for using a relay UE. The remote UE is further considered to be out of coverage and intends to get a new policy from the network so as to be able to use, for example, non-ITS bands for the sidelink in a particular geographical area. The one or more relay UEs exist and are assumed to have a valid authorization to use the ProSe sidelink and to act as a relay. The remote UE is assumed to have provisioning parameters for allowing a sidelink communication as described above which, however, are assumed to be outdated, for example a policy associated with the provisioning parameters expired, so that the UE being out of coverage employs the above described CPP for accessing the relay UE, UE_r, for obtaining a policy update or an update of the provisioning parameters. As is illustrated in FIG. 17, in case the remote UE is out of coverage and has an invalid set of provisioning parameters or no provisioning parameters for a sidelink communication with the relay UE, it may use the CPP for accessing the relay UE via the sidelink communication so as to obtain authorization and updated or valid provisioning parameters for the sidelink communication. As is depicted in FIG. 17, the PLMN1 and the PLMNr may be different, however, in other embodiments they may be the same. The network function NF1, like the AMF of the PLMNr, may directly or indirectly contact the NF4, like the PCF of the PLMN1 which the remote UE belongs to so as to obtain the authorization and the provisioning parameters for the sidelink communication. In case the PLMN1 and the PLMNr are different, it may depend on the contracts, like roaming contracts between the two PLMNs, whether and how the PLMNr provides a link for the remote UE.

Thus, the UE using CPP may request authorization either through the data path or through the control path and, in accordance with embodiments, the request for authorization may be signaled in a similar way as the NAS information described above. More specifically, when being sent as data from the remote UE, the CPP request for authorization may have a certain tag identified at the relay UE and causing the relay UE, for example by using its adaption layer, to include the message into a dedicated control message over the Uu interface to its network, where it is used for providing authentication. In case of sending the CPP request as a control message it may be included in a container, as described above, which is part of a Uu-dedicated control message from the relay UE to its network.

Figure 18A:
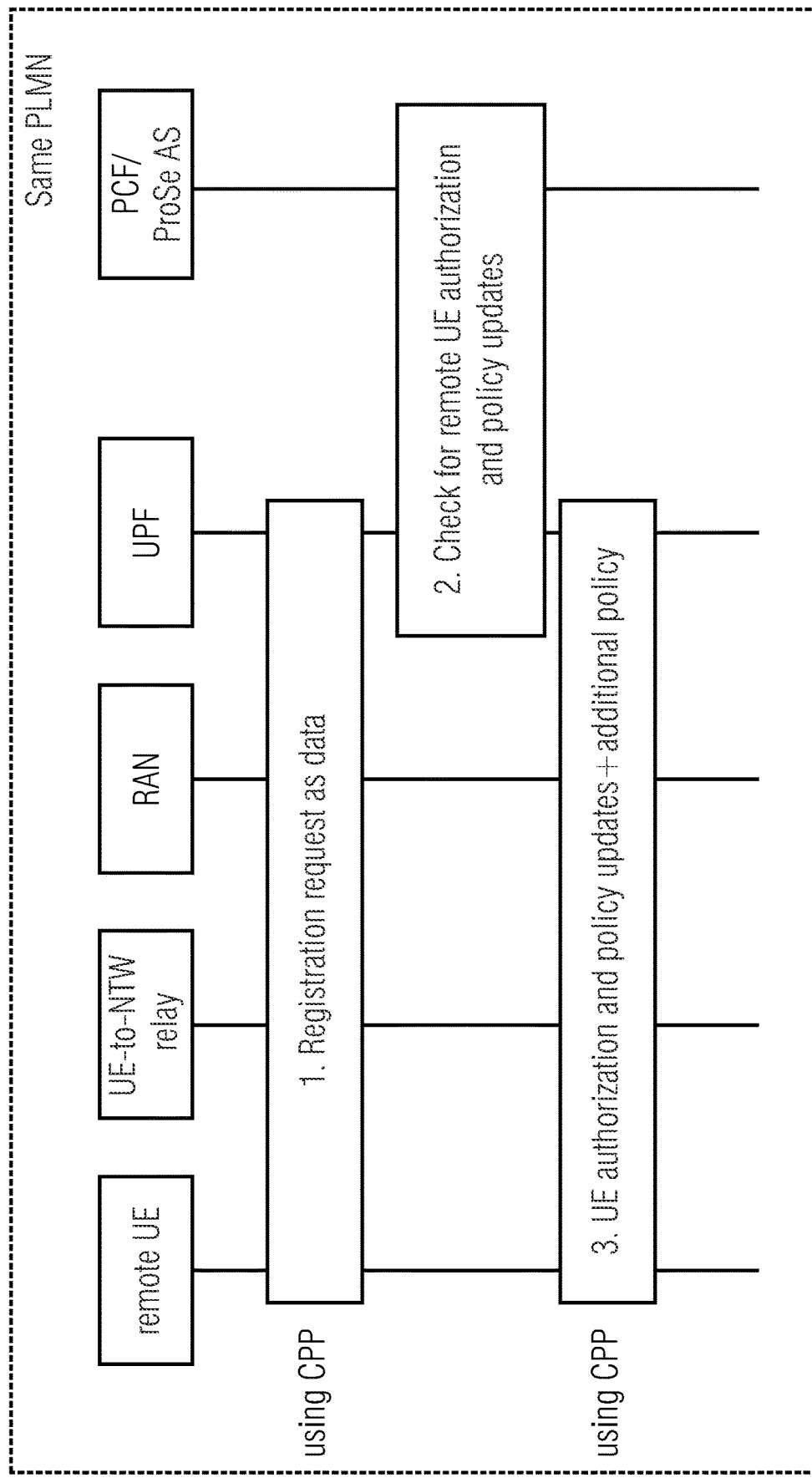
FIG. 18(a) illustrates a scenario in accordance with which the remote UE and the relay UE belong to the same wireless communication system or network, PLMN.
Figure 18B:
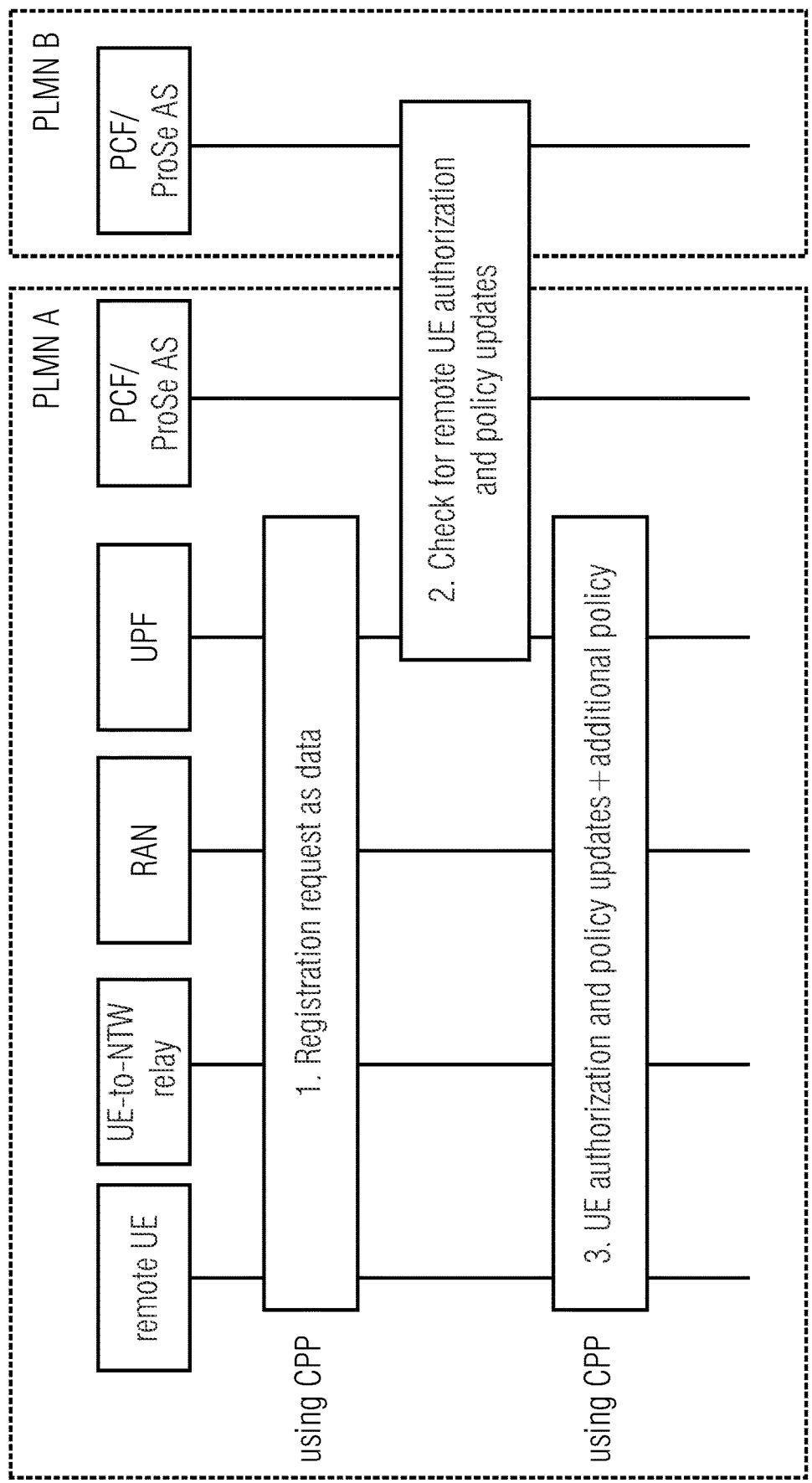
FIG. 18(b) illustrates a scenario in which the remote UE and the relay UE belong to different PLMNs, namely to a PLMN A and a VPLMN, respectively.
Figure 18C:
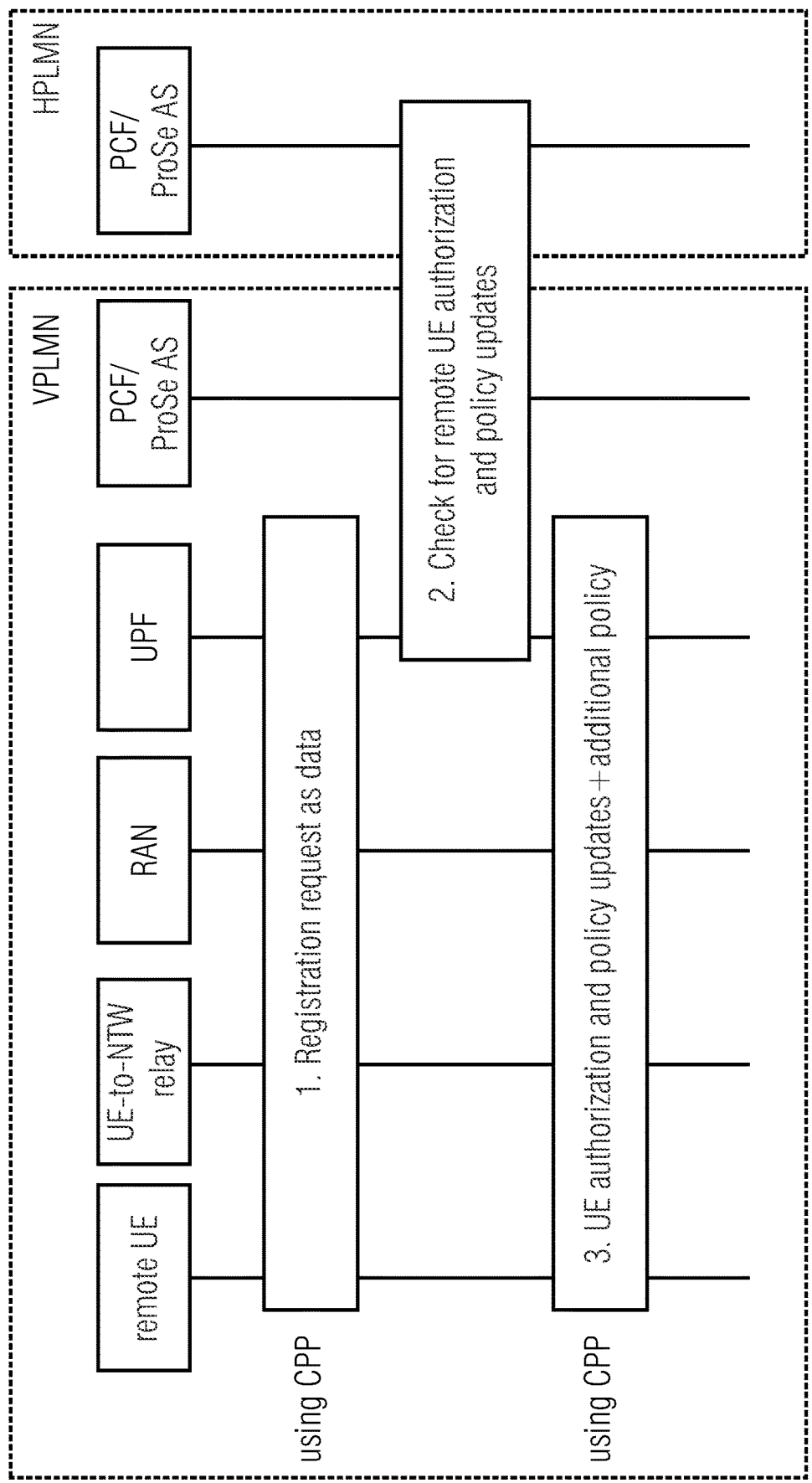
FIG. 18(c) illustrates a scenario in which the remote UE is roaming and belongs to a home network, HPLMN, whereas the relay UE belongs to the visited network, VPLMN.

FIG. 18 illustrates embodiments of an authorization procedure using a data plane path of a 5GC network using CPP in accordance with the second aspect of the present invention. FIG. 18(a) illustrates a scenario in accordance with which the remote UE and the relay UE belong to the same wireless communication system or network, PLMN. FIG. 18(b) illustrates a scenario in which the remote UE and the relay UE belong to different PLMNs, namely to a PLMN A and a VPLMN, respectively. FIG. 18(c) illustrates a scenario in which the remote UE is roaming and belongs to a home network, HPLMN, whereas the relay UE belongs to the visited network, VPLMN.

In FIG. 18(a) the remote UE uses the CPP to allow for a transmission of a registration request towards the core network. The remote UE generates the registration request and transmits "1" the request over the sidelink interface as a data transmission to the relay UE which, in turn, transmits the received registration request as a data transmission over the Uu interface to the core network so that it is received at a user path plane entity of the core network, like the UPF. The UPF, responsive to receiving the request from the remote UE, checks "2" for a remote UE authorization and also whether policy updates are available. The UPF may perform this check with the PCF/ProSe AS of the core network. Responsive to the check, the core network, for example the UPF, transmits "3" to the remote UE, using the CPP, the UE authorization and optional updates and/or additional policy information as data via the relay UE. Thus, in accordance with embodiments of the second aspect of the present invention, the remote UE not having valid provisioning parameters or no provisioning parameters at all, by means of the CPP is able to communicate over the sidelink with the relay UE so as to transmit data, like the registration request, which is forwarded to the core network and processed so as to allow the core network to return to the remote UE, again using the CPP, the authorization and policy updates and optionally additional policy information over the sidelink. This enables the remote UE to start a regular communication over the sidelink using the provisioning parameters received in response to the registration request.

FIG. 18(b) and FIG. 18(c) illustrate a similar process as in FIG. 18(a), except that, due to the different PLMNs in FIG. 18(b) and due to the roaming architecture in FIG. 18(c), the check "2" is extended from the PCF/ProSe AS of the relay PLMN, namely PLMN A or VPLMN, to the home network of the remote UE, namely PLMN B or HPLMN.

Figure 19A:
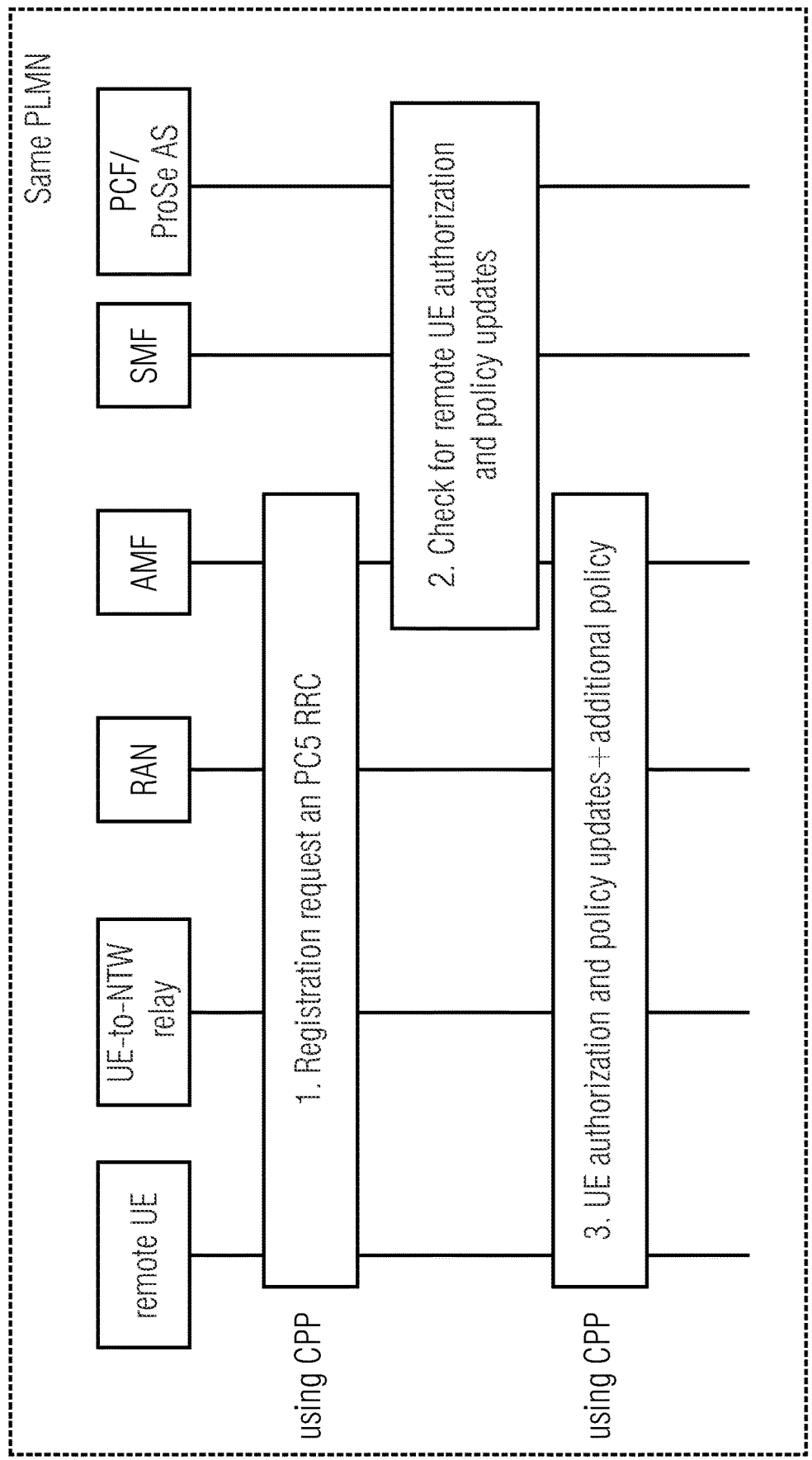
FIG. 19(a) illustrates a first scenario assuming that the remote UE and the relay UE belong to the same network or PLMN.
Figure 19B:
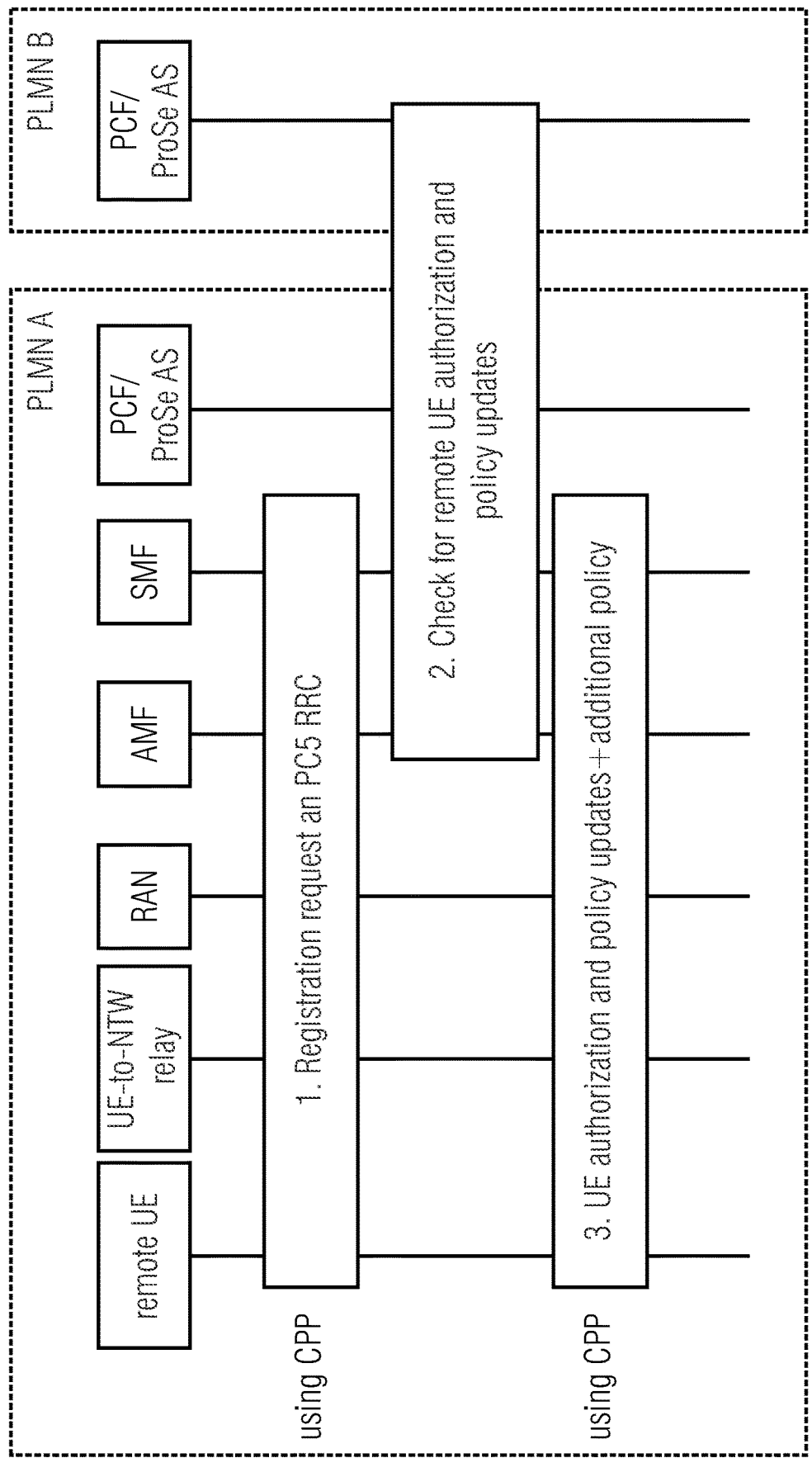
FIG. 19(b) illustrates a scenario in which the remote UE and the relay UE belong to different PLMNs, namely to PLMN A and PLMN B.
Figure 19C:
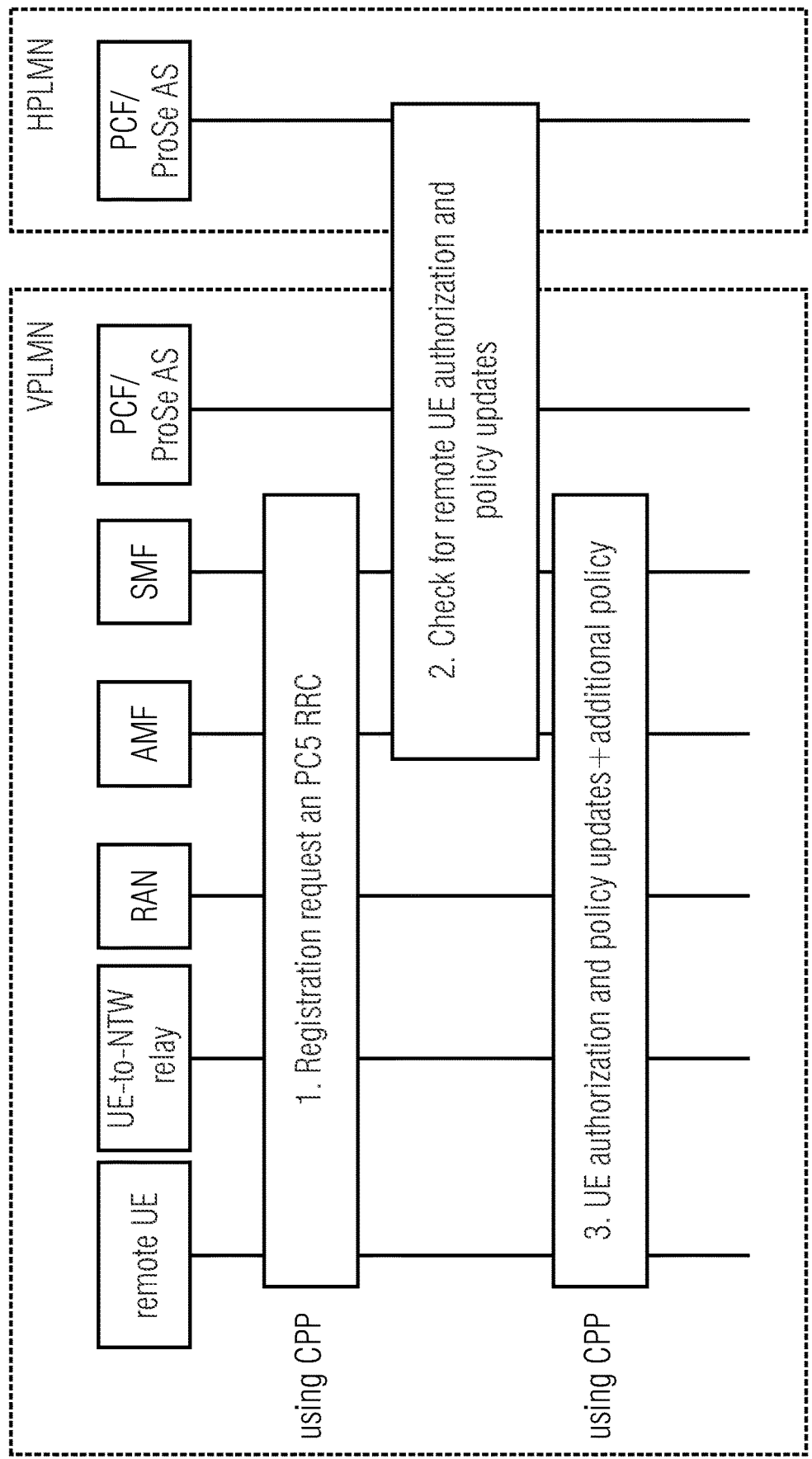
FIG. 19(c) illustrates yet another scenario in which a roaming remote UE is assumed belonging to a HPLMN, whereas the relay UE belongs to the visited PLMN, the VPLMN.

In accordance with other embodiments, rather than transmitting the registration request as data to the core network, as has been described above, the remote UE may create the registration request as part of a control message that is transmitted from the remote UE over the sidelink communication to the relay UE. For this transmission, the UE uses the CPP allowing the UE to transmit this request to the relay UE. The relay UE may include the received control message into the PC5 RRC control message it sends over the Uu interface to the core network, more specifically to the control plane of the control network, where it is received, for example, at the AMF. FIG. 19 illustrates embodiments of an authorization procedure through a control plane path. FIG. 19(a) illustrates a first scenario assuming that the remote UE and the relay UE belong to the same network or PLMN. FIG. 19(b) illustrates a scenario in which the remote UE and the relay UE belong to different PLMNs, namely to PLMN A and PLMN B. FIG. 19(c) illustrates yet another scenario in which a roaming remote UE is assumed belonging to a HPLMN, whereas the relay UE belongs to the visited PLMN, the VPLMN.

In FIG. 19(a), the registration request is created "1" and transmitted by the remote UE using CPP over the sidelink as a control message, like a PC5RRC control message, to the relay UE which, in turn, forwards the received registration request as part of its control signaling to the control plane of the core network where it is received, for example, at the AMF. In a similar way as described above with reference to FIG. 18(a), the AMF checks "2" one or more further core network entities, like the SMF and the PCF/ProSe AS, for the remote UE authorization and for possible policy updates. The AMF returns "3" the authorization to the UE together with possible policy updates and optionally with additional policy information which is transmitted from the relay UE to the remote UE using the CPP. Thus, the approach described above with reference to FIG. 19(a) is basically the same as the one described with reference to the FIG. 18(a) and provides the same advantages, except that in FIG. 18 the signaling is via the control plane.

FIG. 19(b) and FIG. 19(c) perform the same steps as described above with reference to FIG. 19(a) except that the check "2" is extended from the network to which the relay UE belongs, namely the PLMN A or the VPLMN, to the network to which the remote UE belongs, namely PLMN B or HPLMN. The PCF/ProSe AS of the relay UE network forwards the check to the PCF/ProSe AS of the remote UE network so as to obtain the authorization and policy updates. Otherwise, the process is the same as described in FIG. 19(a).

Figure 20A:
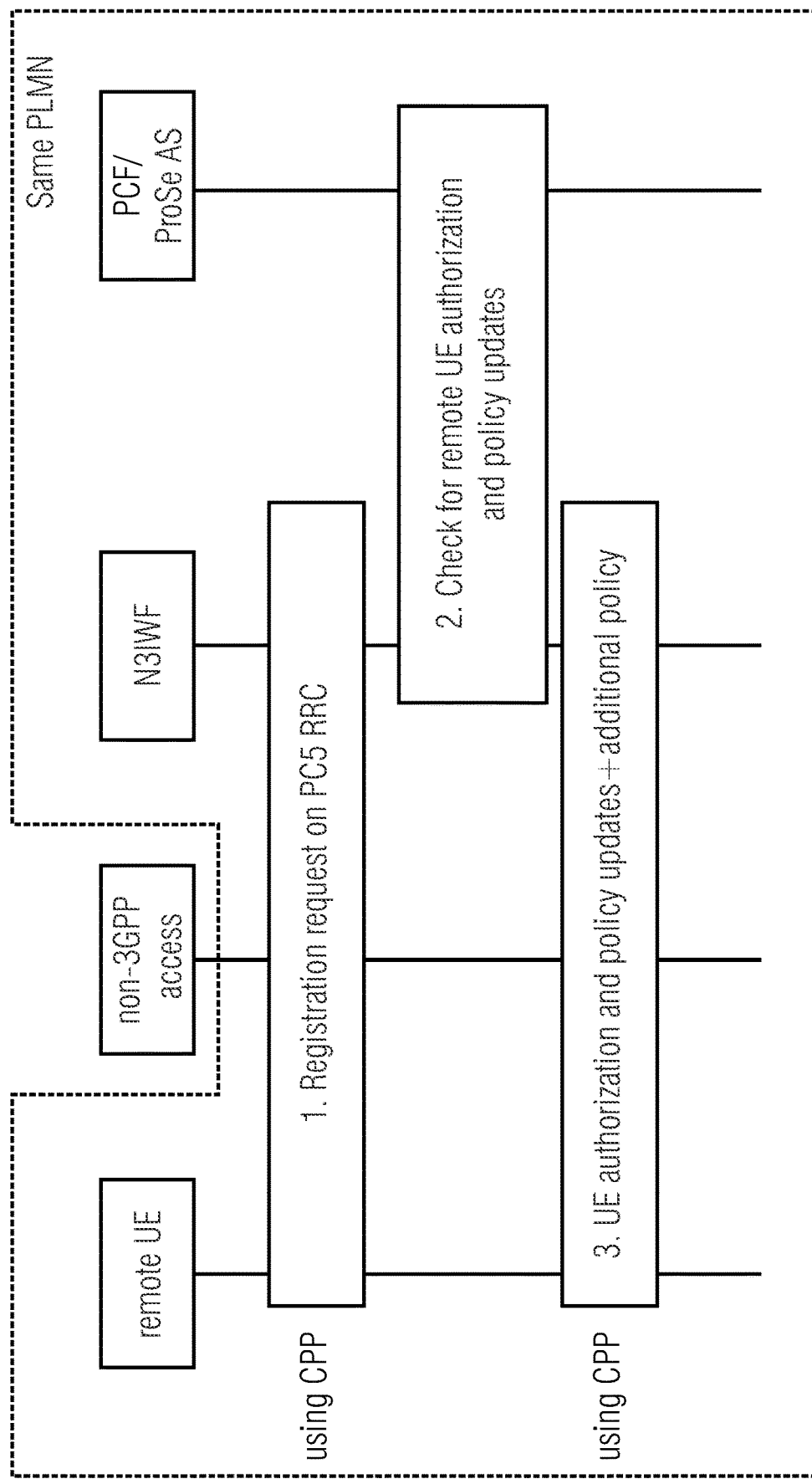
FIG. 20(a) illustrates a scenario in which the remote UE and the core network entities providing access to a non-3GPP access point, like the N3IWF, belong to the same PLMN. On the other hand.
Figure 20B:
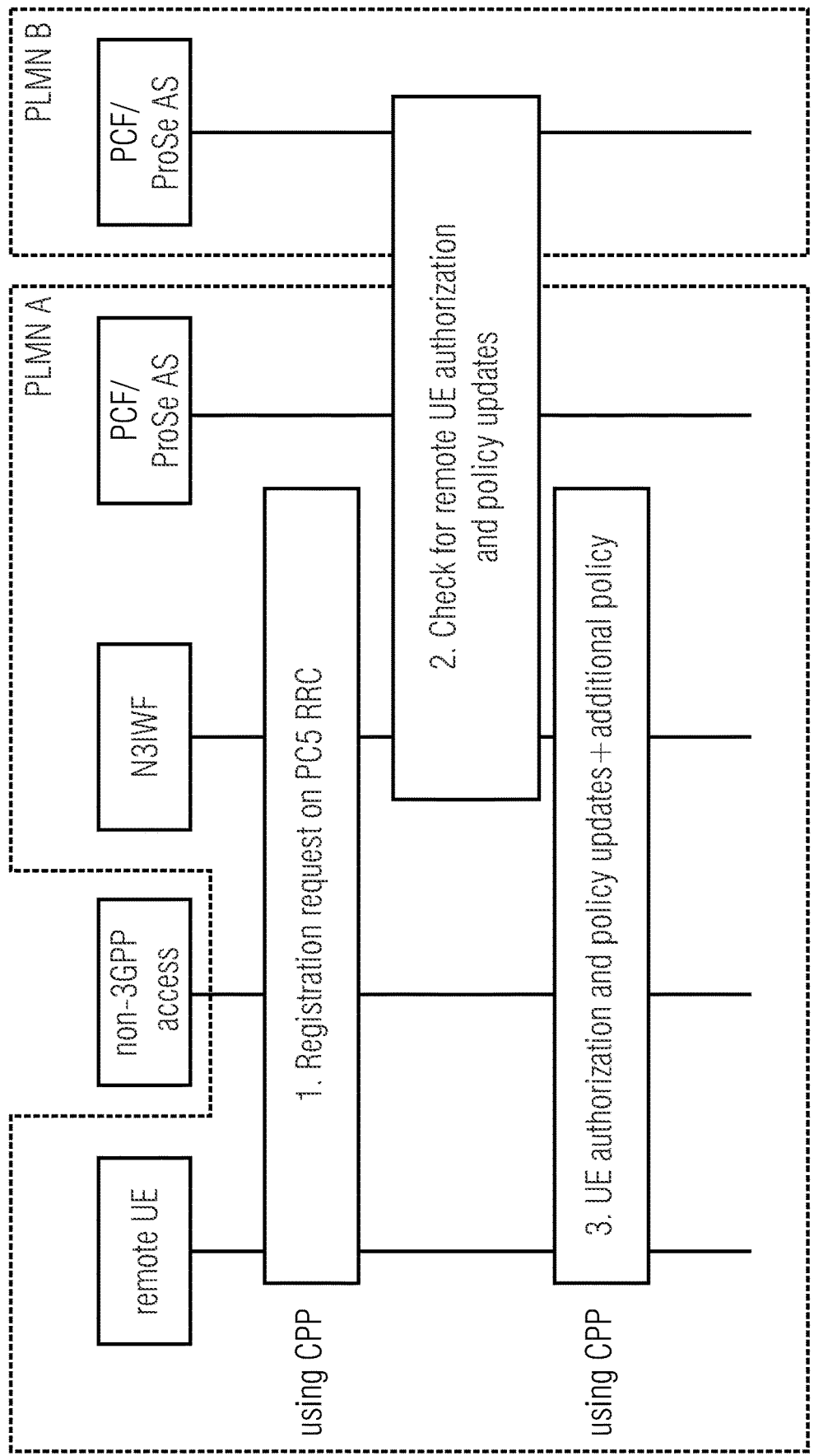
FIG. 20(b) illustrates a situation in which the remote UE belongs to a PLMN B that is different from the PLMN A to which the N3IWF belongs.
Figure 20C:
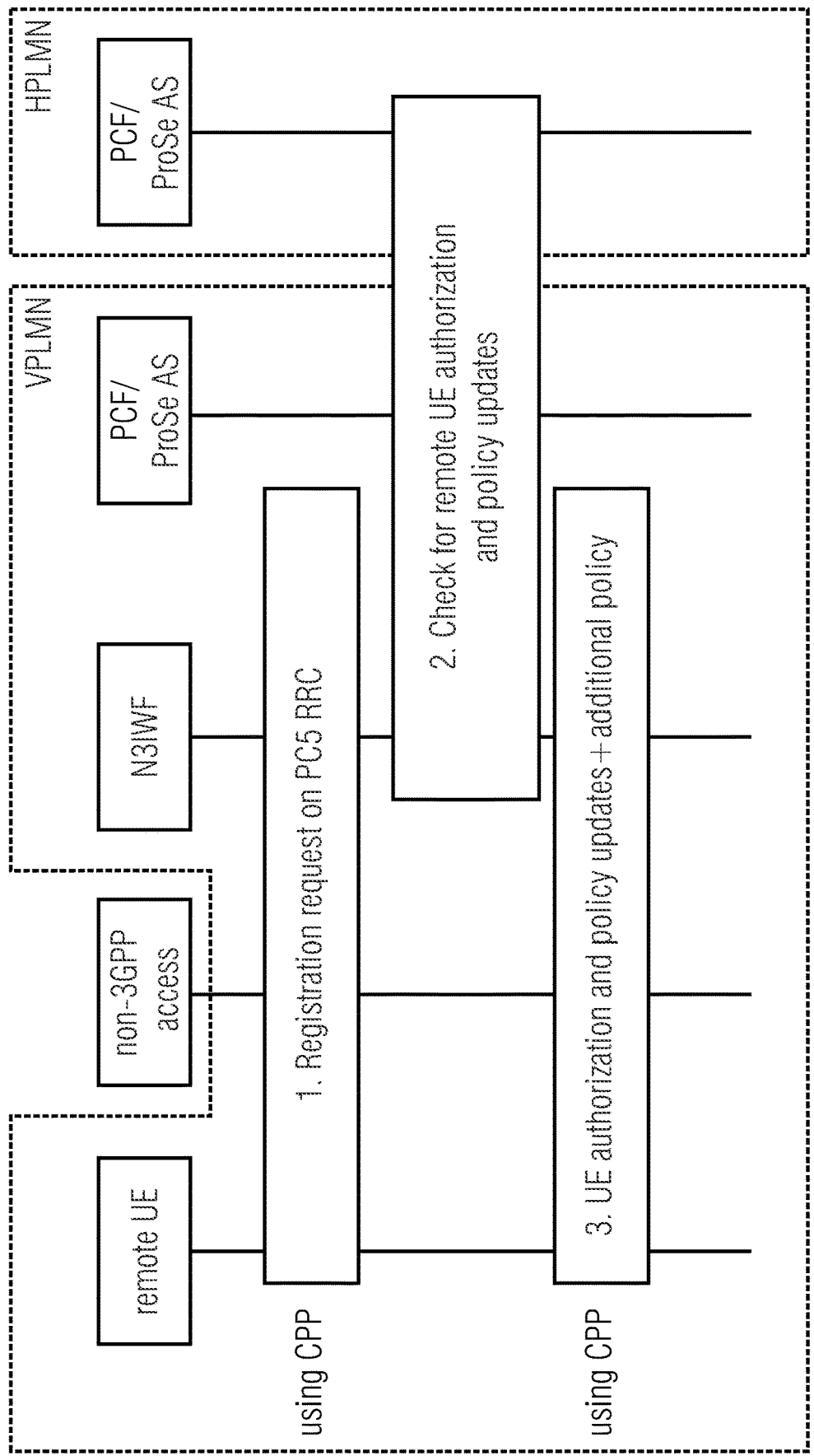
FIG. 20(c) illustrates a roaming architecture in which the remote UE belongs to a home PLMN, while the N3IWF belongs to the PLMN visited by the remote UE.

In accordance with yet further embodiments, the present invention is not limited to the transmission of the registration request through a particular network, like a 3GPP network, like the PLMN, the PLMN A or the VPLMN as described above with reference to FIG. 18 and FIG. 19. Rather, in accordance with other embodiments, the access and update may be through any data access network. FIG. 20 illustrates embodiments of an authorization procedure using a non-3GPP access point. FIG. 20(a) illustrates a scenario in which the remote UE and the core network entities providing access to a non-3GPP access point, like the N3IWF, belong to the same PLMN. On the other hand, FIG. 20(b)

illustrates a situation in which the remote UE belongs to a PLMN B that is different from the PLMN A to which the N3IWF belongs. FIG. 20(c) illustrates a roaming architecture in which the remote UE belongs to a home PLMN, while the N3IWF belongs to the PLMN visited by the remote UE.

In FIG. 20(a), the remote UE, using CPP, accesses, via a sidelink communication, the non-3GPP access point. In the embodiment depicted in FIG. 20(a), the registration request is created by the remote UE as a control message, like a PC5RRC message that is transmitted "1" in accordance with the common provisioning parameters to the non-3GPP access which, in turn, forwards the registration request as part of its control signaling to the N3IWF providing the non-3GPP inter-working function. The core network, namely the N3IWF checks "2" for the remote UE authorization and possible policy updates by contacting the PCF/ProSe AS of the core network and returns "3" the authorization, the policy update and optionally additional policy information via the CPP to the remote UE employing the CPP. Thus, the process in FIG. 20(a) is basically the same as in FIG. 19(a) except that the relay UE is replaced by the non-3GPP access point to which the core network PLMN connects via the core network function N3IWF.

FIG. 20(b) and FIG. 20(c) illustrate the scenarios using different PLMNs and a roaming architecture, respectively, provide a procedure which corresponds to the one described above with reference to FIG. 20(a) except that the check initiated by the N3IWF is extended from the PCF/ProSe AS of PLMN A or the VPLMN to the ProSe/ProSe AS of the PLMN B and HPLMN, respectively, to which the remote UE belongs.

Thus, in the embodiment of FIG. 20, the UE may connect to any non-3GPP access network to perform authentication or policy update, and by employing CPP this access may be limited only for authorization/policy updates so that once the respective authorization and policy update has been received, the remote UE may connect, in accordance with the received provisioning parameters, to a relay UE of the network via a sidelink communication.

In the embodiment of FIG. 20 the registration request is transmitted as a control message, however, in accordance with other embodiments, the registration request may be transmitted from the remote UE to the non-3GPP access point as data.

In accordance with embodiments, the additional policy information mentioned above in FIG. 18 to FIG. 20 may include:
  a location where the sidelink communication is allowed, like GPS coordinates, fence coordinates of an area in 2D or 3D as a vector or set or a shape, a certain zone, a paging area, a cell ID, a country or a certain PLMN,
  a frequency to be used for the sidelink communication, like a carrier frequency, a bandwidth part, a resource pool, a sub-channel, one or more PRBs, band information, like the Intelligent Transport System/Industrial Scientific and Medical, ITS/ISM, band (unlicensed) or a non-ITS band (licensed),
  a duration of the sidelink communication, for example a day of time,
  a validity of the of the sidelink communication parameters, like two months before the UE has to ask for an update or otherwise is no longer allowed to use the sidelink communication,
  a start time of the sidelink communication,
  priority information, so that the UE receiving a configuration with a higher priority may override an existing configuration, which may be an update or a deletion.

In the embodiments described so far, the remote UE, responsive to the authorization, obtained the provisioning parameters so the remote UE may perform a sidelink communication. In accordance with other embodiments, when the remote UE includes already such provisioning parameters, which, however, are not active, e.g., because a validity timer expired, rather than obtaining the provisioning parameters for the UE to perform sidelink communication, the existing the provisioning parameters may be activated.

General

In accordance with the present invention, the above described aspects may be used separated from each other or in combination.

In accordance with embodiments, following the access of a remote UE to a relay UE using the CPP and obtaining the authorization and the updated provisioning services, the remote UE may establish a network control layer, like a NAS layer, in its protocol stack, and a network control context may be established at the CN as a part of the authorization procedure.

Figure 21:
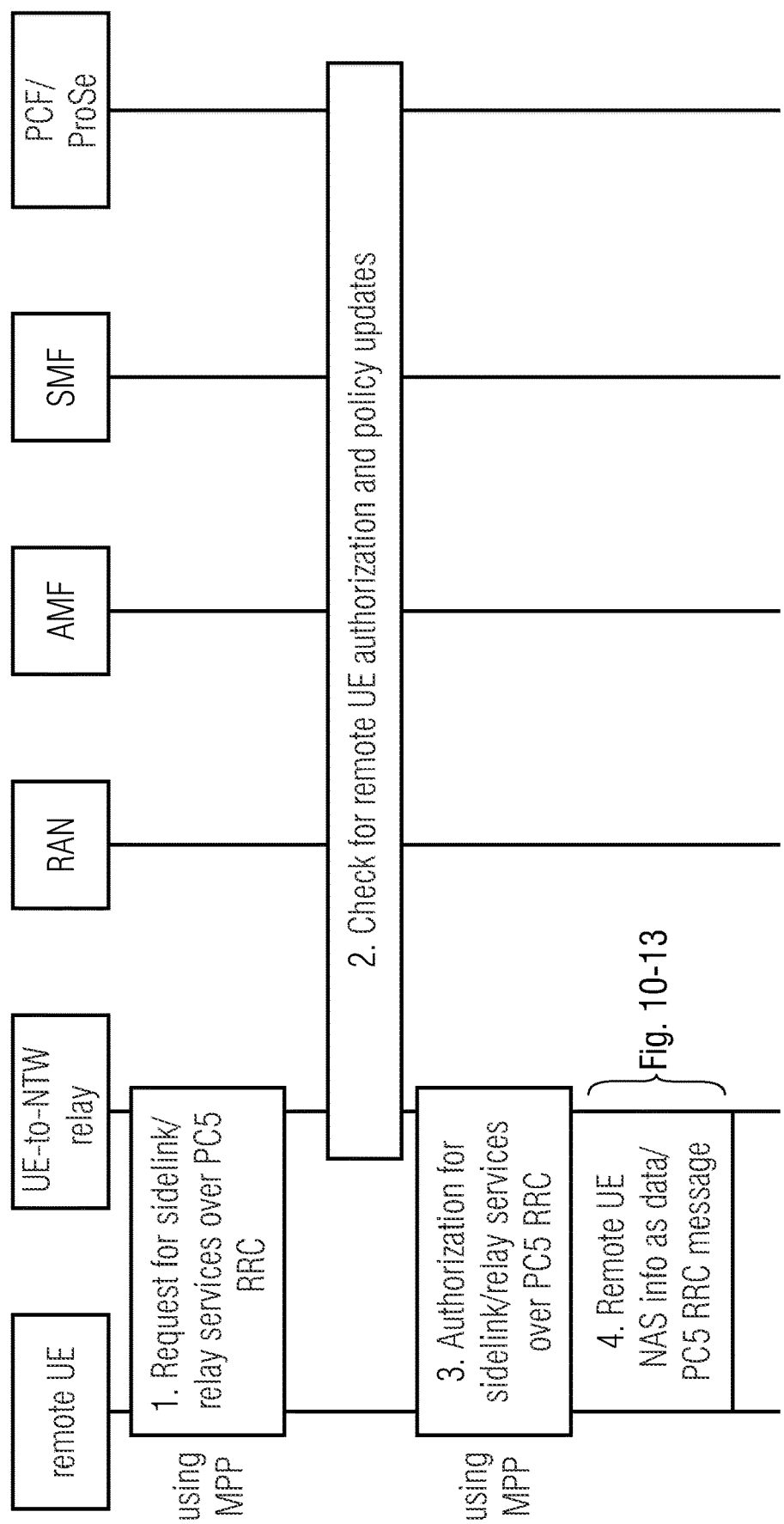
FIG. 21 illustrates an embodiment in accordance with the first and second aspects of the present invention which the network control context establishment is performed after obtaining authorization.

FIG. 21 illustrates an embodiment in accordance with which the network control context establishment is performed after obtaining authorization. FIG. 21 illustrates an embodiment in which a NAS context is established, however, as mentioned above, any other control context may be established as well. In FIG. 21, at steps 1, 2 and 3, the remote UE communicates with the relay UE using the CPP for receiving the authorization and a valid set of provisioning parameters for the sidelink communication, for example in a way as described above with reference to FIG. 18 to FIG. 20. Then, at step 4 the UE may send NAS information as data or control message to the core network in a way as described above with reference to FIG. 10 to FIG. 13. Thus, using the above described approaches of the second aspect of the present invention, the remote UE may obtain authorization to perform sidelink communications using the CPP, and, having done so, the remote UE may use the above described techniques of the first aspect to have a NAS context established at the core network.

Figure 22:
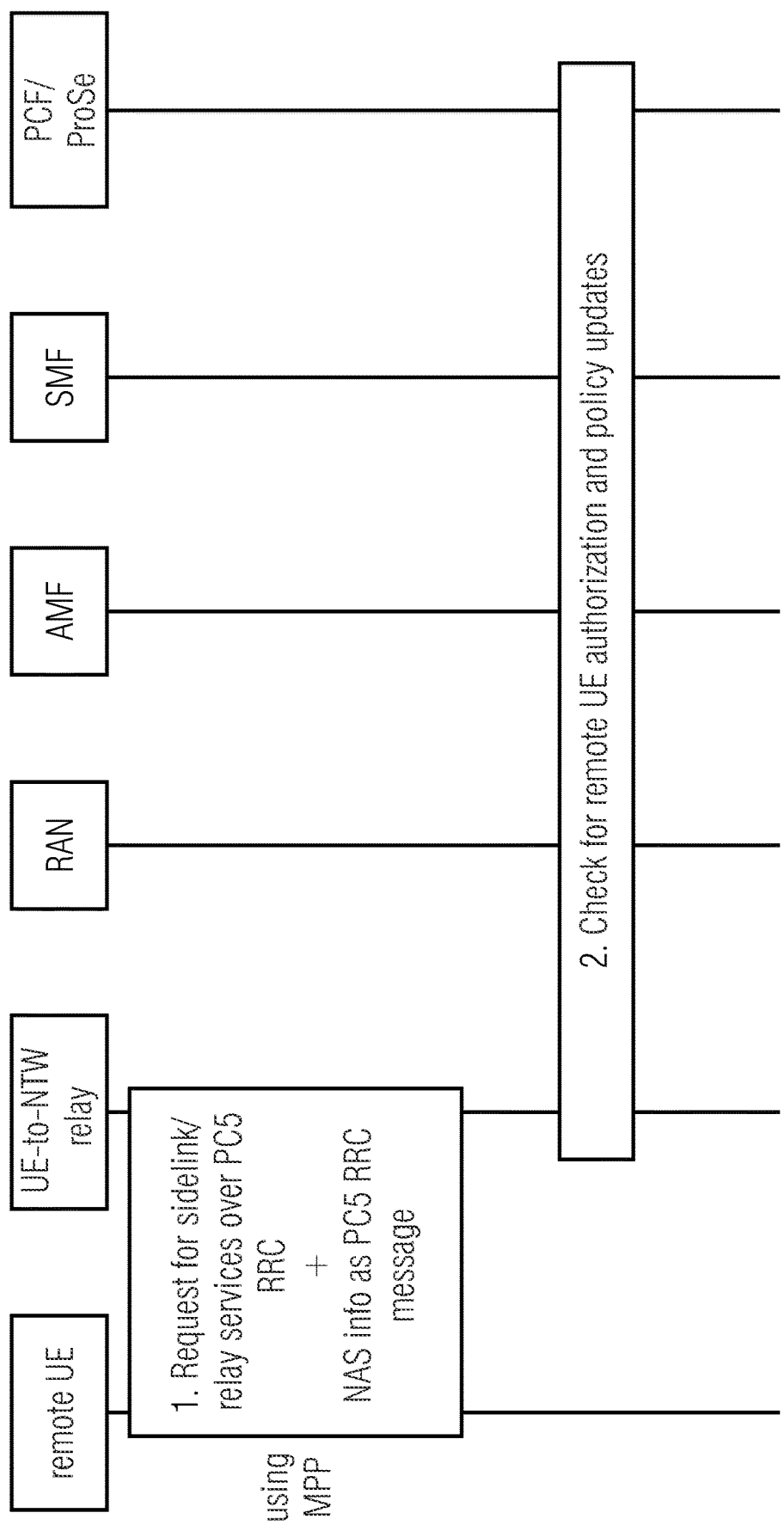
FIG. 22 illustrates an embodiment in accordance with the first and second aspects for a signaling of a NAS context establishment request along with the request for authorization using the CPP.

In accordance with other embodiments, rather than waiting for the authorization, the NAS context establishment request may be send along with the request for authorization using the CPP. FIG. 22 illustrates an embodiment for a signaling of a NAS context establishment request along with the request for authorization using the CPP. In a similar way as described above with reference to FIG. 18 to FIG. 20, the remote UE signals over the sidelink interface using the CPP the request for sidelink relay services, namely the above-mentioned registration request to the relay UE. In addition, the remote UE may already establish a network control layer in its protocol stack and provide respective control information, like the NAS information, that is forwarded to the relay UE using the CPP together with the registration request either as data or as an RRC message. Then, at step 2, the remote UE authorization is checked and also a check for policy updates is performed. Responsive to a successful authorization, the NAS context may be established at the core network on the basis of the information included in the registration request received from the remote UE and then, in a similar way as described above with reference to FIG. 18 to FIG. 20, in a subsequent step the authorization, together with potential policy updates and optional additional policy information, is returned to the remote UE again using the CPP so that once the information is received, the remote UE may perform sidelink communications in accordance with the received provisioning parameters. Thus, in this case the NAS context establishment message may be sent along with the initial authorization request using the CPP, and the rest of the procedure regarding the NAS context establishment may be the same as describe above with reference to FIG. 10 to FIG. 13.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, the user device, UE, described herein may be one or more of a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, or a mobile terminal, or a stationary terminal, or a cellular IoT-UE, or a vehicular UE, or a vehicular group leader (GL) UE, or an IoT, or a narrowband IoT, NB-IoT, device, or a WiFi non Access Point STAtion, non-AP STA, e.g., 802.11ax or 802.11be, or a ground based vehicle, or an aerial vehicle, or a drone, or a moving base station, or a road side unit, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

The base station, BS, described herein may be implemented as mobile or immobile base station and may be one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or a WiFi AP STA, e.g., 802.11ax or 802.11be, or any transmission/reception. point, TRP, enabling an item or a device to communicate using the wireless communication network, the item or device being provided with network connectivity to communicate using the wireless communication network.

Embodiments of the inventive approach are described for sidelink communications in the context of cellular communication systems, safety communication systems, campus networks. The present invention is not limited to this, rather, in accordance with further embodiments, the inventive approach may be employed in any kind of communication network, e.g. an ad-hoc communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 23:
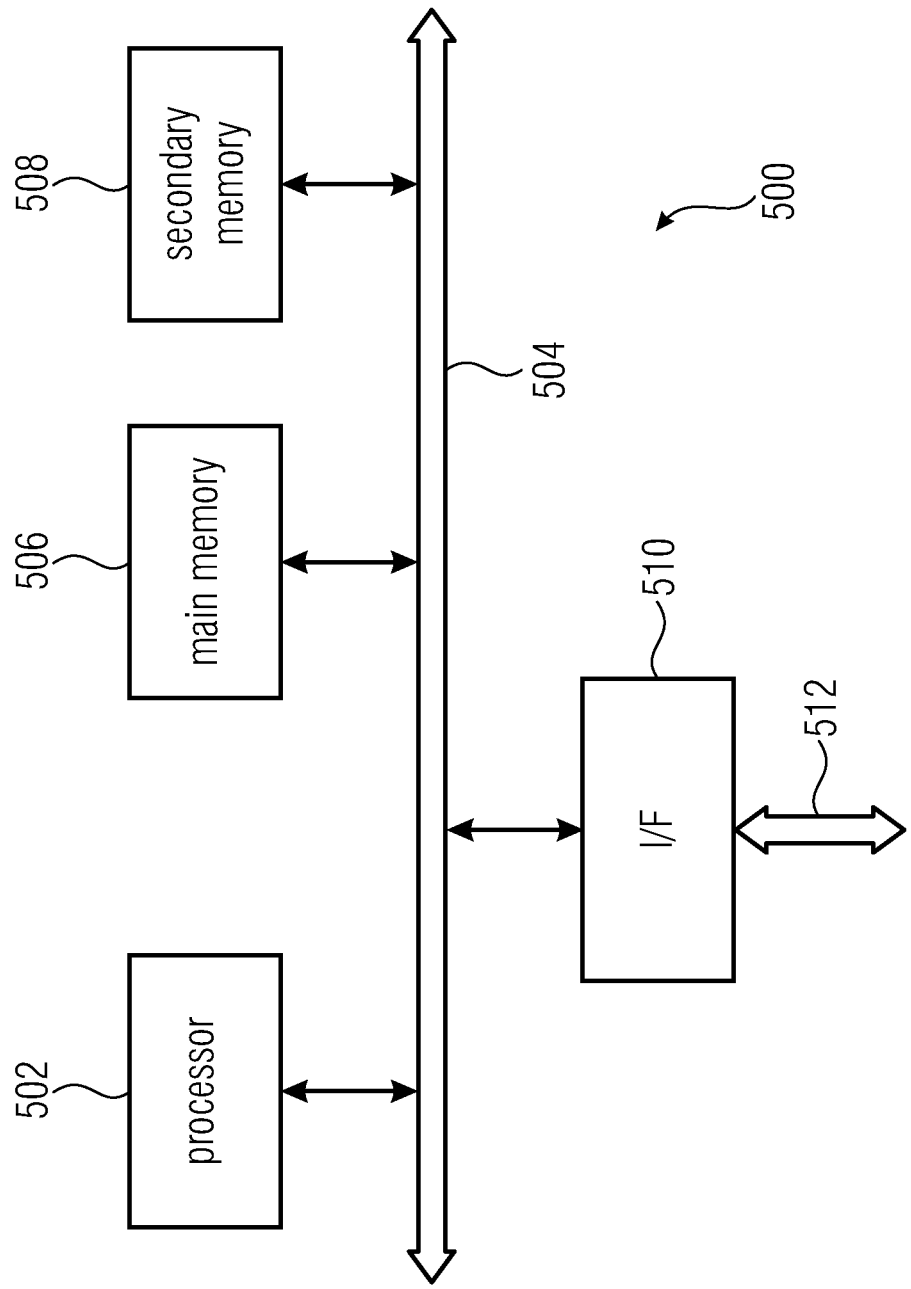
FIG. 23 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 23 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user device, UE, for a wireless communication system,
   wherein the UE is to communicate with one or more further UEs over a sidelink interface,
   wherein the UE is configured or pre-configured with common provisioning parameters, CPPs, for use when the UE is out of coverage and has no other valid provisioning parameters for a sidelink communication over the sidelink interface, the common provisioning parameters allowing the out of coverage UE to acquire an authorization for the UE to perform a sidelink communication over the sidelink interface,
   wherein the UE is to generate a registration request, the registration request being understood only at a core network, CN, of the wireless communication system and causing the CN to check for the authorization of the UE, and
   wherein the UE is to transmit the registration request using predefined or fixed communication parameters as defined by the common provisioning parameters over the sidelink interface to a relay UE either as data or in a control message.

2. The user device, UE, of claim 1, wherein the predefined or fixed transmission parameters include one or more of:
   pre-authorized resources of the sidelink interface on which the out of coverage UE may transmit,
   a pre-defined or fixed Radio Resource Control layer, RRC-layer, configuration to be used when using the CPPs, the RRC-layer configuration also including lower layer configurations,
   pre-defined or fixed Quality of Service, QoS, levels
   pre-defined or fixed Modulation Coding Scheme, MCS, levels.

3. The user device, UE, of claim 1, wherein acquiring the authorization includes activating provisioning parameters existing in the UE or acquiring provisioning parameters for the UE to perform sidelink communication.

4. The user device, UE, of claim 3, wherein the provisioning parameters include one or more of the following:
   one or more policies,
   one or more configuration parameters,
   authorization to connect to the network, and/or to communicate over sidelink, and/or to use a certain frequency band in a certain geographical area,
   a location, like Global Positioning System, GPS, coordinates, a zone, a paging area, a cell identity, cell-ID, a country, or a Public Land Mobile Network, PLMN,
   a frequency, a carrier frequency, a bandwidth part, a resource pool, a subchannel, or a Physical Resource Block, PRB,
   a duration,
   a validity,
   a start time,
   a priority.

5. The user device, UE, of claim 1, wherein the common provisioning parameters are stored in
   a memory of the UE,
   a Universal Integrated Circuit Card, UICC, or a subscriber identities module, SIM, or a universal Subscriber Identity Module, USIM, card, or an embedded Subscriber Identity Module.

6. The user device, UE, of claim 1, wherein the UE is to receive from a core network entity the common provisioning parameters when the UE registers with the wireless communication network.

7. The user device, UE, of claim 1, wherein the UE is to receive, from a core network entity an update for the pre-configured or configured common provisioning parameters when the UE registers with the wireless communication network.

8. The user device, UE, of claim 1, wherein the common provisioning parameters are
   universal in the sense that they are not bound to a particular geographical region, area or location, or
   non-universal in the sense that they vary based on a particular geographic location, area or country.

9. The user device, UE, of claim 1, wherein, responsive to acquiring authorization, the UE is to perform the sidelink communication over the sidelink interface.

10. The user device, UE, of claim 1, wherein the UE is to perform one or more of the following operations:
    receive over the sidelink interface from the relay UE the authorization from the CN,
    send the registration request as data over the sidelink interface to the relay UE, wherein, when the relay UE is to forward the registration request to the CN as data, the UE is to associate the data with a tag, the tag allowing the relay UE to identify the data as the registration request from the UE and to map the registration request to a control message from the relay UE to the CN,
    forward the registration request to the CN using a control message or as data, wherein, when the UE is to send the registration request in the control message, the control message includes a container and the UE is to place the registration request into the container to be mapped by the relay UE to a control message from the relay UE to the CN.

11. The user device, UE, of claim 1, wherein, responsive to a successful authorization, the UE is to establish a network control layer in its protocol stack, the network control layer to provide control information being understood only at a core network, CN, of the wireless communication system.

12. The user device, UE, of claim 11, wherein the UE is to generate the control information and to transmit the control information over the sidelink interface to the relay UE either as data or in a control message.

13. The user device, UE, of claim 11, wherein the UE is to include into the registration request the control information.

14. The user device, UE, of claim 11, wherein the control information includes one or more of:
a NAS message to be stored at the CN, wherein a response message from the CN indicates that the NAS message is accepted or rejected by the CN,
PLMN information that the UE was previously associated with, if the UE is out-of-coverage,
current PLMN information,
a unique UE ID assigned from the application,
a group ID of the UE,
a QoS profile requested by the application,
a location,
old PDU/PDN session information,
current PDU/PDN session information
assistance information.

15. The user device, UE, of claim 14, wherein the assistance information includes one or more of:
a preferred EC state of the UE,
DRX information,
an indication of one or more applications the UE is capable to support,
one or more QoS levels supported by the UE,
a preferred and/or supported network slice,
one or more preferred services for which the UE is to be paged,
a preferred Service and Session Continuity, SSC, mode.

16. The user device, UE, of claim 1, wherein, once the UE is successfully registered with the CN, it is capable of receiving one or more paging messages from the CN via the one or more relay UEs.

17. The user device, UE, of claim 1, wherein
the relay UE comprises a first entity that is capable of operating with the wireless communication system, and/or second entity that is capable of operating with a different wireless communication system, and
the sidelink interface provides a direct link to the first entity or a direct link to the second entity.

18. A wireless communication system, comprising:
a core network, CN,
one or more relay user devices, relay UEs, and
one or more remote user devices, remote UEs,
wherein the remote UE is to communicate with one or more of the relay UEs over a sidelink interface, and
wherein the remote UE is configured or pre-configured with common provisioning parameters, CPPs, for use when the remote UE is out of coverage and has no other valid provisioning parameters for a sidelink communication over the sidelink interface, the common provisioning parameters allowing the out of coverage remote UE to acquire an authorization for the remote UE to perform a sidelink communication over the sidelink interface,
wherein the remote UE is to generate a registration request, the registration request being understood only at the core network, CN, of the wireless communication system and causing the CN to check for the authorization of the remote UE, and
wherein the remote UE is to transmit the registration request using predefined or fixed communication parameters as defined by the common provisioning parameters over the sidelink interface to the relay UE either as data or in a control message.

19. A method of operating a user device, UE, for a wireless communication system, wherein the UE is to communicate with one or more further UEs over a sidelink interface, the method comprising:
configuring or pre-configuring the UE with common provisioning parameters, CPPs, for use when the UE is out of coverage and has no other valid provisioning parameters for a sidelink communication over the sidelink interface, the common provisioning parameters allowing the out of coverage UE to acquire an authorization for the UE to perform a sidelink communication over the sidelink interface,
wherein the UE generates a registration request, the registration request being understood only at a core network, CN, of the wireless communication system and causing the CN to check for the authorization of the UE, and
wherein the UE transmits the registration request using predefined or fixed communication parameters as defined by the common provisioning parameters over the sidelink interface to a relay UE either as data or in a control message.

* * * * *